US011763420B2

(12) United States Patent
Katz et al.

(10) Patent No.: US 11,763,420 B2
(45) Date of Patent: *Sep. 19, 2023

(54) CREATING SHOCKWAVES IN THREE-DIMENSIONAL DEPTH VIDEOS AND IMAGES

(71) Applicant: Snap Inc., Santa Monica, CA (US)

(72) Inventors: Sagi Katz, Yokneam Ilit (IL); Eyal Zak, Megiddo (IL)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/486,338

(22) Filed: Sep. 27, 2021

(65) Prior Publication Data

US 2022/0012847 A1    Jan. 13, 2022

Related U.S. Application Data

(63) Continuation of application No. 17/019,966, filed on Sep. 14, 2020, now Pat. No. 11,132,763, which is a (Continued)

(51) Int. Cl.
H04N 7/18        (2006.01)
G06T 3/00        (2006.01)
(Continued)

(52) U.S. Cl.
CPC ............ *G06T 3/0093* (2013.01); *G06F 3/012* (2013.01); *G06T 3/60* (2013.01); *G11B 27/031* (2013.01);
(Continued)

(58) Field of Classification Search
CPC .................................................. G06T 3/0093
(Continued)

(56) References Cited

U.S. PATENT DOCUMENTS 6,307,526 B1 * 10/2001 Mann .................... G02B 27/017
                                                348/207.1
6,515,659 B1 *  2/2003 Kaye ....................... G06T 17/20
                                                345/419
(Continued)

FOREIGN PATENT DOCUMENTS

JP    2002216167 A    8/2002
WO    2016077798 A1   5/2016
WO    2018127782 A1   7/2018

OTHER PUBLICATIONS

International Search Report and Written Opinion for International Application No. PCT/US2019/049295, dated Dec. 26, 2019 (Dec. 26, 2019)—10 pages.

(Continued)

*Primary Examiner* — Leron Beck
(74) *Attorney, Agent, or Firm* — Culhane Meadows PLLC; Stephen J. Weed

(57) ABSTRACT

A virtual shockwave creation system comprises an eyewear device that includes a frame, a temple connected to a lateral side of the frame, and a depth-capturing camera. Execution of programming by a processor configures the virtual shockwave creation system to generate, for each of multiple initial depth images, a respective shockwave image by applying a transformation function to the initial three-dimensional coordinates. The virtual shockwave creation system creates a warped shockwave video including a sequence of the generated warped shockwave images. The virtual shockwave creation system presents, via an image display, the warped shockwave video.

15 Claims, 43 Drawing Sheets

Related U.S. Application Data continuation of application No. 16/558,777, filed on Sep. 3, 2019, now Pat. No. 10,776,899.

(60) Provisional application No. 62/732,270, filed on Sep. 17, 2018.

(51) Int. Cl.

| | | |
|---|---|---|
| *H04N 13/398* | (2018.01) | |
| *H04N 13/207* | (2018.01) | |
| *G06F 3/01* | (2006.01) | |
| *H04N 13/332* | (2018.01) | |
| *H04N 13/239* | (2018.01) | |
| *H04N 13/106* | (2018.01) | |
| *G06T 3/60* | (2006.01) | |
| *G11B 27/031* | (2006.01) | |
| *H04B 1/3827* | (2015.01) | |

(52) U.S. Cl.
CPC ......... *H04N 13/106* (2018.05); *H04N 13/207* (2018.05); *H04N 13/239* (2018.05); *H04N 13/332* (2018.05); *H04N 13/398* (2018.05); *G06T 2200/24* (2013.01); *H04B 1/385* (2013.01)

(58) Field of Classification Search
USPC ........................................................ 386/280
See application file for complete search history.

(56) References Cited

U.S. PATENT DOCUMENTS

| | | | | |
|---|---|---|---|---|
| 7,624,436 | B2 * | 11/2009 | Balakrishnan | H04L 63/1408 726/13 |
| 7,732,694 | B2 | 6/2010 | Rosenberg | |
| 7,952,595 | B2 * | 5/2011 | Schiwietz | G06T 3/0093 345/647 |
| 8,515,172 | B2 * | 8/2013 | Varekamp | G06T 7/136 382/173 |
| 8,654,181 | B2 * | 2/2014 | Cornog | H04N 13/183 348/47 |
| 8,998,414 | B2 * | 4/2015 | Bohn | G02B 5/20 351/210 |
| 9,053,381 | B2 | 6/2015 | Lee et al. | |
| 9,146,629 | B2 * | 9/2015 | Kim | G06F 3/041 |
| 9,754,419 | B2 | 9/2017 | Petrovskaya et al. | |
| 10,043,430 | B1 * | 8/2018 | D'Amico | G02B 27/0025 |
| 10,776,899 | B2 | 9/2020 | Katz et al. | |
| 11,050,994 | B2 | 6/2021 | DiVerdi et al. | |
| 11,132,763 | B2 | 9/2021 | Katz et al. | |
| 11,178,375 | B1 | 11/2021 | Katz et al. | |
| 2010/0054579 | A1 * | 3/2010 | Okutomi | G06T 7/593 348/E13.001 |
| 2010/0098326 | A1 * | 4/2010 | Abeloe | H04N 13/161 725/31 |
| 2010/0245356 | A1 * | 9/2010 | Gateau | H04N 13/279 345/427 |
| 2011/0227914 | A1 * | 9/2011 | Varekamp | G06T 7/50 345/419 |
| 2012/0154277 | A1 * | 6/2012 | Bar-Zeev | G02B 27/017 345/158 |
| 2012/0206452 | A1 * | 8/2012 | Geisner | G06V 10/26 345/419 |
| 2012/0212398 | A1 * | 8/2012 | Border | G06Q 30/02 345/8 |
| 2012/0249797 | A1 | 10/2012 | Haddick et al. | |
| 2013/0002813 | A1 * | 1/2013 | Vaught | H04N 13/344 348/43 |
| 2013/0016033 | A1 * | 1/2013 | Latta | G06F 3/011 345/8 |
| 2013/0250058 | A1 * | 9/2013 | De Haan | H04N 13/128 348/43 |
| 2013/0286160 | A1 * | 10/2013 | Sasaki | H04N 13/161 348/43 |
| 2013/0293448 | A1 | 11/2013 | Jannard | |
| 2014/0006026 | A1 * | 1/2014 | Lamb | G10L 17/00 704/E17.001 |
| 2015/0102997 | A1 | 4/2015 | Yun et al. | |
| 2015/0358612 | A1 * | 12/2015 | Sandrew | H04N 13/271 348/47 |
| 2018/0075653 | A1 * | 3/2018 | Schillings | H02J 7/027 |
| 2018/0084237 | A1 | 3/2018 | Kim | |
| 2022/0012847 | A1 | 1/2022 | Katz et al. | |

OTHER PUBLICATIONS

U.S. Appl. No. 17/526,136, filed Nov. 15, 2021 to Katz et al.
Extended European Search Report for European Application No. 19861972.8 dated May 6, 2022 (May 6, 2022)—10 pages.

\* cited by examiner

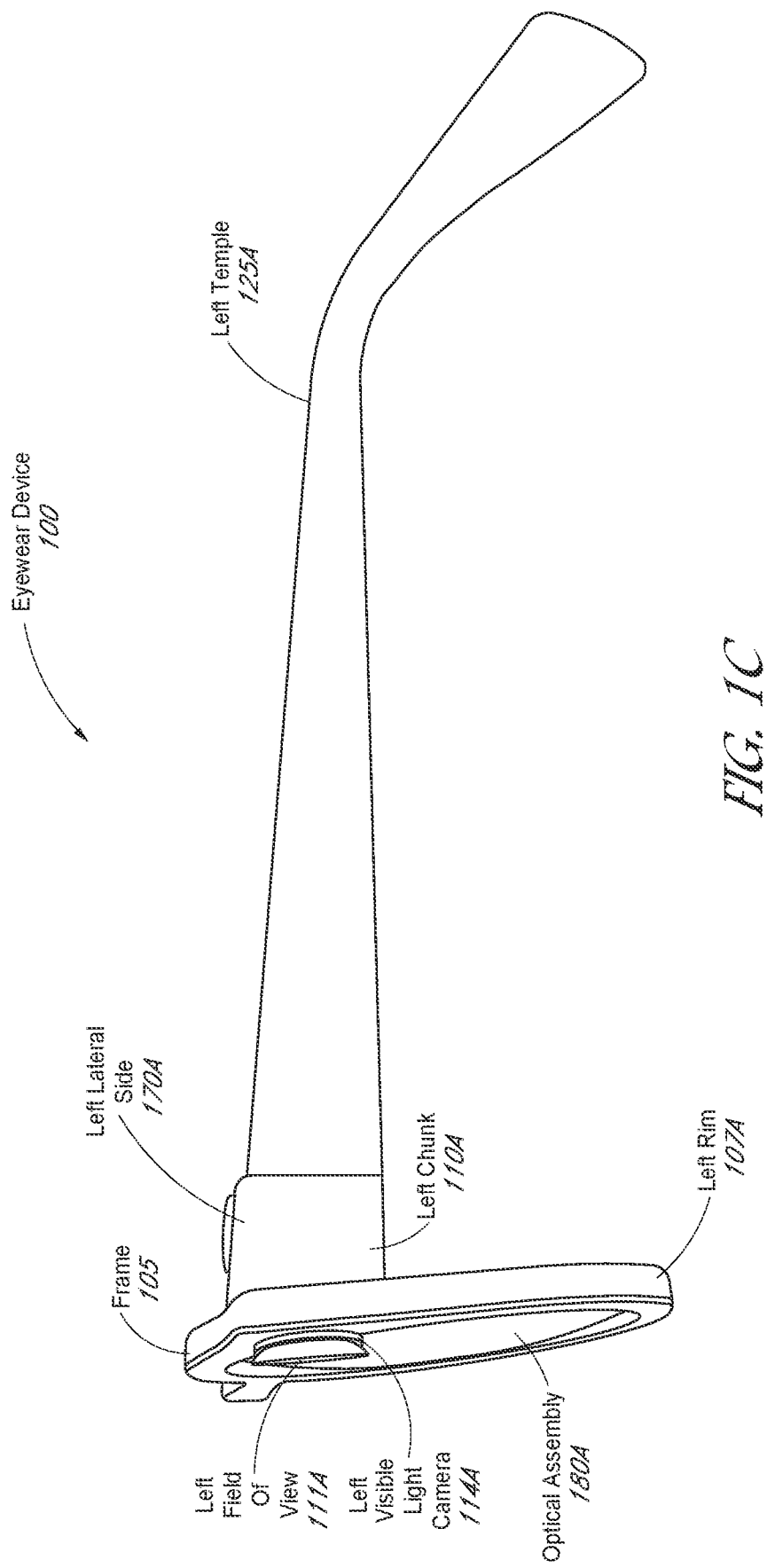

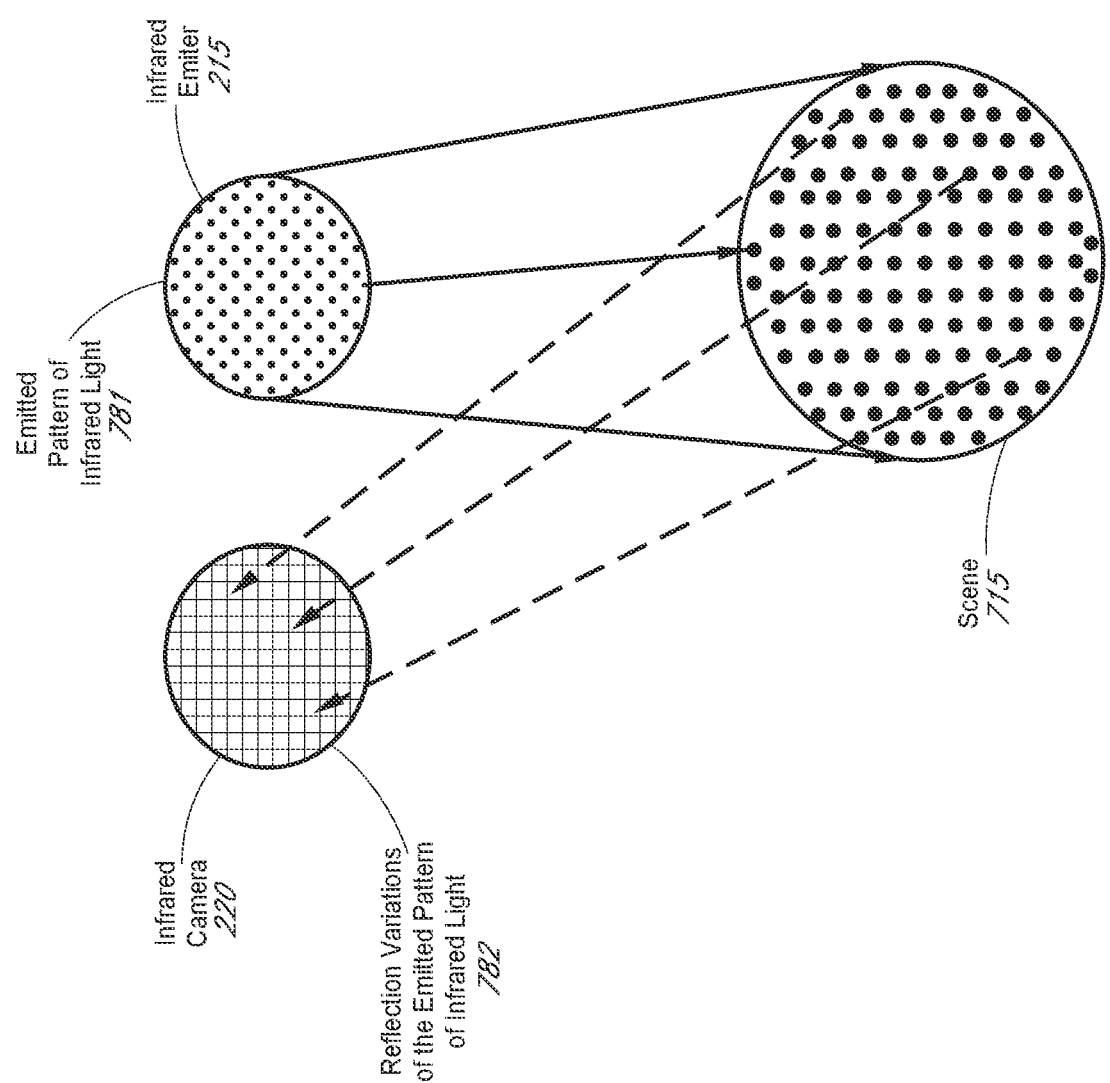

CREATING SHOCKWAVES IN THREE-DIMENSIONAL DEPTH VIDEOS AND IMAGES

CROSS-REFERENCE TO RELATED APPLICATIONS

This application is a continuation of U.S. Utility application Ser. No. 17/019,966 filed on Sep. 14, 2020, which is a continuation of U.S. Utility application Ser. No. 16/558,777 filed on Sep. 3, 2019, and claims priority to U.S. Provisional Application Ser. No. 62/732,270 filed on Sep. 17, 2018, the contents of all of which are incorporated fully herein by reference.

TECHNICAL FIELD

The present subject matter relates to wearable devices, e.g., eyewear devices, and mobile devices and techniques to allow a user to create shockwaves in three-dimensional space of videos and images.

BACKGROUND

Computing devices, such as wearable devices, including portable eyewear devices (e.g., smartglasses, headwear, and headgear); mobile devices (e.g., tablets, smartphones, and laptops); and personal computers available today integrate image displays and cameras. Currently, users of computing devices can utilize photo lenses or filters to create effects on two-dimensional (2D) photographs. Various photo decorating applications feature tools like stickers, emojis, and captions to edit two-dimensional photographs.

With the advent of three-dimensional (3D) image and video content, more sophisticated manipulations and interactions to transform three-dimensional image and video content (e.g., videos, pictures, etc.) are needed. For example, being able to manipulate and interact with the three-dimensional image and video content to create graphical effects on three-dimensional images and videos is desirable.

Accordingly, a need exists to enhance video and image editing effects available for three-dimensional image and video content.

BRIEF DESCRIPTION OF THE DRAWINGS

The drawing figures depict one or more implementations, by way of example only, not by way of limitations. In the figures, like reference numerals refer to the same or similar elements.

FIG. 1C is a left side view of an example hardware configuration of an eyewear device of FIG. 1A, which shows a left visible light camera of the depth-capturing camera.

FIG. 7 depicts an example of a pattern of infrared light emitted by the infrared emitter of the depth sensor and reflection variations of the emitted pattern of infrared light captured by the infrared camera of the depth sensor of the eyewear device to measure depth of pixels in a raw image to generate the initial depth images from the initial video.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, description of well-known methods, procedures, components, and circuitry are set forth at a relatively high-level, without detail, in order to avoid unnecessarily obscuring aspects of the present teachings.

As used herein, the term "shockwave" means a computer generated effect applied to an image or series of images that creates the appearance of a wave traveling through a medium(s), such as a structure, person, and/or air. The term "coupled" or "connected" as used herein refers to any logical, optical, physical or electrical connection, link or the like by which electrical or magnetic signals produced or supplied by one system element are imparted to another coupled or connected element. Unless described otherwise, coupled or connected elements or devices are not necessarily directly connected to one another and may be separated by intermediate components, elements or communication media that may modify, manipulate or carry the electrical signals. The term "on" means directly supported by an element or indirectly supported by the element through another element integrated into or supported by the element.

The orientations of the eyewear device, associated components and any complete devices incorporating a depth-capturing camera such as shown in any of the drawings, are given by way of example only, for illustration and discussion purposes. In operation for shockwave creation, the eyewear device may be oriented in any other direction suitable to the particular application of the eyewear device, for example up, down, sideways, or any other orientation. Also, to the extent used herein, any directional term, such as front, rear, inwards, outwards, towards, left, right, lateral, longitudinal, up, down, upper, lower, top, bottom, side, horizontal, vertical, and diagonal are used by way of example only, and are not limiting as to direction or orientation of any depth-capturing camera or component of the depth-capturing camera constructed as otherwise described herein.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

Figure 1A:
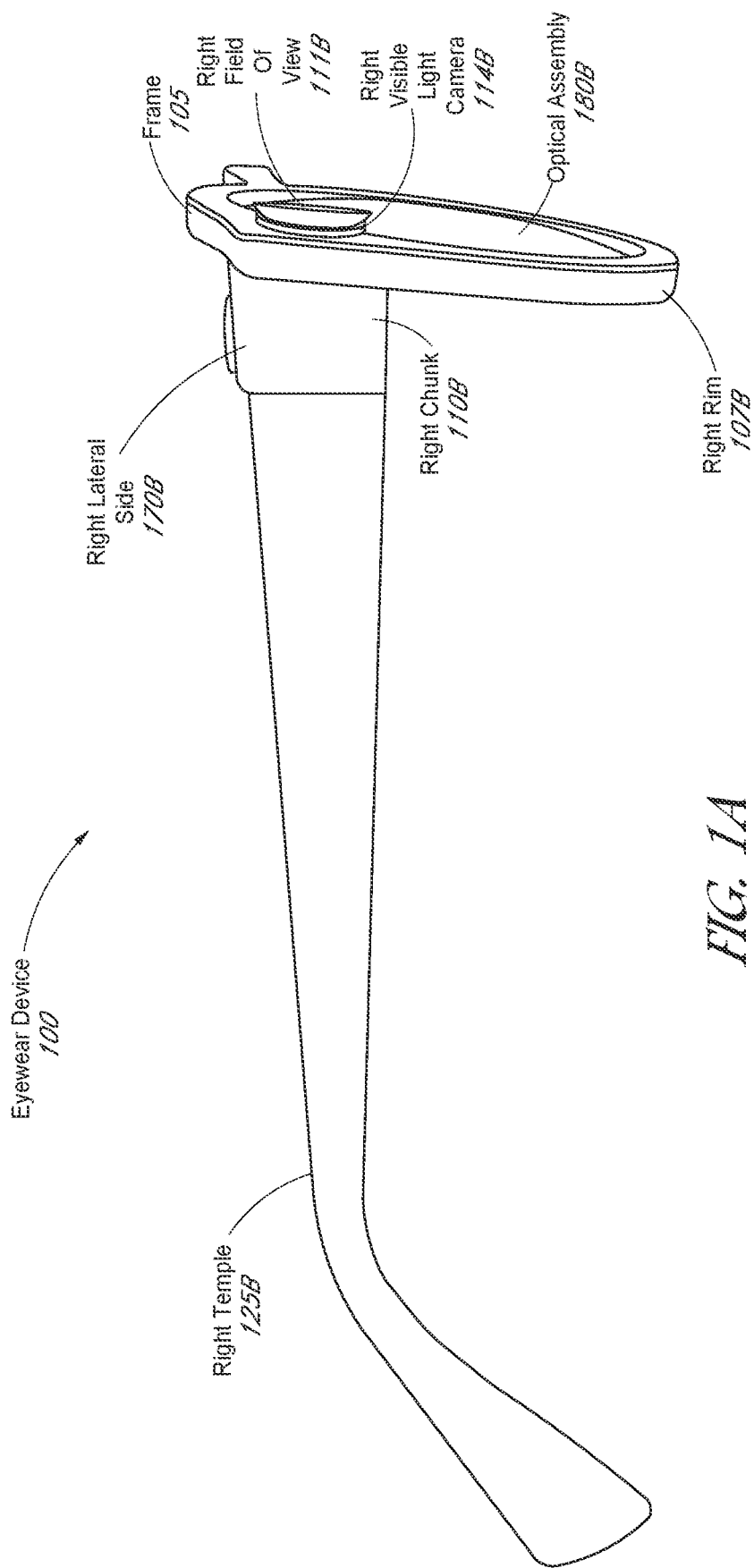
FIG. 1A is a right side view of an example hardware configuration of an eyewear device utilized in a virtual shockwave creation system, in which a transformation function is applied to initial depth images of an initial video to generate warped shockwave images to create a warped shockwave video.

FIG. 1A is a right side view of an example hardware configuration of an eyewear device 100 utilized in a virtual shockwave creation system, which shows a right visible light camera 114B of a depth-capturing camera to generate an initial depth image. As further described below, in the virtual shockwave creation system, a transformation function is applied to a sequence of initial depth images of an initial video to generate the sequence of warped shockwave images of a warped shockwave video. This transformation function can depend on spatial and temporal coordinates of the initial depth images, as explained below.

Figure 1B:
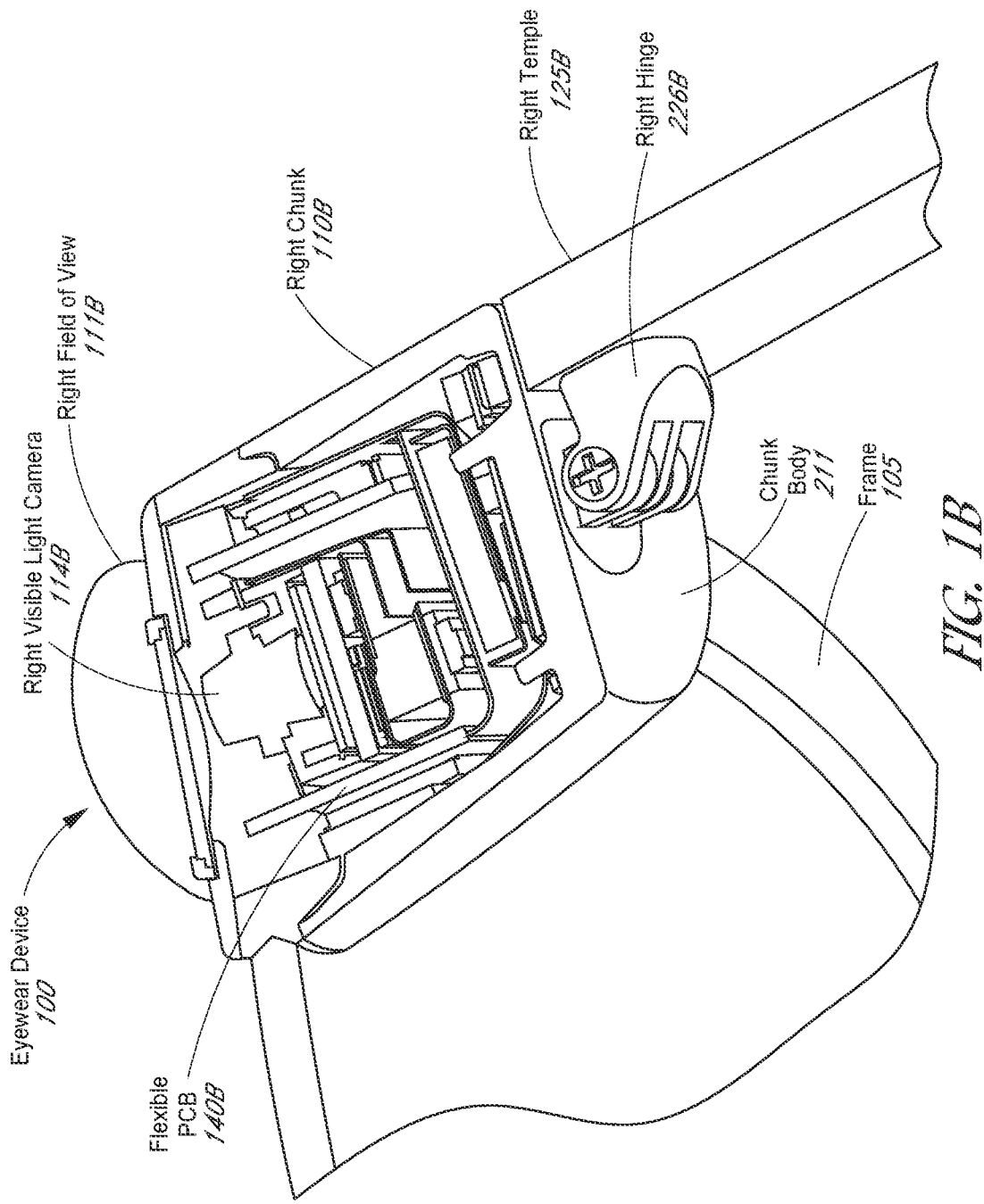
FIG. 1B is a top cross-sectional view of a right chunk of the eyewear device of FIG. 1A depicting a right visible light camera of a depth-capturing camera, and a circuit board.
Figure 1D:
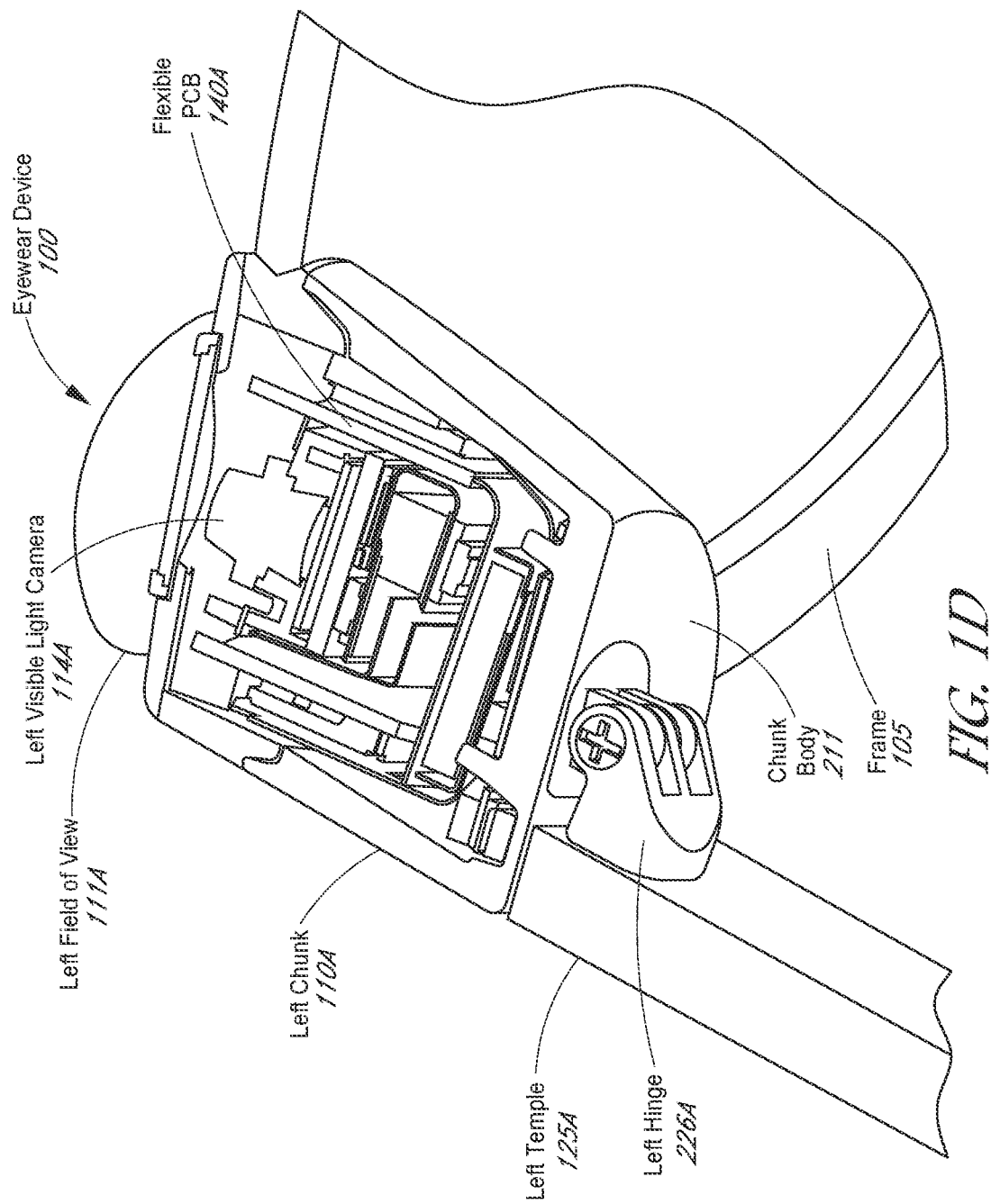
FIG. 1D is a top cross-sectional view of a left chunk of the eyewear device of FIG. 1C depicting the left visible light camera of the depth-capturing camera, and the circuit board.

Eyewear device 100, includes a right optical assembly 180B with an image display to present an initial video including initial images and warped shockwave images of a warped shockwave video that are two-dimensional. In the example, the initial video that includes initial images or processed raw images that are presented to the user, but a depth video that includes the initial depth images generated based on processed raw images is not presented to the user. Instead, a warped version of the visible light image is presented to the user. In the example, this depth video that includes the generated initial depth images is used for purposes of calculations to generate the warped shockwave images and create the warped shockwave video. As shown in FIGS. 1A-B, the eyewear device 100 includes the right visible light camera 114B. Eyewear device 100 can include multiple visible light cameras 114A-B that form a passive type of depth-capturing camera, such as stereo camera, of which the right visible light camera 114B is located on a right chunk 110B. As shown in FIGS. 1C-D, the eyewear device 100 can also include a left visible light camera 114A.

Figure 2A:
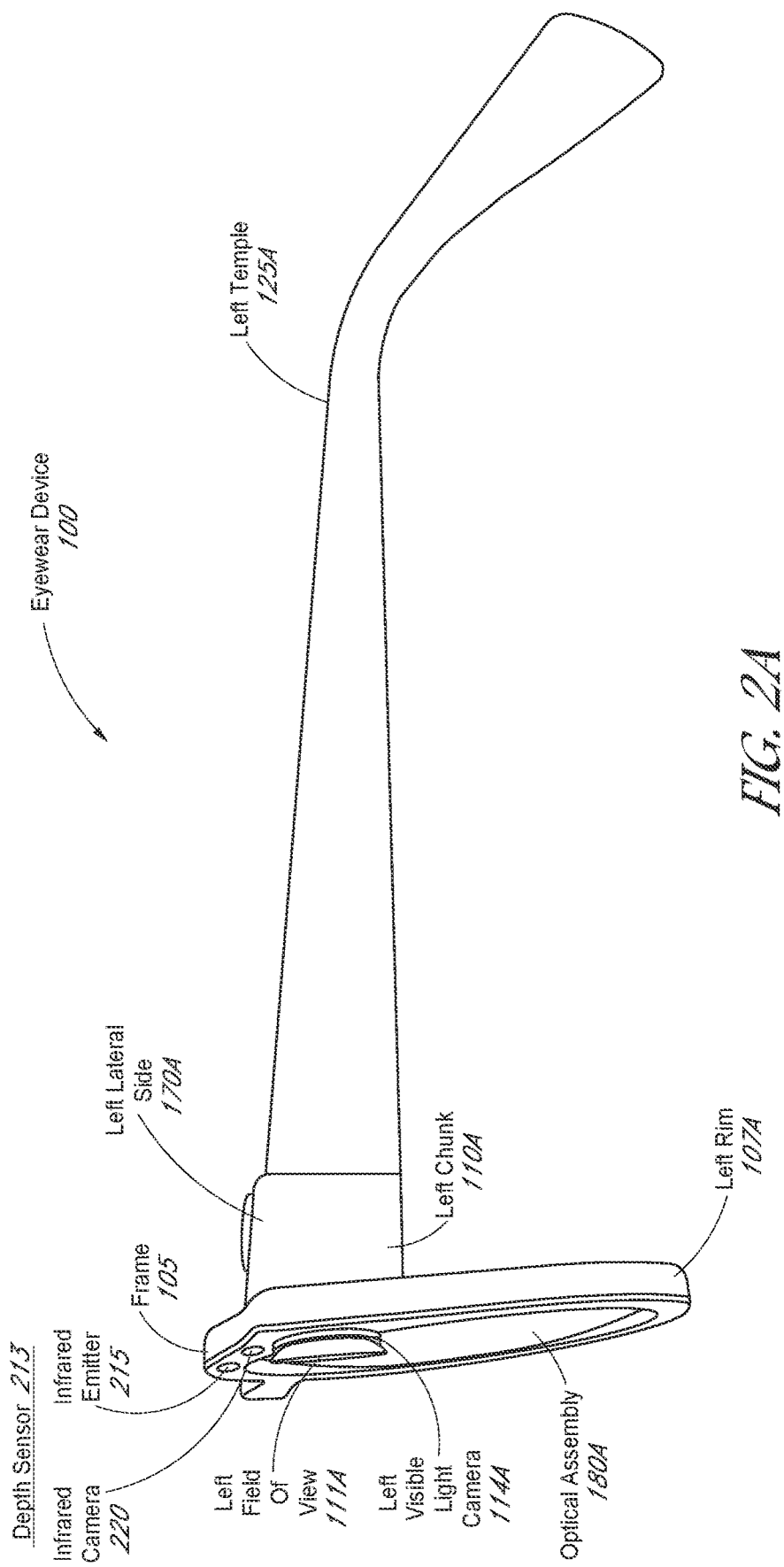
FIG. 2A is a right side view of another example hardware configuration of an eyewear device utilized in the virtual shockwave creation system, which shows the right visible light camera and a depth sensor of the depth-capturing camera to generate an initial depth image of a sequence of initial depth images (e.g., in an initial video).

Alternatively, in the example of FIG. 2A, the depth-capturing camera can be an active type of depth-capturing camera that includes a single visible light camera 114B and a depth sensor (see element 213 of FIG. 2A).

Left and right visible light cameras 114A-B are sensitive to the visible light range wavelength. Each of the visible light cameras 114A-B have a different frontward facing field of view which are overlapping to allow three-dimensional depth images to be generated, for example, right visible light camera 114B has the depicted right field of view 111B. Generally, a "field of view" is the part of the scene that is visible through the camera at a particular position and orientation in space. Objects or object features outside the field of view 111A-B when the image is captured by the visible light camera are not recorded in a raw image (e.g., photograph or picture). The field of view describes an angle range or extent which the image sensor of the visible light camera 114A-B picks up electromagnetic radiation of a given scene in a captured image of the given scene. Field of view can be expressed as the angular size of the view cone, i.e., an angle of view. The angle of view can be measured horizontally, vertically, or diagonally.

In an example, visible light cameras 114A-B have a field of view with an angle of view between 15° to 30°, for example 24°, and have a resolution of 480×480 pixels. The "angle of coverage" describes the angle range that a lens of visible light cameras 114A-B or infrared camera 220 (see FIG. 2A) can effectively image. Typically, the image circle produced by a camera lens is large enough to cover the film or sensor completely, possibly including some vignetting toward the edge. If the angle of coverage of the camera lens does not fill the sensor, the image circle will be visible, typically with strong vignetting toward the edge, and the effective angle of view will be limited to the angle of coverage.

Examples of such visible lights camera 114A-B include a high-resolution complementary metal-oxide-semiconductor (CMOS) image sensor and a video graphic array (VGA) camera, such as 640p (e.g., 640×480 pixels for a total of 0.3 megapixels), 720p, or 1080p. As used herein, the term "overlapping" when referring to field of view means the matrix of pixels in the generated raw image(s) or infrared image of a scene overlap by 30% or more. As used herein, the term "substantially overlapping" when referring to field of view means the matrix of pixels in the generated raw image(s) or infrared image of a scene overlap by 50% or more.

Image sensor data from the visible light cameras 114A-B are captured along with geolocation data, digitized by an image processor, and stored in a memory. The captured left and right raw images captured by respective visible light cameras 114A-B are in the two-dimensional space domain and comprise a matrix of pixels on a two-dimensional coordinate system that includes an X axis for horizontal position and a Y axis for vertical position. Each pixel includes a color attribute (e.g., a red pixel light value, a green pixel light value, and/or a blue pixel light value); and a position attribute (e.g., an X location coordinate and a Y location coordinate).

To provide stereoscopic vision, visible light cameras 114A-B may be coupled to an image processor (element 912 of FIG. 9) for digital processing along with a timestamp in which the image of the scene is captured. Image processor 912 includes circuitry to receive signals from the visible light cameras 114A-B and process those signals from the visible light camera 114 into a format suitable for storage in the memory. The timestamp can be added by the image processor or other processor, which controls operation of the visible light cameras 114A-B. Visible light cameras 114A-B allow the depth-capturing camera to simulate human binocular vision. Depth-capturing camera provides the ability to reproduce three-dimensional images based on two captured images from the visible light cameras 114A-B having the same timestamp. Such three-dimensional images allow for an immersive life-like experience, e.g., for virtual reality or video gaming. Three-dimensional depth videos may be produced by stitching together a sequence of three-dimensional depth images with associated time coordinates for a presentation time in a depth video.

For stereoscopic vision, a pair of raw red, green, and blue (RGB) images are captured of a scene at a given moment in time—one image for each of the left and right visible light cameras 114A-B. When the pair of captured raw images from the frontward facing left and right field of views 111A-B of the left and right visible light cameras 114A-B are processed (e.g., by the image processor), depth images are generated, and the generated depth images can be perceived by a user on the optical assembly 180A-B or other image display(s) (e.g., of a mobile device). The generated depth images are in the three-dimensional space domain and can comprise a matrix of vertices on a three-dimensional location coordinate system that includes an X axis for horizontal position (e.g., length), a Y axis for vertical position (e.g., height), and a Z axis for a depth position (e.g., distance). A depth video further associates each of a sequence of generated depth images with a time coordinate on a time (T) axis for a presentation time in the depth video (e.g., each depth image includes spatial components as well as a temporal component). The depth video can further include an audio component (e.g., audio track or stream), which may be captured by a microphone. Each vertex includes a position attribute (e.g., a red pixel light value, a green pixel light value, and/or a blue pixel light value); a position attribute (e.g., an X location coordinate, a Y location coordinate, and a Z location coordinate); a texture attribute, and/or a reflectance attribute. The texture attribute quantifies the perceived texture of the depth image, such as the spatial arrangement of color or intensities in a region of vertices of the depth image.

Generally, perception of depth arises from the disparity of a given 3D point in the left and right raw images captured by visible light cameras 114A-B. Disparity is the difference in image location of the same 3D point when projected under perspective of the visible light cameras 114A-B ($d=x_{left}-x_{right}$). For visible light cameras 114A-B with parallel optical axes, focal length f, baseline b, and corresponding image points ($x_{left}$, $y_{left}$) and ($x_{right}$, $y_{right}$), the location of a 3D point (Z axis location coordinate) can be derived utilizing triangulation which determines depth from disparity. Typically, depth of the 3D point is inversely proportional to disparity. A variety of other techniques can also be used. Generation of three-dimensional depth images and warped shockwave images is explained in more detail later.

In an example, a virtual shockwave creation system includes the eyewear device 100. The eyewear device 100 includes a frame 105 and a left temple 110A extending from a left lateral side 170A of the frame 105 and a right temple 110B extending from a right lateral side 170B of the frame 105. Eyewear device 100 further includes a depth-capturing camera. The depth-capturing camera includes: (i) at least two visible light cameras with overlapping fields of view; or (ii) a least one visible light camera 114A-B and a depth sensor (element 213 of FIG. 2A). In one example, the depth-capturing camera includes a left visible light camera 114A with a left field of view 111A connected to the frame 105 or the left temple 110A to capture a left image of the scene. Eyewear device 100 further includes a right visible light camera 114B connected to the frame 105 or the right temple 110B with a right field of view 111B to capture (e.g., simultaneously with the left visible light camera 114A) a right image of the scene which partially overlaps the left image.

Virtual shockwave creation system further includes a computing device, such as a host computer (e.g., mobile device 990 of FIGS. 9-10) coupled to eyewear device 100 over a network. The virtual shockwave creation system further includes an image display (optical assembly 180A-B of eyewear device; image display 1080 of mobile device 990 of FIG. 10) for presenting (e.g., displaying) a video including images. Virtual shockwave creation system further includes an image display driver (element 942 of eyewear device 100 of FIG. 9; element 1090 of mobile device 990 of FIG. 10) coupled to the image display (optical assembly 180A-B of eyewear device; image display 1080 of mobile device 990 of FIG. 10) to control the image display to present the initial video.

In some examples, user input is received to indicate that the user desires shockwaves to be applied to the various initial depth images from the initial video. For example, virtual shockwave creation system further includes a user input device to receive a shockwave effect selection from a user to apply shockwaves to the presented initial video. Examples of user input devices include a touch sensor (element 991 of FIG. 9 for the eyewear device 100), a touch screen display (element 1091 of FIG. 10 for the mobile device 1090), and a computer mouse for a personal computer or a laptop computer. Virtual shockwave creation system further includes a processor (element 932 of eyewear device 100 of FIG. 9; element 1030 of mobile device 990 of FIG. 10) coupled to the eyewear device 100 and the depth-capturing camera. Virtual shockwave creation system further includes a memory (element 934 of eyewear device 100 of FIG. 9; elements 1040A-B of mobile device 990 of FIG. 10) accessible to the processor, and shockwave creation programming in the memory (element 945 of eyewear device 100 of FIG. 9; element 945 of mobile device 990 of FIG. 10), for example in the eyewear device 100 itself, mobile device (element 990 of FIG. 9), or another part of the virtual shockwave creation system (e.g., server system 998 of FIG. 9). Execution of the programming (element 945 of FIG. 9) by the processor (element 932 of FIG. 9) configures the eyewear device 100 to generate, via the depth-capturing camera, the initial depth images from the initial images 957A-N in the initial video. The initial images 957A-N are in two-dimensional space, for example raw images 858A-B or processed raw images 858A-B after rectification. Each of the initial depth images is associated with a time coordinate on a time (T) axis for a presentation time, for example based, on initial images 957A-B in the initial video. The initial depth image is formed of a matrix of vertices. Each vertex represents a pixel in a three-dimensional scene. Each vertex has a position attribute. The position attribute of each vertex is based on a three-dimensional location coordinate system and includes an X location coordinate on an X axis for horizontal position, a Y location coordinate on a Y axis for vertical position, and a Z location coordinate on a Z axis for a depth position.

Execution of the shockwave creation programming (element 945 of FIG. 10) by the processor (element 1030 of FIG. 10) configures the mobile device (element 990 of FIG. 10) of the virtual shockwave creation system to perform the following functions. Mobile device (element 990 of FIG. 10) presents, via the image display (element 1080 of FIG. 10), the initial video. Mobile device (element 990 of FIG. 10) receives, via the user input device (element 1091 of FIG. 10), the shockwave effect selection from the user to apply shockwaves to the presented initial video. In response to receiving the shockwave effect selection, based on, at least, the associated time coordinate of each of the initial depth images, mobile device (element 990 of FIG. 10) applies to vertices of each of the initial depth images, a transformation function. The transformation function can transform a respective shockwave region of vertices grouped together along the Z axis based on, at least, the associated time coordinate of the respective initial depth image. The respective transformation function moves a respective Y location coordinate of vertices in the respective shockwave region of vertices vertically upwards or downwards on the Y axis, which appears as a depth warping effect. In one example, based on the X, Y, and/or Z location coordinates of the vertices and the associated time coordinate, the transformation function transforms all the vertices of the initial depth images. In one example, the transformation function is an equation new Y=func (X, old Y,Z,T), which does not depend on the X location coordinate. An example transformation function where the wave is advancing in the Z direction (so this specific function does not depend on X) is new Y=f (Y,Z,t)=Y+200/(exp(20/3−abs(Z−300*t)/150)+1)−200. The transformation is applied per-vertex, where the transformation relays on both space and time. Applying the transformation function creates a new modified set of vertices or a three-dimensional image without a depth map.

Mobile device (element 990 of FIG. 10) generates, for each of the initial depth images, a respective shockwave depth image by applying the transformation function to the respective initial depth image. Mobile device (element 990 of FIG. 10) can generate a respective shockwave depth image by applying the transformation function to the position attribute of the vertices in a respective shockwave region of vertices of the respective initial depth image. Mobile device (element 990 of FIG. 10) creates, a warped shockwave video including the sequence of the generated warped shockwave images. Mobile device (element 990 of FIG. 10) presents, via the image display (image display 1080 of FIG. 10), the warped shockwave video. Mobile device (element 990 of FIG. 10) presents, via the image display (image display 1080 of FIG. 10), the warped shockwave video. Various shockwave creation programming (element 945 of FIGS. 9-10) functions described herein may be implemented within other parts of the virtual shockwave creation system, such as the eyewear device 100 or another host computer besides mobile device (element 990 of FIG. 10), such as a server system (element 998 of FIG. 9).

In some examples, the received shockwave effect selection generates a shockwave creation photo filter effect, which is applied as the transformation function to the initial video in response to finger swiping across a touch screen display (e.g., combined image display 1080 and user input device 1091). The warped shockwave video with the shockwave creation photo filter effect may then be shared with friends via a chat application executing on the mobile device (element 990 of FIG. 10) by transmission over a network.

FIG. 1B is a top cross-sectional view of a right chunk 110B of the eyewear device 100 of FIG. 1A depicting the right visible light camera 114B of the depth-capturing camera, and a circuit board. FIG. 1C is a left side view of an example hardware configuration of an eyewear device 100 of FIG. 1A, which shows a left visible light camera 114A of the depth-capturing camera. FIG. 1D is a top cross-sectional view of a left chunk 110A of the eyewear device of FIG. 1C depicting the left visible light camera 114A of the depth-capturing camera, and a circuit board. Construction and placement of the left visible light camera 114A is substantially similar to the right visible light camera 114B, except the connections and coupling are on the left lateral side 170A. As shown in the example of FIG. 1B, the eyewear device 100 includes the right visible light camera 114B and a circuit board, which may be a flexible printed circuit board (PCB) 140B. The right hinge 226B connects the right chunk 110B to a right temple 125B of the eyewear device 100. In some examples, components of the right visible light camera 114B, the flexible PCB 140B, or other electrical connectors or contacts may be located on the right temple 125B or the right hinge 226B.

The right chunk 110B includes chunk body 211 and a chunk cap, with the chunk cap omitted in the cross-section of FIG. 1B. Disposed inside the right chunk 110B are various interconnected circuit boards, such as PCBs or flexible PCBs, that include controller circuits for right visible light camera 114B, microphone(s), low-power wireless circuitry (e.g., for wireless short range network communication via Bluetooth™), high-speed wireless circuitry (e.g., for wireless local area network communication via WiFi).

The right visible light camera 114B is coupled to or disposed on the flexible PCB 240 and covered by a visible light camera cover lens, which is aimed through opening(s) formed in the frame 105. For example, the right rim 107B of the frame 105 is connected to the right chunk 110B and includes the opening(s) for the visible light camera cover lens. The frame 105 includes a front-facing side configured to face outwards away from the eye of the user. The opening for the visible light camera cover lens is formed on and through the front-facing side. In the example, the right visible light camera 114B has an outwards facing field of view 111B with a line of sight or perspective of the right eye of the user of the eyewear device 100. The visible light camera cover lens can also be adhered to an outwards facing surface of the right chunk 110B in which an opening is formed with an outwards facing angle of coverage, but in a different outwards direction. The coupling can also be indirect via intervening components.

Left (first) visible light camera 114A is connected to a left image display of left optical assembly 180A to capture a left eye viewed scene observed by a wearer of the eyewear device 100 in a left raw image. Right (second) visible light camera 114B is connected to a right image display of right optical assembly 180B to capture a right eye viewed scene observed by the wearer of the eyewear device 100 in a right raw image. The left raw image and the right raw image partially overlap to present a three-dimensional observable space of a generated depth image.

Flexible PCB 140B is disposed inside the right chunk 110B and is coupled to one or more other components housed in the right chunk 110B. Although shown as being formed on the circuit boards of the right chunk 110B, the right visible light camera 114B can be formed on the circuit boards of the left chunk 110A, the temples 125A-B, or frame 105.

FIG. 2A is a right side view of another example hardware configuration of an eyewear device 100 utilized in the virtual shockwave creation system. As shown, the depth-capturing camera includes a left visible light camera 114A and a depth sensor 213 on a frame 105 to generate an initial depth image of a sequence of initial depth images (e.g., in an initial video). Instead of utilizing at least two visible light cameras 114A-B to generate the initial depth image, here a single visible light camera 114A and the depth sensor 213 are utilized to generate depth images, such as the initial depth images. As in the example of FIGS. 1A-D, shockwave effect selection from a user is applied to initial depth images from the initial video to generate warped shockwave images of warped shockwave video. The infrared camera 220 of the depth sensor 213 has an outwards facing field of view that substantially overlaps with the left visible light camera 114A for a line of sight of the eye of the user. As shown, the infrared emitter 215 and the infrared camera 220 are co-located on the upper portion of the left rim 107A with the left visible light camera 114A.

In the example of FIG. 2A, the depth sensor 213 of the eyewear device 100 includes an infrared emitter 215 and an infrared camera 220 which captures an infrared image. Visible light cameras 114A-B typically include a blue light filter to block infrared light detection, in an example, the infrared camera 220 is a visible light camera, such as a low resolution video graphic array (VGA) camera (e.g., 640×480 pixels for a total of 0.3 megapixels), with the blue filter removed. The infrared emitter 215 and the infrared camera 220 are co-located on the frame 105, for example, both are shown as connected to the upper portion of the left rim 107A. As described in further detail below, the frame 105 or one or more of the left and right chunks 110A-B include a circuit board that includes the infrared emitter 215 and the infrared camera 220. The infrared emitter 215 and the infrared camera 220 can be connected to the circuit board by soldering, for example.

Other arrangements of the infrared emitter 215 and infrared camera 220 can be implemented, including arrangements in which the infrared emitter 215 and infrared camera 220 are both on the right rim 107A, or in different locations on the frame 105, for example, the infrared emitter 215 is on the left rim 107B and the infrared camera 220 is on the right rim 107B. However, the at least one visible light camera 114A and the depth sensor 213 typically have substantially overlapping fields of view to generate three-dimensional depth images. In another example, the infrared emitter 215 is on the frame 105 and the infrared camera 220 is on one of the chunks 110A-B, or vice versa. The infrared emitter 215 can be connected essentially anywhere on the frame 105, left chunk 110A, or right chunk 110B to emit a pattern of infrared in the light of sight of the eye of the user. Similarly, the infrared camera 220 can be connected essentially anywhere on the frame 105, left chunk 110A, or right chunk 110B to capture at least one reflection variation in the emitted pattern of infrared light of a three-dimensional scene in the light of sight of the eye of the user.

The infrared emitter 215 and infrared camera 220 are arranged to face outwards to pick up an infrared image of a scene with objects or object features that the user wearing the eyewear device 100 observes. For example, the infrared emitter 215 and infrared camera 220 are positioned directly in front of the eye, in the upper part of the frame 105 or in the chunks 110A-B at either ends of the frame 105 with a forward facing field of view to capture images of the scene which the user is gazing at, for measurement of depth of objects and object features.

In one example, the infrared emitter 215 of the depth sensor 213 emits infrared light illumination in the forward facing field of view of the scene, which can be near-infrared light or other short-wavelength beam of low-energy radiation. Alternatively, or additionally, the depth sensor 213 may include an emitter that emits other wavelengths of light besides infrared and the depth sensor 213 further includes a camera sensitive to that wavelength that receives and captures images with that wavelength. As noted above, the eyewear device 100 is coupled to a processor and a memory, for example in the eyewear device 100 itself or another part of the virtual shockwave creation system. Eyewear device 100 or the virtual shockwave creation system can subsequently process the captured infrared image during generation of three-dimensional depth images of the depth videos, such as the initial depth images from the initial video.

Figure 2B:
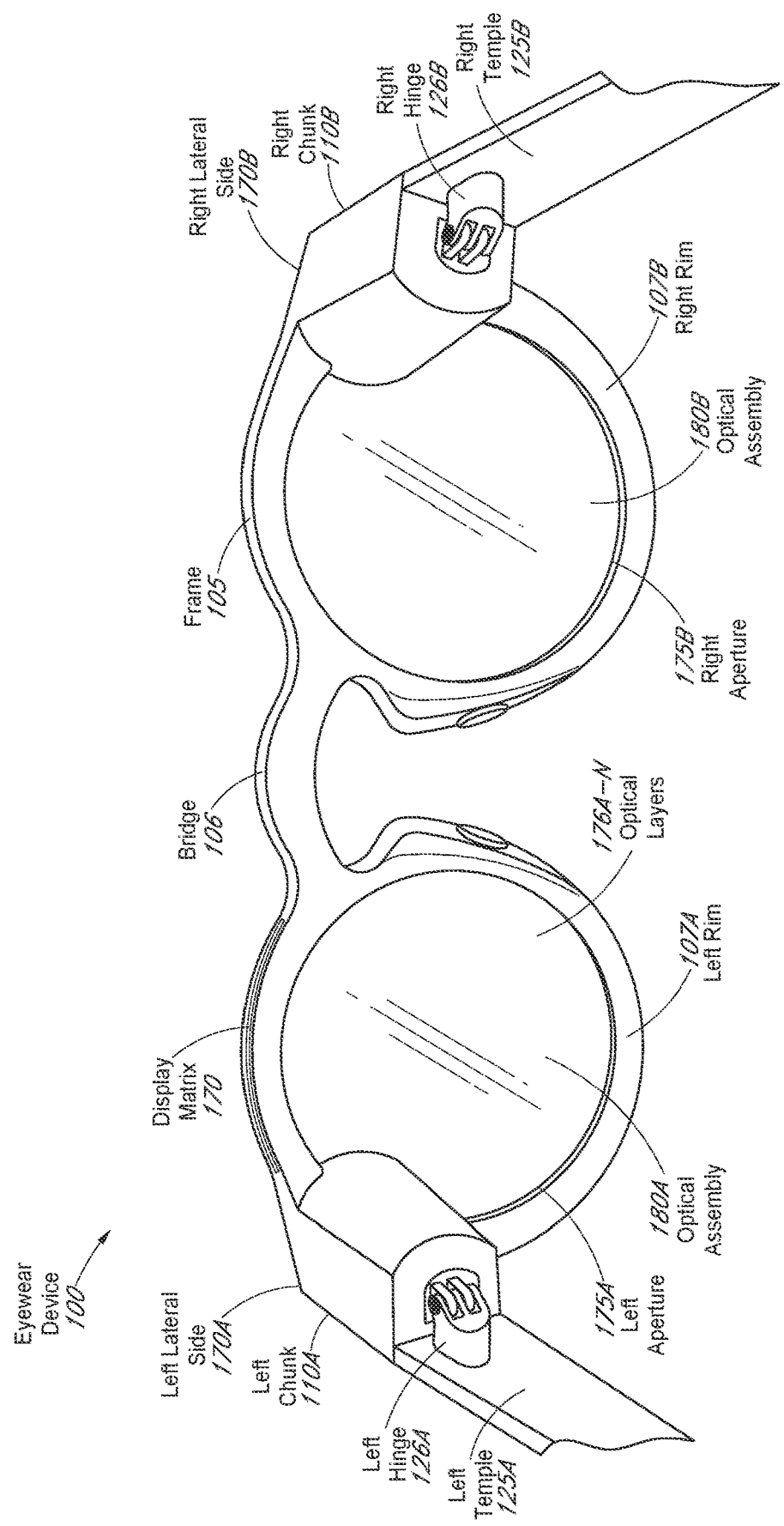
FIGS. 2B and 2C are rear views of example hardware configurations of the eyewear device, including two different types of image displays.
Figure 2C:
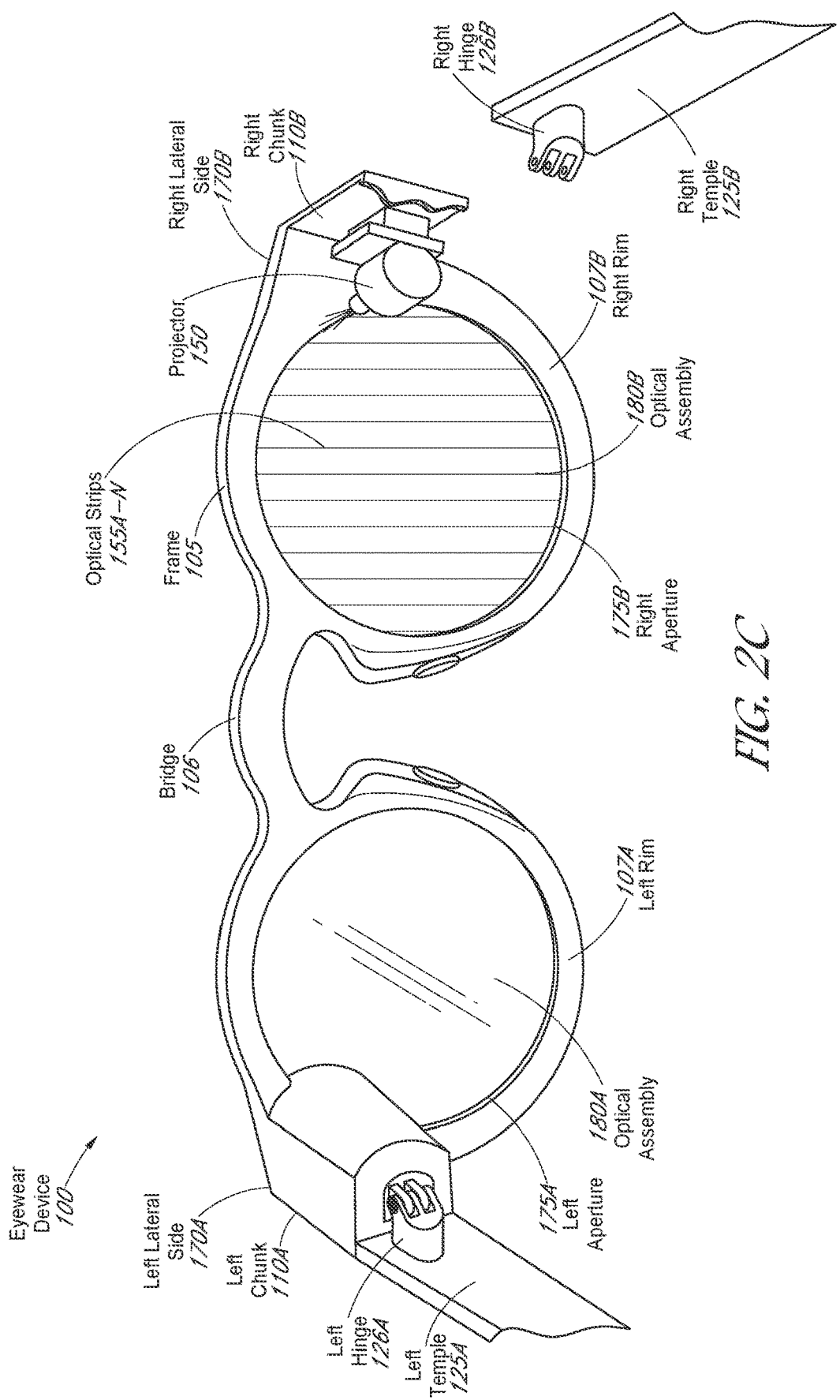

FIGS. 2B-C are rear views of example hardware configurations of the eyewear device 100, including two different types of image displays. Eyewear device 100 is in a form configured for wearing by a user, which are eyeglasses in the example. The eyewear device 100 can take other forms and may incorporate other types of frameworks, for example, a headgear, a headset, or a helmet.

In the eyeglasses example, eyewear device 100 includes a frame 105 including a left rim 107A connected to a right rim 107B via a bridge 106 adapted for a nose of the user. The left and right rims 107A-B include respective apertures 175A-B which hold a respective optical element 180A-B, such as a lens and a display device. As used herein, the term lens is meant to cover transparent or translucent pieces of glass or plastic having curved and/or flat surfaces that cause light to converge/diverge or that cause little or no convergence or divergence.

Although shown as having two optical elements 180A-B, the eyewear device 100 can include other arrangements, such as a single optical element or may not include any optical element 180A-B depending on the application or intended user of the eyewear device 100. As further shown, eyewear device 100 includes a left chunk 110A adjacent the left lateral side 170A of the frame 105 and a right chunk 110B adjacent the right lateral side 170B of the frame 105. The chunks 110A-B may be integrated into the frame 105 on the respective sides 170A-B (as illustrated) or implemented as separate components attached to the frame 105 on the respective sides 170A-B. Alternatively, the chunks 110A-B may be integrated into temples (not shown) attached to the frame 105.

In one example, the image display of optical assembly 180A-B includes an integrated image display. As shown in FIG. 2B, the optical assembly 180A-B includes a suitable display matrix 170 of any suitable type, such as a liquid crystal display (LCD), an organic light-emitting diode (OLED) display, or any other such display. The optical assembly 180A-B also includes an optical layer or layers 176, which can include lenses, optical coatings, prisms, mirrors, waveguides, optical strips, and other optical components in any combination. The optical layers 176A-N can include a prism having a suitable size and configuration and including a first surface for receiving light from display matrix and a second surface for emitting light to the eye of the user. The prism of the optical layers 176A-N extends over all or at least a portion of the respective apertures 175A-B formed in the left and right rims 107A-B to permit the user to see the second surface of the prism when the eye of the user is viewing through the corresponding left and right rims 107A-B. The first surface of the prism of the optical layers 176A-N faces upwardly from the frame 105 and the display matrix overlies the prism so that photons and light emitted by the display matrix impinge the first surface. The prism is sized and shaped so that the light is refracted within the prism and is directed towards the eye of the user by the second surface of the prism of the optical layers 176A-N. In this regard, the second surface of the prism of the optical layers 176A-N can be convex to direct the light towards the center of the eye. The prism can optionally be sized and shaped to magnify the image projected by the display matrix 170, and the light travels through the prism so that the image viewed from the second surface is larger in one or more dimensions than the image emitted from the display matrix 170.

In another example, the image display device of optical assembly 180A-B includes a projection image display as shown in FIG. 2C. The optical assembly 180A-B includes a laser projector 150, which is a three-color laser projector using a scanning mirror or galvanometer. During operation, an optical source such as a laser projector 150 is disposed in or on one of the temples 125A-B of the eyewear device 100. Optical assembly 180A-B includes one or more optical strips 155A-N spaced apart across the width of the lens of the optical assembly 180A-B or across a depth of the lens between the front surface and the rear surface of the lens.

As the photons projected by the laser projector 150 travel across the lens of the optical assembly 180A-B, the photons encounter the optical strips 155A-N. When a particular photon encounters a particular optical strip, the photon is either redirected towards the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A-B, the eyewear device 100 can include other arrangements, such as a single or three optical assemblies, or the optical assembly 180A-B may have arranged different arrangement depending on the application or intended user of the eyewear device 100.

As further shown in FIGS. 2B-C, eyewear device 100 includes a left chunk 110A adjacent the left lateral side 170A of the frame 105 and a right chunk 110B adjacent the right lateral side 170B of the frame 105. The chunks 110A-B may be integrated into the frame 105 on the respective lateral sides 170A-B (as illustrated) or implemented as separate components attached to the frame 105 on the respective sides 170A-B. Alternatively, the chunks 110A-B may be integrated into temples 125A-B attached to the frame 105.

In one example, the image display includes a first (left) image display and a second (right) image display. Eyewear device 100 includes first and second apertures 175A-B which hold a respective first and second optical assembly 180A-B. The first optical assembly 180A includes the first image display (e.g., a display matrix 170A of FIG. 2B; or optical strips 155A-N' and a projector 150A of FIG. 2C). The second optical assembly 180B includes the second image display e.g., a display matrix 170B of FIG. 2B; or optical strips 155A-N" and a projector 150B of FIG. 2C).

Figure 3:
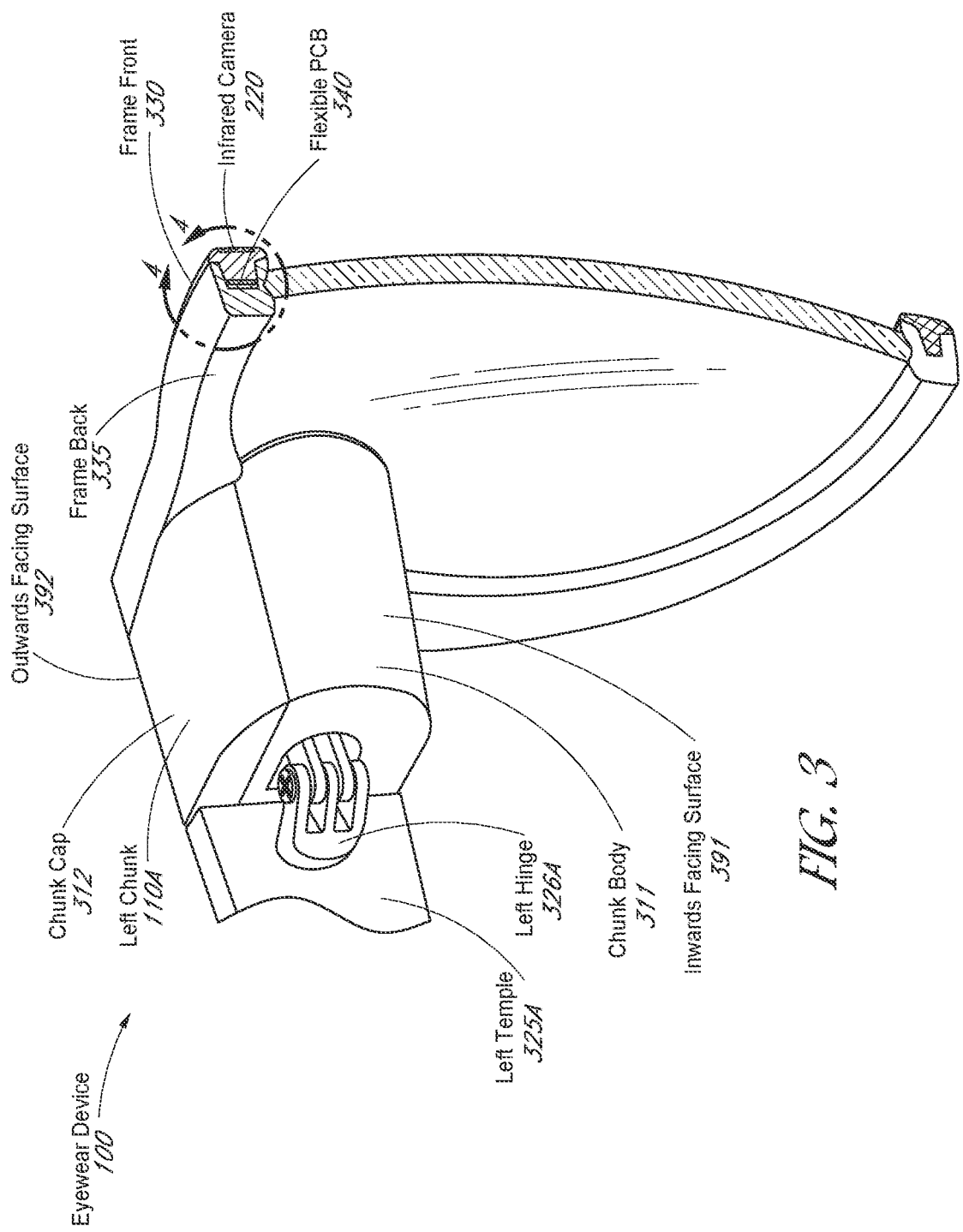
FIG. 3 shows a rear perspective sectional view of the eyewear device of FIG. 2A depicting an infrared camera of the depth sensor, a frame front, a frame back, and a circuit board.

FIG. 3 shows a rear perspective sectional view of the eyewear device of FIG. 2A depicting an infrared camera 220, a frame front 330, a frame back 335, and a circuit board. It can be seen that the upper portion of the left rim 107A of the frame 105 of the eyewear device 100 includes a frame front 330 and a frame back 335. The frame front 330 includes a front-facing side configured to face outwards away from the eye of the user. The frame back 335 includes a rear-facing side configured to face inwards towards the eye of the user. An opening for the infrared camera 220 is formed on the frame front 330.

As shown in the encircled cross-section 4-4 of the upper middle portion of the left rim 107A of the frame 105, a circuit board, which is a flexible printed circuit board (PCB) 340, is sandwiched between the frame front 330 and the frame back 335. Also shown in further detail is the attachment of the left chunk 110A to the left temple 325A via a left hinge 326A. In some examples, components of the depth sensor 213, including the infrared camera 220, the flexible PCB 340, or other electrical connectors or contacts may be located on the left temple 325A or the left hinge 326A.

In an example, the left chunk 110A includes a chunk body 311, a chunk cap 312, an inwards facing surface 391 and an outwards facing surface 392 (labeled, but not visible). Disposed inside the left chunk 110A are various interconnected circuit boards, such as PCBs or flexible PCBs, which include controller circuits for charging a battery, inwards facing light emitting diodes (LEDs), and outwards (forward) facing LEDs. Although shown as being formed on the circuit boards of the left rim 107A, the depth sensor 213, including the infrared emitter 215 and the infrared camera 220, can be formed on the circuit boards of the right rim 107B to captured infrared images utilized in the generation of three-dimensional depth images of depth videos, for example, in combination with right visible light camera 114B.

Figure 4:
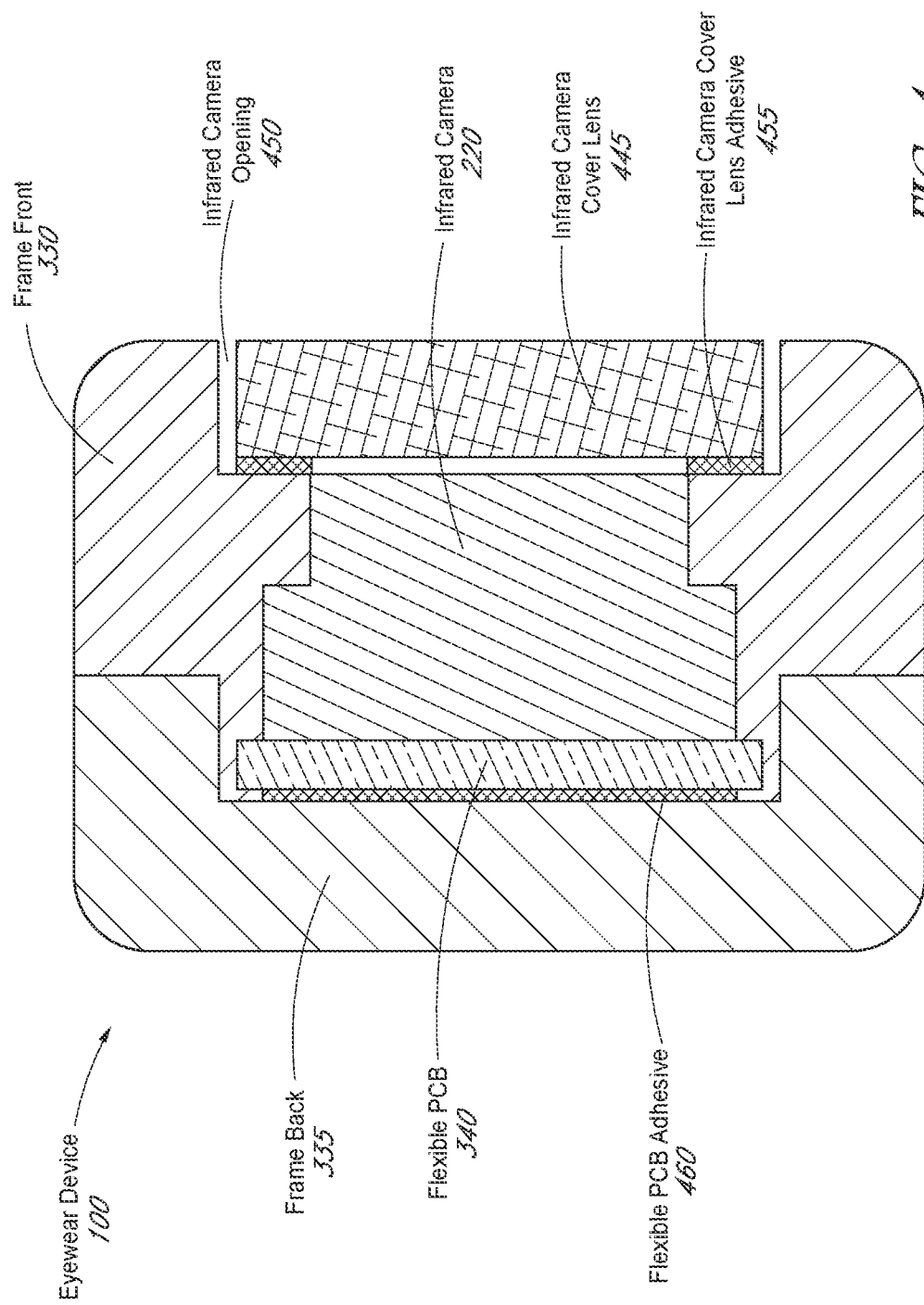
FIG. 4 is a cross-sectional view taken through the infrared camera and the frame of the eyewear device of FIG. 3.

FIG. 4 is a cross-sectional view through the infrared camera 220 and the frame corresponding to the encircled cross-section 4-4 of the eyewear device of FIG. 3. Various layers of the eyewear device 100 are visible in the cross-section of FIG. 4. As shown, the flexible PCB 340 is disposed on the frame back 335 and connected to the frame front 330. The infrared camera 220 is disposed on the flexible PCB 340 and covered by an infrared camera cover lens 445. For example, the infrared camera 220 is reflowed to the back of the flexible PCB 340. Reflowing attaches the infrared camera 220 to electrical contact pad(s) formed on the back of the flexible PCB 340 by subjecting the flexible PCB 340 to controlled heat which melts a solder paste to connect the two components. In one example, reflowing is used to surface mount the infrared camera 220 on the flexible PCB 340 and electrically connect the two components. However, it should be understood that through-holes can be used to connect leads from the infrared camera 220 to the flexible PCB 340 via interconnects, for example.

The frame front 330 includes an infrared camera opening 450 for the infrared camera cover lens 445. The infrared camera opening 450 is formed on a front-facing side of the frame front 330 that is configured to face outwards away from the eye of the user and towards a scene being observed by the user. In the example, the flexible PCB 340 can be connected to the frame back 335 via a flexible PCB adhesive 460. The infrared camera cover lens 445 can be connected to the frame front 330 via infrared camera cover lens adhesive 455. The connection can be indirect via intervening components.

Figure 5:
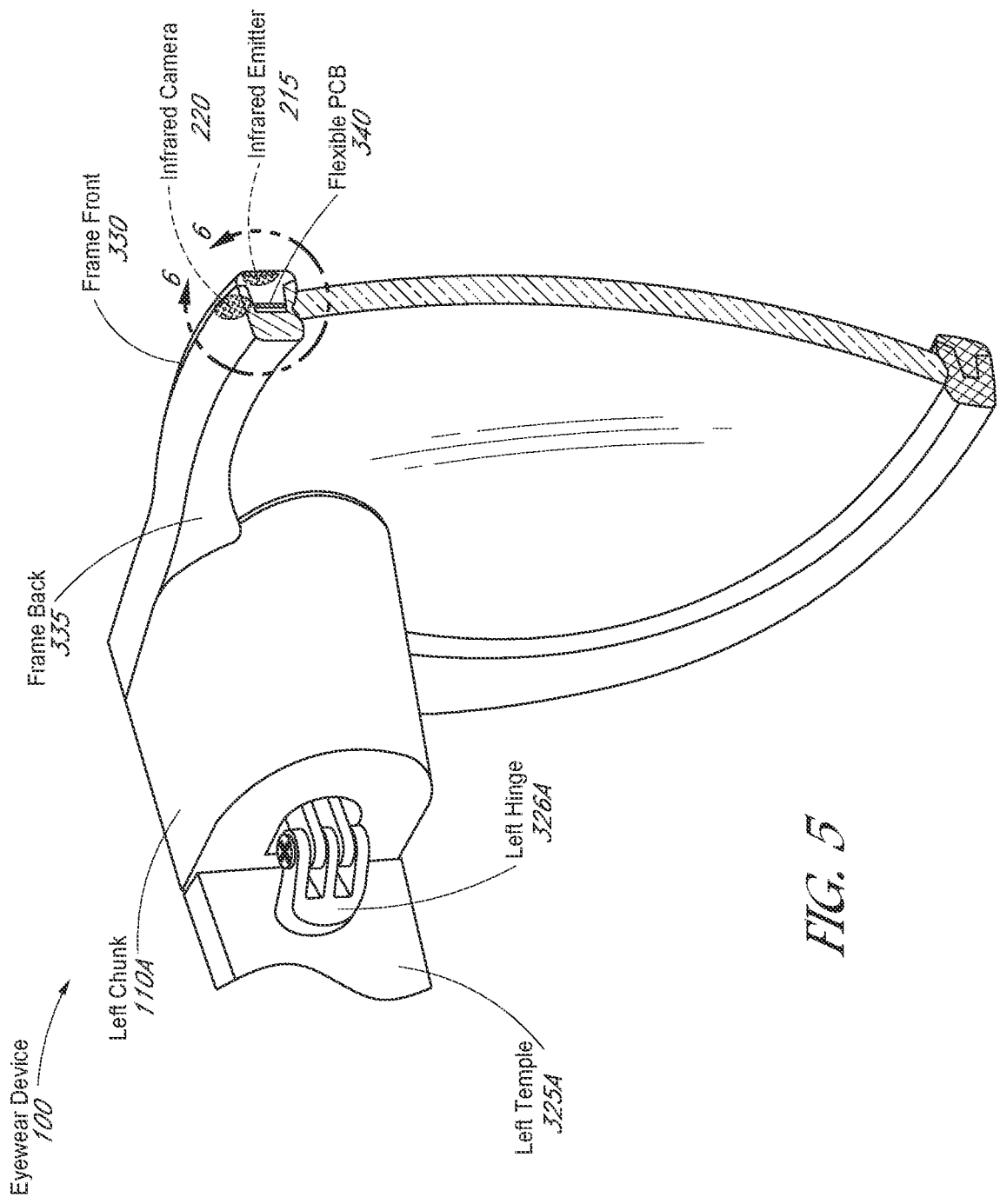
FIG. 5 shows a rear perspective view of the eyewear device of FIG. 2A depicting an infrared emitter of the depth sensor, the infrared camera of the depth sensor, the frame front, the frame back, and the circuit board.

FIG. 5 shows a rear perspective view of the eyewear device of FIG. 2A. The eyewear device 100 includes an infrared emitter 215, infrared camera 220, a frame front 330, a frame back 335, and a circuit board 340. As in FIG. 3, it can be seen in FIG. 5 that the upper portion of the left rim of the frame of the eyewear device 100 includes the frame front 330 and the frame back 335. An opening for the infrared emitter 215 is formed on the frame front 330.

As shown in the encircled cross-section 6-6 in the upper middle portion of the left rim of the frame, a circuit board, which is a flexible PCB 340, is sandwiched between the frame front 330 and the frame back 335. Also shown in further detail is the attachment of the left chunk 110A to the left temple 325A via the left hinge 326A. In some examples, components of the depth sensor 213, including the infrared emitter 215, the flexible PCB 340, or other electrical connectors or contacts may be located on the left temple 325A or the left hinge 326A.

Figure 6:
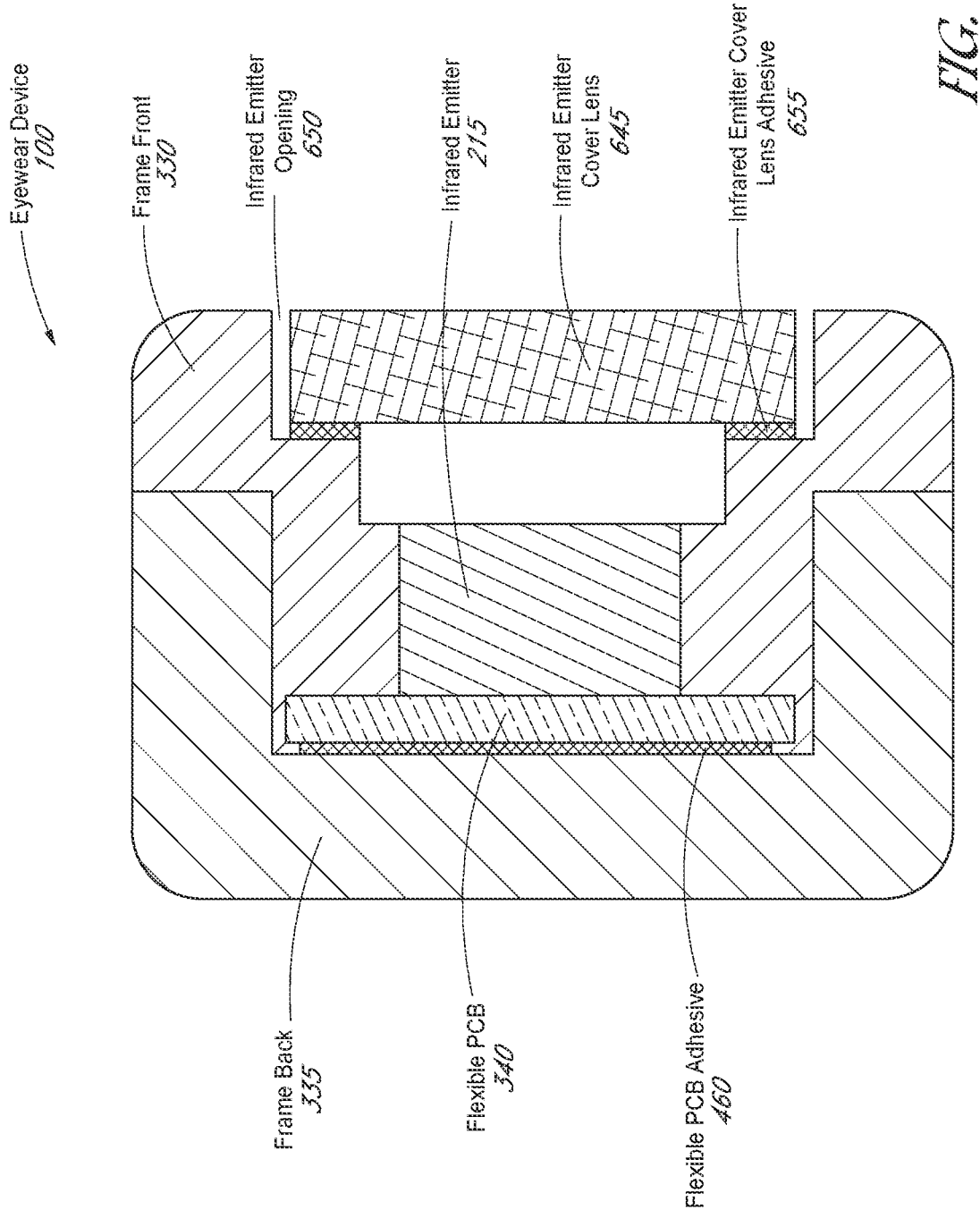
FIG. 6 is a cross-sectional view taken through the infrared emitter and the frame of the eyewear device of FIG. 5.

FIG. 6 is a cross-sectional view through the infrared emitter 215 and the frame corresponding to the encircled cross-section 6-6 of the eyewear device of FIG. 5. Multiple layers of the eyewear device 100 are illustrated in the cross-section of FIG. 6, as shown the frame 105 includes the frame front 330 and the frame back 335. The flexible PCB 340 is disposed on the frame back 335 and connected to the frame front 330. The infrared emitter 215 is disposed on the flexible PCB 340 and covered by an infrared emitter cover lens 645. For example, the infrared emitter 215 is reflowed to the back of the flexible PCB 340. Reflowing attaches the infrared emitter 215 to contact pad(s) formed on the back of the flexible PCB 340 by subjecting the flexible PCB 340 to controlled heat which melts a solder paste to connect the two components. In one example, reflowing is used to surface mount the infrared emitter 215 on the flexible PCB 340 and electrically connect the two components. However, it should be understood that through-holes can be used to connect leads from the infrared emitter 215 to the flexible PCB 340 via interconnects, for example.

The frame front 330 includes an infrared emitter opening 650 for the infrared emitter cover lens 645. The infrared emitter opening 650 is formed on a front-facing side of the frame front 330 that is configured to face outwards away from the eye of the user and towards a scene being observed by the user. In the example, the flexible PCB 340 can be connected to the frame back 335 via the flexible PCB adhesive 460. The infrared emitter cover lens 645 can be connected to the frame front 330 via infrared emitter cover lens adhesive 655. The coupling can also be indirect via intervening components.

FIG. 7 depicts an example of an emitted pattern of infrared light 781 emitted by an infrared emitter 215 of the depth sensor 213. As shown, reflection variations of the emitted pattern of infrared light 782 are captured by the infrared camera 220 of the depth sensor 213 of the eyewear device 100 as an infrared image. The reflection variations of the emitted pattern of infrared light 782 is utilized to measure depth of pixels in a raw image (e.g., left raw image) to generate three-dimensional depth images, such as the initial depth images of a sequence of initial depth images (e.g., in an initial video).

Depth sensor 213 in the example includes the infrared emitter 215 to project a pattern of infrared light and the infrared camera 220 to capture infrared images of distortions of the projected infrared light by objects or object features in a space, shown as scene 715 being observed by the wearer of the eyewear device 100. The infrared emitter 215, for example, may blast infrared light 781 which falls on objects or object features within the scene 715 like a sea of dots. In some examples, the infrared light is emitted as a line pattern, a spiral, or a pattern of concentric rings or the like. Infrared light is typically not visible to the human eye. The infrared camera 220 is similar to a standard red, green, and blue (RGB) camera but receives and captures images of light in the infrared wavelength range. For depth sensing, the infrared camera 220 is coupled to an image processor (element 912 of FIG. 9) and the shockwave creation programming (element 945) that judge time of flight based on the captured infrared image of the infrared light. For example, the distorted dot pattern 782 in the captured infrared image can then be processed by an image processor to determine depth from the displacement of dots. Typically, nearby objects or object features have a pattern with dots spread further apart and far away objects have a denser dot pattern. It should be understood that the foregoing functionality can be embodied in programming instructions of shockwave creation programming or application (element 945) found in one or more components of the system.

Figure 8A:
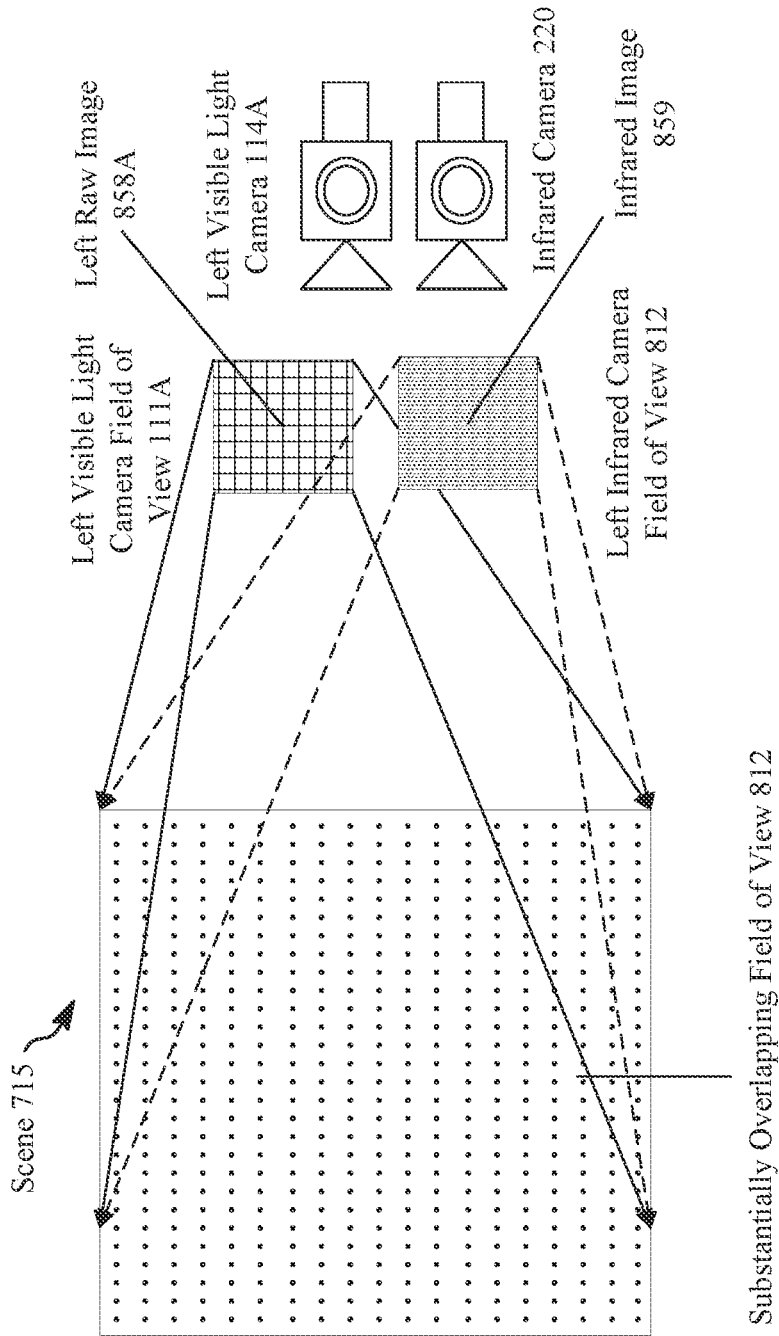
FIG. 8A depicts an example of infrared light captured by the infrared camera of the depth sensor as an infrared image and visible light captured by a visible light camera as a raw image to generate the initial depth image of a three-dimensional scene.

FIG. 8A depicts an example of infrared light captured by the infrared camera 220 of the depth sensor 213 with a left infrared camera field of view 812. Infrared camera 220 captures reflection variations in the emitted pattern of infrared light 782 in the three-dimensional scene 715 as an infrared image 859. As further shown, visible light is captured by the left visible light camera 114A with a left visible light camera field of view 111A as a left raw image 858A. Based on the infrared image 859 and left raw image 858A, the three-dimensional initial depth image of the three-dimensional scene 715 is generated.

Figure 8B:
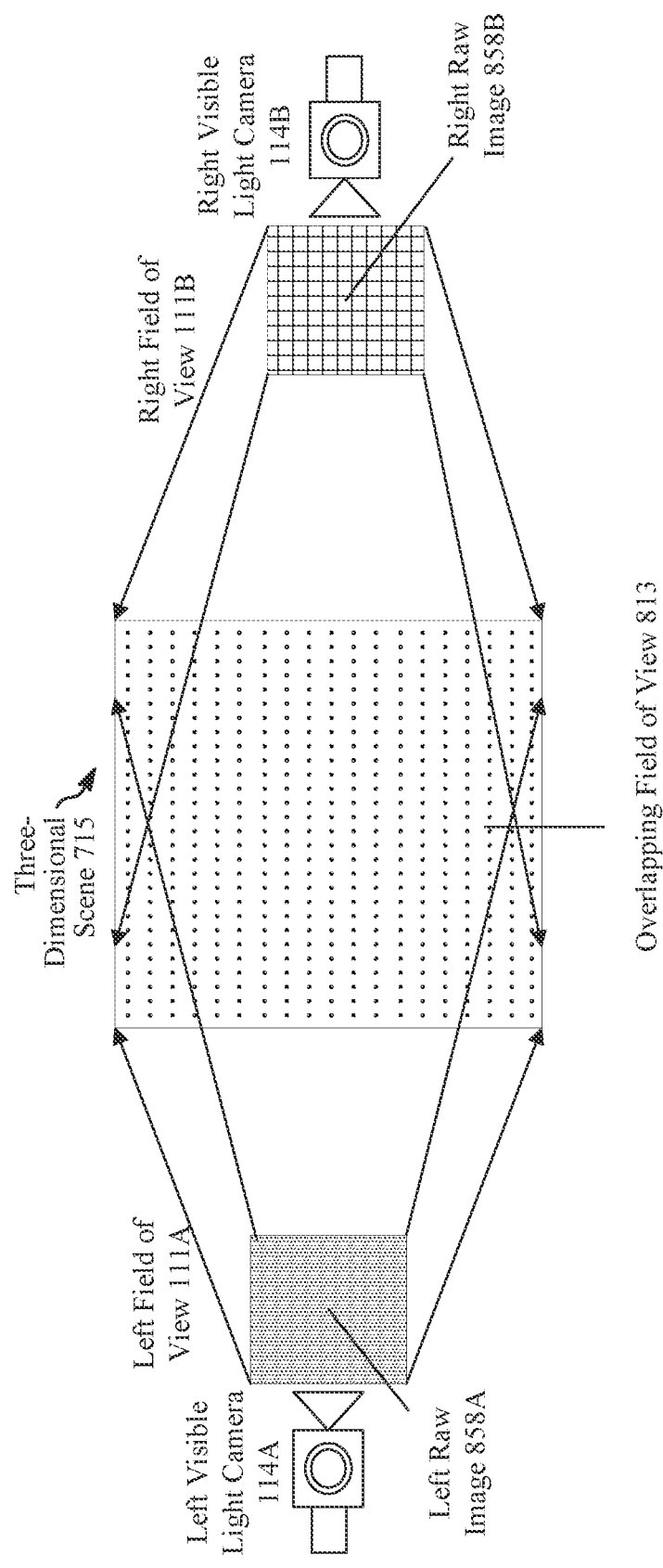
FIG. 8B depicts an example of visible light captured by the left visible light camera as left raw image and visible light captured by the right visible light camera as a right raw image to generate the initial depth image of a three-dimensional scene.

FIG. 8B depicts an example of visible light captured by the left visible light camera 114A and visible light captured with a right visible light camera 114B. Visible light is captured by the left visible light camera 114A with a left visible light camera field of view 111A as a left raw image 858A. Visible light is captured by the right visible light camera 114B with a right visible light camera field of view 111B as a right raw image 858B. Based on the left raw image 858A and the right raw image 858B, the three-dimensional initial depth image of the three-dimensional scene 715 is generated.

Figure 9:
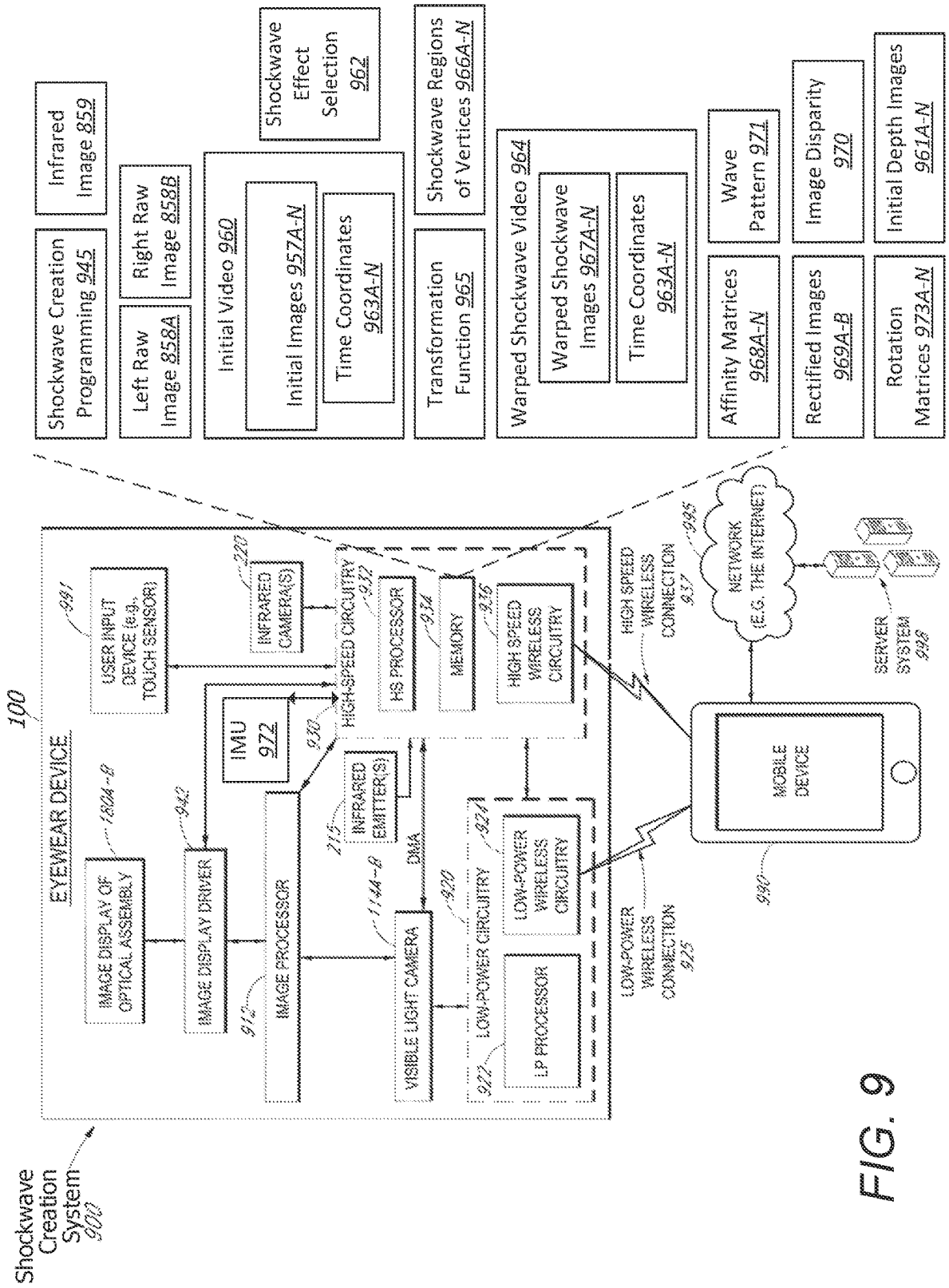
FIG. 9 is a high-level functional block diagram of an example virtual shockwave creation system including the eyewear device with a depth-capturing camera to generate the initial depth images (e.g., in the initial video) and a user input device (e.g., touch sensor), a mobile device, and a server system connected via various networks.

FIG. 9 is a high-level functional block diagram of an example virtual shockwave creation system 900, which includes a wearable device (e.g., the eyewear device 100), a mobile device 990, and a server system 998 connected via various networks. Eyewear device 100 includes a depth-capturing camera, such as at least one of the visible light cameras 114A-B; and the depth sensor 213, shown as infrared emitter 215 and infrared camera 220. The depth-capturing camera can alternatively include at least two visible light cameras 114A-B (one associated with the left lateral side 170A and one associated with the right lateral side 170B). Depth-capturing camera generates initial depth images 961A-N of initial video 960, which are rendered three-dimensional (3D) models that are texture mapped images of red, green, and blue (RGB) imaged scenes.

Mobile device 990 may be a smartphone, tablet, laptop computer, access point, or any other such device capable of connecting with eyewear device 100 using both a low-power wireless connection 925 and a high-speed wireless connection 937. Mobile device 990 is connected to server system 998 and network 995. The network 995 may include any combination of wired and wireless connections.

Eyewear device 100 further includes two image displays of the optical assembly 180A-B (one associated with the left lateral side 170A and one associated with the right lateral side 170B). Eyewear device 100 also includes image display driver 942, image processor 912, low-power circuitry 920, and high-speed circuitry 930. Image display of optical assembly 180A-B are for presenting images and videos, which can include a sequence of depth images, such as the initial depth images 961A-N from the initial video 960. Image display driver 942 is coupled to the image display of optical assembly 180A-B to control the image display of optical assembly 180A-B to present the video including images, such as, for example, the initial depth images 961A-N of initial video 960 and warped shockwave images 967A-N of warped shockwave video 964. Eyewear device 100 further includes a user input device 991 (e.g., touch sensor) to receive a shockwave effect selection from a user to apply shockwaves to the presented initial video 960.

The components shown in FIG. 9 for the eyewear device 100 are located on one or more circuit boards, for example a PCB or flexible PCB, in the rims or temples. Alternatively, or additionally, the depicted components can be located in the chunks, frames, hinges, or bridge of the eyewear device 100. Left and right visible light cameras 114A-B can include digital camera elements such as a complementary metal-oxide-semiconductor (CMOS) image sensor, charge coupled device, a lens, or any other respective visible or light capturing elements that may be used to capture data, including images of scenes with unknown objects.

Eyewear device includes 100 includes a memory 934 which includes shockwave creation programming 945 to perform a subset or all of the functions described herein for shockwave creation, in which a shockwave effect selection from a user is applied to initial depth images 961A-N to generate warped shockwave images 967A-N. As shown, memory 934 further includes a left raw image 858A captured by left visible light camera 114A, a right raw image 858B captured by right visible light camera 114B, and an infrared image 859 captured by infrared camera 220 of the depth sensor 213.

As shown, eyewear device 100 includes an orientation sensor, which includes, for example, an inertial measurement unit (IMU) 972 as depicted. Generally, an inertial measurement unit 972 is an electronic device that measures and reports a body's specific force, angular rate, and sometimes the magnetic field surrounding the body, using a combination of accelerometers and gyroscopes, sometimes also magnetometers. In this example, the inertial measurement unit 972 determines a head orientation of a wearer of the eyewear device 100 which correlates to a camera orientation of the depth-capturing camera of the eyewear device 100 when the associated depth image is captured, which is utilized in transforming a respective shockwave region of vertices 966A-N, as explained below. The inertial measurement unit 972 works by detecting linear acceleration using one or more accelerometers and rotational rate using one or more gyroscopes. Typical configurations of inertial measurement units contain one accelerometer, gyro, and magnetometer per axis for each of the three axes: horizontal axis for left-right movement (X), vertical axis (Y) for top-bottom movement, and depth or distance axis for up-down movement (Z). The gyroscope detects the gravity vector. The magnetometer defines the rotation in the magnetic field (e.g., facing south, north, etc.) like a compass which generates a heading reference. The three accelerometers detect acceleration along the horizontal (X), vertical (Y), and depth (Z) axes defined above, which can be defined relative to the ground, the eyewear device 100, the depth-capturing camera, or the user wearing the eyewear device 100.

Memory 934 includes head orientation measurements which correspond to principal axes measurements on the horizontal axis (X axis), vertical axis (Y axis), and depth or distance axis (Z axis) as tracked (e.g., measured) by the inertial measurement unit 972. The head orientation measurements are utilized to determine alignment of the depth-capturing camera, which can be used to identify a floor plane of the initial depth images 961A-N. In certain applications of IMUs, the principal axes are referred to as pitch, roll, and yaw axes. Shockwave creation programming 945 is configured to perform the functions described herein utilizing the inertial measurement unit 972.

Figure 11:
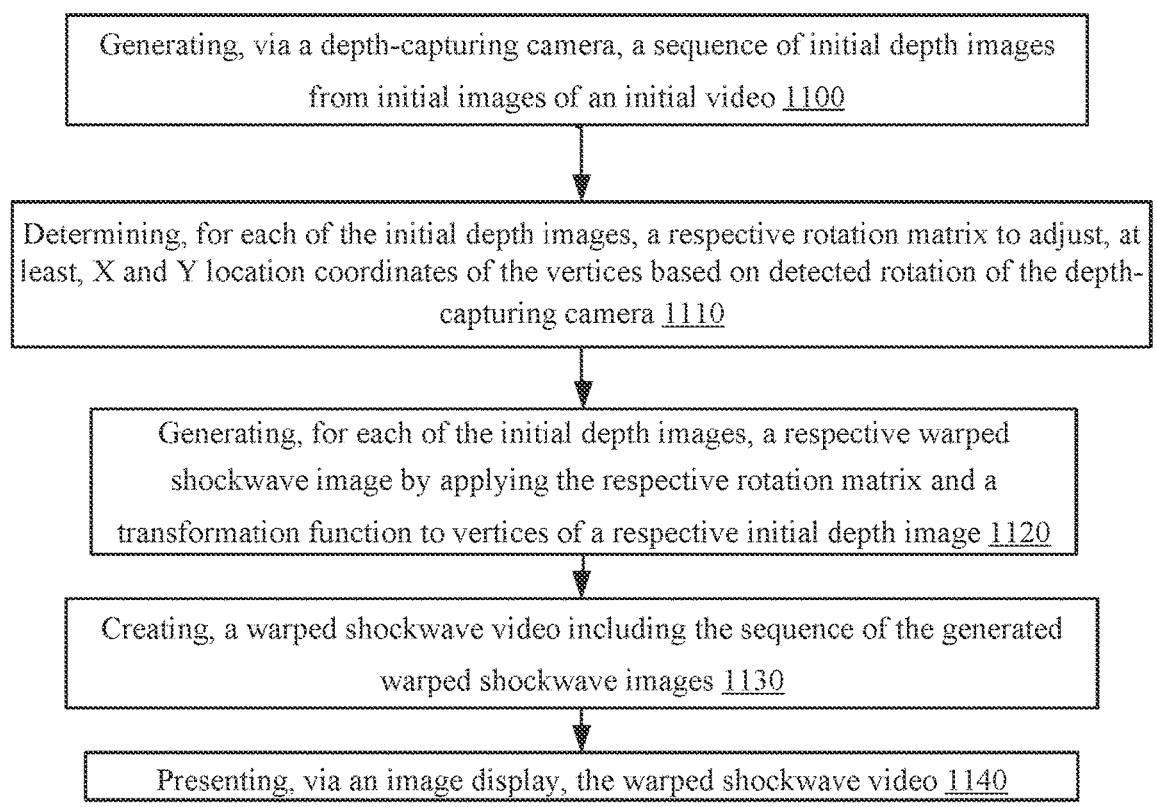
FIG. 11 is a flowchart of a method that can be implemented in the virtual shockwave creation system to apply shockwaves to the initial depth images from the initial video to generate the warped shockwave images to create the warped shockwave video

Memory 934 further includes multiple initial depth images 961A-N, which are generated, via the depth-capturing camera. Memory 934 further includes an initial video 960 which includes a sequence of the initial depth images 961A-N and associated time coordinates 963A-N. A flowchart outlining functions which can be implemented in the shockwave creation programming 945 is shown in FIG. 11. Memory 934 further includes a shockwave effect selection 962 received by the user input device 991, which is user input indicating that application of the shockwave effect on the initial video 960 is desired. In some examples, the shockwave effect selection 962 may impact the strength or degree to which the shockwaves imparted on the initial video 960 warp the initial depth images 961A-N (e.g., by adjusting the amplitude or frequency of the shockwaves). Memory 934 further includes transformation matrices 965, shockwave regions of vertices 966A-N, affinity matrices 968A-N, wave pattern 971, left and right rectified images 969A-B (e.g., to remove vignetting towards the end of the lens), and an image disparity 970, all of which are generated during image processing of the initial depth images 961A-N from the initial video 960 to generate respective warped shockwave images 967A-N of the warped shockwave video 964.

As shown in FIG. 9, high-speed circuitry 930 includes high-speed processor 932, memory 934, and high-speed wireless circuitry 936. In the example, the image display driver 942 is coupled to the high-speed circuitry 930 and operated by the high-speed processor 932 in order to drive the left and right image displays of the optical assembly 180A-B. High-speed processor 932 may be any processor capable of managing high-speed communications and operation of any general computing system needed for eyewear device 100. High-speed processor 932 includes processing resources needed for managing high-speed data transfers on high-speed wireless connection 937 to a wireless local area network (WLAN) using high-speed wireless circuitry 936. In certain embodiments, the high-speed processor 932 executes an operating system such as a LINUX operating system or other such operating system of the eyewear device 100 and the operating system is stored in memory 934 for execution. In addition to any other responsibilities, the high-speed processor 932 executing a software architecture for the eyewear device 100 is used to manage data transfers with high-speed wireless circuitry 936. In certain embodiments, high-speed wireless circuitry 936 is configured to implement Institute of Electrical and Electronic Engineers (IEEE) 802.11 communication standards, also referred to herein as Wi-Fi. In other embodiments, other high-speed communications standards may be implemented by high-speed wireless circuitry 936.

Low-power wireless circuitry 924 and the high-speed wireless circuitry 936 of the eyewear device 100 can include short range transceivers (Bluetooth™) and wireless wide, local, or wide area network transceivers (e.g., cellular or WiFi). Mobile device 990, including the transceivers communicating via the low-power wireless connection 925 and high-speed wireless connection 937, may be implemented using details of the architecture of the eyewear device 100, as can other elements of network 995.

Memory 934 includes any storage device capable of storing various data and applications, including, among other things, camera data generated by the left and right visible light cameras 114A-B, infrared camera 220, and the image processor 912, as well as images and videos generated for display by the image display driver 942 on the image displays of the optical assembly 180A-B. While memory 934 is shown as integrated with high-speed circuitry 930, in other embodiments, memory 934 may be an independent standalone element of the eyewear device 100. In certain such embodiments, electrical routing lines may provide a connection through a chip that includes the high-speed processor 932 from the image processor 912 or low-power processor 922 to the memory 934. In other embodiments, the high-speed processor 932 may manage addressing of memory 934 such that the low-power processor 922 will boot the high-speed processor 932 any time that a read or write operation involving memory 934 is needed.

Figure 10:
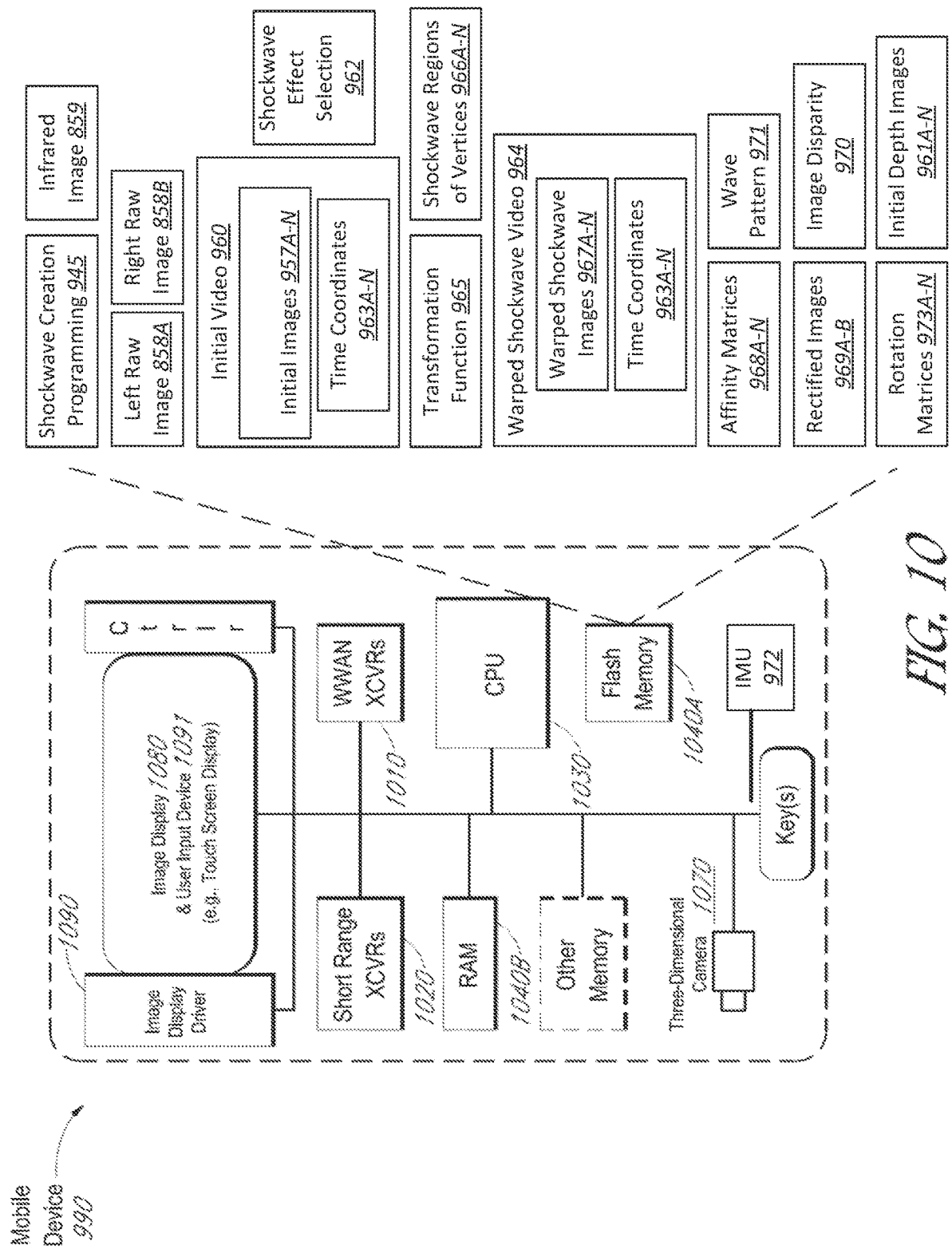
FIG. 10 shows an example of a hardware configuration for the mobile device of the virtual shockwave creation system of FIG. 9, which includes a user input device (e.g., touch screen device) to receive the shockwave effect selection to apply to the initial depth images to generate warped shockwave images (e.g., in the warped shockwave video).

As shown in FIG. 9, the processor 932 of the eyewear device 100 can be coupled to the depth-capturing camera (visible light cameras 114A-B; or visible light camera 114A, infrared emitter 215, and infrared camera 220), the image display driver 942, the user input device 991, and the memory 934. As shown in FIG. 10, the processor 1030 of the mobile device 990 can be coupled to the depth-capturing camera 1070, the image display driver 1090, the user input device 1091, and the memory 1040A. Eyewear device 100 can perform all or a subset of any of the following functions described below as a result of the execution of the shockwave creation programming 945 in the memory 934 by the processor 932 of the eyewear device 100. Mobile device 990 can perform all or a subset of any of the following functions described below as a result of the execution of the shockwave creation programming 945 in the memory 1040A by the processor 1030 of the mobile device 990. Functions can be divided in the virtual shockwave creation system 900, such that the eyewear device 100 generates the initial depth images 961A-N from the initial video 960, but the mobile device 990 performs the remainder of the image processing on the initial depth images 961A-N from the initial video 960 to generate the warped shockwave images 967A-N of the warped shockwave video 964.

Execution of the shockwave creation programming 945 by the processor 932, 1030 configures the virtual shockwave creation system 900 to perform functions, including functions to generate, via the depth-capturing camera, initial depth images 961A-N based on initial images 957A-N from the initial video 960. Each of the initial depth images 961A-N is associated with a time coordinate on a time (T) axis for a presentation time, based on, for example, initial images 957A-N, in the initial video 960. Each of the initial depth images 961A-N is formed of a matrix of vertices. Each vertex represents a pixel in a three-dimensional scene 715. Each vertex has a position attribute. The position attribute of each vertex is based on a three-dimensional location coordinate system and includes an X location coordinate on an X axis for horizontal position, a Y location coordinate on a Y axis for vertical position, and a Z location coordinate on a Z axis for a depth position. Each vertex further includes one or more of a color attribute, a texture attribute, or a reflectance attribute.

Virtual shockwave creation system 900 presents, via the image display 180A-B, 1080 the initial video 960. Eyewear device 100 receives, via the user input device 991, 1091, a shockwave effect selection from the user to apply shockwaves to the presented initial video 960. Virtual shockwave creation system 900 receives, via the user input device 991, 1091, the shockwave effect selection 962 from the user to apply shockwaves to the presented initial video 960.

In response to receiving the shockwave effect selection 962, based on, at least, the associated time coordinate 963A-N of each of the initial depth images 961A-N, virtual shockwave creation system 900 applies to vertices of each of the initial depth images 961A-N, a respective transformation function 965. The transformation function 965 transforms a respective shockwave region of vertices 966A-N grouped together along the Z axis based on, at least, the associated time coordinate 963A-N of a respective initial depth image 961A-N. The transformation function 965 moves a respective Y location coordinate of vertices in the respective shockwave region of vertices 966A-N vertically upwards or downwards on the Y axis. Applying the transformation function creates a new modified set of vertices or a three-dimensional image without a depth map Virtual shockwave creation system 900 generates, for each of the initial depth images 961A-N, a respective shockwave depth image 967A-N by applying the transformation function 965 to the respective initial depth image 961A-N. The function of applying the respective transformation function 965 to the respective initial depth image 961A-N can include multiplying each vertex in the respective shockwave region of vertices 966A-N of the respective initial depth image 961A-N by the transformation function 965 to obtain a new Y location coordinate on the three-dimensional location coordinate system.

Virtual shockwave creation system 900 creates, a warped shockwave video 964 including the sequence of the generated warped shockwave images 967A-N. Virtual shockwave creation system 900 presents, via the image display 180A-B, 1080, the warped shockwave video 964. The function of presenting via the image display 180A-B, 1080, the warped shockwave video 964 including the sequence of the generated warped shockwave images 967A-N presents an appearance of a rolling wave radially from the depth-capturing camera, radially from an object emitting a shockwave, or along the Z axis of the warped shockwave images 967A-N of the warped shockwave video 964.

In one example of the virtual shockwave creation system 900, the processor comprises a first processor 932 and a second processor 1030. The memory comprises a first memory 934 and a second memory 1040A. The eyewear device 100 includes a first network communication 924 or 936 interface for communication over a network 925 or 937 (e.g., a wireless short-range network or a wireless local area network), the first processor 932 coupled to the first network communication interface 924 or 936, and the first memory 934 accessible to the first processor 932. Eyewear device 100 further includes shockwave creation programming 945 in the first memory 934. Execution of the shockwave creation programming 945 by the first processor 932 configures the eyewear device 100 to perform the function to generate, via the depth-capturing camera, the initial depth images 961A-N from the initial video 960 and associated time coordinates 963A-N.

The virtual shockwave creation system 900 further comprises a host computer, such as the mobile device 990, coupled to the eyewear device 100 over the network 925 or 937. The host computer includes a second network communication interface 1010 or 1020 for communication over the network 925 or 937, the second processor 1030 coupled to the second network communication interface 1010 or 1020, and the second memory 1040A accessible to the second processor 1030. Host computer further includes shockwave creation programming 945 in the second memory 1040A.

Execution of the shockwave creation programming 945 by the second processor 1030 configures the host computer to perform the functions to receive, via the second network communication interface 1010 or 1020, the initial video 960 over the network from the eyewear device 100. Execution of the shockwave creation programming 945 by the second processor 1030 configures the host computer to present, via the image display 1080, the initial video 960. Execution of the shockwave creation programming 945 by the second processor 1030 configures the host computer to receive, via the user input device 1091 (e.g., touch screen or a computer mouse), the shockwave effect selection 962 from the user to apply shockwaves to the presented initial video 960. Execution of the shockwave creation programming 945 by the second processor 1030 configures the host computer to in response to receiving the shockwave effect selection 962, based on, at least, the associated time coordinate 963A-N of each of the initial depth images 961A-N, 965 generate, for each of the initial depth images 961A-N, the respective shockwave depth image 967A-N by applying the transformation function 965 to vertices of the respective initial depth image 961A-N based on, at least, the Y and Z location coordinates and the associated time coordinate 963A-N. Execution of the shockwave creation programming 945 by the second processor 1030 configures the host computer to create, the warped shockwave video 964 including the sequence of the generated warped shockwave images 967A-N. Execution of the shockwave creation programming 945 by the second processor 1030 configures the host computer to present, via the image display 1080, the warped shockwave video 964.

In the example, the eyewear device 100 further includes an inertial measurement unit 972. Execution of the programming by the processor configures the virtual shockwave creation system 900 to perform the following functions. Measure, via the inertial measurement unit 972, a rotation of the eyewear device 100 during capture of the initial depth images 961A-N by the depth-capturing camera. For each of the initial depth images 961A-N, determine a respective rotation matrix 973A-N to adjust X, Y, and Z location coordinates of the vertices based on the measured rotation of the eyewear device 100 during capture. The respective warped shockwave 967A-N is generated by applying the rotation matrix 973A-N to vertices of the respective initial depth image 961A-N and then applying the transformation function 965.

In one example, applying the transformation function 965 to each initial depth image moves the respective Y location coordinate of vertices in the respective shockwave region of vertices 966A-N vertically upwards or downwards on the Y axis to vertically fluctuate or oscillate the respective shockwave region of vertices 966A-N. The function of generating, for each of the initial depth images 961A-N, the respective shockwave depth image 967A-N by applying the transformation function 965 to the respective initial depth image 961A-N vertically fluctuates or oscillates the respective shockwave region of vertices 966A-N and stores the respective initial depth image 961A-N with the vertical fluctuations or oscillations as the respective shockwave depth image 967A-N.

In some examples, the transformation function 965 moves the respective Y location coordinate of vertices in the respective shockwave region of vertices 966A-N vertically upwards or downwards based on a wave pattern 971. The wave pattern 971 provides an appearance of a rolling wave radially from the depth-capturing camera, radially from an object emitting a shockwave, or along the Z axis of the warped shockwave images 967A-N of the warped shockwave video 964. This can provide a visual effect that The Incredible Hulk® is moving around the scenes of the warped shockwave images 967A-N of the warped shockwave video 964 by manifesting itself with the ground shaking as in an earthquake. Each initial depth image 961A-N includes a starting depth position on the Z axis corresponding to a minimum depth of the respective initial depth image 961A-N and an ending depth position on the Z axis having a maximum depth of the respective initial depth image 961A-N. The function of transforming the respective shockwave region of vertices 966A-N along the Z axis based on, at least, the associated time coordinate 963A-N of the respective initial depth image 961A-N further includes the following functions. For each of the sequence of the initial depth images 961A-N, iteratively transforming the respective shockwave region of vertices 966A-N along the Z axis based on progression of the associated time coordinate 963A-N from the starting depth position to the ending depth position. In response to reaching the ending depth position of the Z axis or exceeding a restart time interval of the wave pattern 971, restarting the iterative selection of the respective shockwave region 966A-N at the starting depth position.

In an example, an earlier initial depth image 961A is associated with an earlier time coordinate 963A on the time (T) axis for an earlier presentation time in the initial video 960. An intermediate initial depth image 961B is associated with an intermediate time coordinate 963B on the time (T) axis for an intermediate presentation time after the earlier presentation time in the initial video 960. The function of transforming the respective shockwave region of vertices 966A-N along the Z axis based on, at least, the associated time coordinate 963A-N of the respective initial depth image 961A-N includes the following functions. Transforming a near range shockwave region of vertices 966A with nearer depth positions grouped contiguously together along the Z axis for the earlier initial depth image 961A based on the earlier time coordinate 963A. Transforming an intermediate range shockwave region of vertices 966B with intermediate depth positions grouped contiguously together along the Z axis for the intermediate initial depth image 961B based on the intermediate time coordinate. The near range shockwave region of vertices 966A is closer in depth along the Z axis than the intermediate range shockwave region of vertices 966B.

In the example, a later initial depth image 961C is associated with a later time coordinate 963C on the time (T) axis for a later presentation time after the intermediate presentation time of the intermediate initial depth image 961B in the initial video 960. The function of transforming the respective shockwave region of vertices 966A-N along the Z axis based on, at least, the associated time coordinate 963A-N of the respective initial depth image 961A-N further includes transforming a far range shockwave region of vertices 966C with farther depth positions grouped contiguously together along the Z axis for the later initial depth image 961C based on the later time coordinate 963C. The far range shockwave region of vertices 966C is farther in depth along the Z axis than the intermediate range shockwave region of vertices 966C.

If the transformation matrices 965 are applied to a single vertex, a spike or pinch will occur. In order to generate a smooth (curvy) warped shockwave images 967A-B, the affinity matrices 968A-N are computed as a region of influence. For example, a polygon with a specific width and length or a circle can be set with a specific radius. Then the amount or affinity of each vertex to the polygon or the center of the circle (like a segmentation) is computed (e.g., utilizing edge detection), so each vertex has a weight between zero and one as to how the vertex is influenced by the transformation function 965. Essentially each vertex moves according to this weight. If the weight is one, the vertex is transformed according to the transformation function 965. If the weight is zero, the vertex does not move. If the weight is one-half, the vertex will come halfway between the original position and the transformed position.

Hence, execution of the shockwave creation programming 945 by the processor 932, 1030 configures the virtual shockwave creation system 900 to perform functions, including functions to compute a respective affinity matrix 968A-N for the vertices of the respective initial depth image 961A-N that determines an influence weight of the transformation function 965 on each of the vertices in the respective shockwave region of vertices 966A-N. The influence weight is based on, at least, the vertical position of the vertex. The function of generating, for each of the initial depth images 961A-N, the respective shockwave depth image 967A-N by applying the transformation function 965 to the respective initial depth image 961A-N is further based on the computed respective affinity matrix 968A-N. The influence weight is greater as a height of the vertex relative to a floor plane of the respective initial depth image 961A-N decreases such that the transformation function 965 moves the Y location coordinate of the vertex vertically upwards on the Y axis to a greater extent. The influence weight is lower as the height of the vertex relative to the floor plane increases such that the transformation function 965 moves the Y location coordinate of the vertex vertically upwards on the Y axis to a lesser extent.

In an example, virtual shockwave creation system 900 further includes an inertial measurement unit 872 like that shown for the eyewear device 100 in FIG. 9 and the mobile device 990 in FIG. 10. The function of transforming the respective shockwave region of vertices 966A-N along the Z axis based on, least, the associated time coordinate 963A-N of the respective initial depth image 961A-N includes the following functions. Tracking, via the inertial measurement unit 972, a head orientation of a head of a wearer of the eyewear device 100. The wearer of the eyewear device 100 is the user that is actually creating the warped shockwave video 964 on a mobile device 990 or a different user that wore the eyewear device 100 when the initial video 960 was generated. Based on the head orientation, determining a floor plane of vertices which are contiguous along the Z axis of the respective initial depth image 961A-N. Transforming the respective shockwave region of vertices 966A-N based on, at least, the floor plane.

In the example, the function of tracking, via the inertial measurement unit 972, the head orientation of the head of the wearer includes the following functions. First, measuring, via the inertial measurement unit 972, the head orientation on the X axis, the Y axis, the Z axis, or the combination thereof. Second, in response to measuring the head orientation, determining a deviation angle of the depth-capturing camera on the X axis, the Y axis, the Z axis, or the combination thereof. Third, adjusting the floor plane of vertices based on the deviation angle, such as by re-orienting the vertices based on the deviation angle such that one axis, either the X axis, the Y axis, or the Z axis is perpendicular to the ground.

In one example, the depth-capturing camera of the eyewear device 100 includes the at least two visible light cameras comprised of a left visible light camera 114A with a left field of view 111A and a right visible light camera 114B with a right field of view 111B. The left field of view 111A and the right field of view 111B have an overlapping field of view 813 (see FIG. 8B). The depth-capturing camera 1070 of the mobile device 990 can be similarly structured.

Generating, via the depth-capturing camera, the initial video 960 including the sequence of initial depth images 961A-N and associated time coordinates 963A-N can include all or a subset of the following functions. First, capturing, via the left visible light camera 114A, a left raw image 858A that includes a left matrix of pixels. Second, capturing, via the right visible light camera 114B, a right raw image 858B that includes a right matrix of pixels. Third, creating a left rectified image 969A from the left raw image 858A and a right rectified image 969B from the right raw image 858B that align the left and right raw images 858A-B and remove distortion from a respective lens (e.g., at the edges of the lens from vignetting) of each of the left and right visible light cameras 114A-B. Fourth, extracting an image disparity 970 by correlating pixels in the left rectified image 969A with the right rectified image 969B to calculate a disparity for each of the correlated pixels. Fifth, calculating the Z location coordinate of vertices of the initial depth image 961A based on at least the extracted image disparity 970 for each of the correlated pixels. Sixth, ordering each of the generated initial depth images 961A-N in the sequence from the initial video 960 based on a timestamp that is captured when the left raw image 858A and the right raw image 858B are captured and setting an associated respective time coordinate 963A-N of the respective initial depth image 961A-N to the timestamp.

In an example, the depth-capturing camera of the eyewear device 100 includes the at least one visible light camera 114A and the depth sensor 213 (e.g., infrared emitter 215 and infrared camera 220). The at least one visible light camera 114A and the depth sensor 213 have a substantially overlapping field of view 812 (see FIG. 8A). The depth sensor 213 includes an infrared emitter 215 and an infrared camera 220. The infrared emitter 215 is connected to the frame 105 or the temple 125A-B to emit a pattern of infrared light. The infrared camera 220 is connected to the frame 105 or the temple 125A-B to capture reflection variations in the emitted pattern of infrared light. The depth-capturing camera 1070 of the mobile device 990 can be similarly structured.

Generating, via the depth-capturing camera, the initial depth image 961A can include all or a subset of the following functions. First, capturing, via the at least one visible light camera 114A, a raw image 858A. Second, emitting, via the infrared emitter 215, a pattern of infrared light 781 on a plurality of objects or object features located in a scene 715 that are reached by the emitted infrared light 781. Third, capturing, via the infrared camera 220, an infrared image 859 of reflection variations of the emitted pattern of infrared light 782 on the plurality of objects or object features. Fourth, computing a respective depth from the depth-capturing camera to the plurality of objects or object features, based on the infrared image 859 of reflection variations. Fifth, correlating objects or object features in the infrared image 859 of reflection variations with the raw image 858A. Sixth, calculating the Z location coordinate of vertices of the initial depth image 961A based on, at least, the computed respective depth.

In one example, the user input device 991, 1091 includes a touch sensor including an input surface and a sensor array that is coupled to the input surface to receive at least one finger contact inputted from a user. User input device 991, 1091 further includes a sensing circuit integrated into or connected to the touch sensor and connected to the processor 932, 1030. The sensing circuit is configured to measure voltage to track the at least one finger contact on the input surface. The function of receiving, via the user input device 991, 1091, the shockwave effect selection 962 from the user includes receiving, on the input surface of the touch sensor, the at least one finger contact inputted from the user.

A touch based user input device 991 can be integrated into the eyewear device 100. As noted above, eyewear device 100 includes a chunk 110A-B integrated into or connected to the frame 105 on the lateral side 170A-B of the eyewear device 100. The frame 105, the temple 125A-B, or the chunk 110A-B includes a circuit board that includes the touch sensor. The circuit board includes a flexible printed circuit board. The touch sensor is disposed on the flexible printed circuit board. The sensor array is a capacitive array or a resistive array. The capacitive array or the resistive array includes a grid that forms a two-dimensional rectangular coordinate system to track X and Y axes location coordinates.

Server system 998 may be one or more computing devices as part of a service or network computing system, for example, that include a processor, a memory, and network communication interface to communicate over the network 995 with the mobile device 990 and eyewear device 100. Eyewear device 100 is connected with a host computer. For example, the eyewear device 100 is paired with the mobile device 990 via the high-speed wireless connection 937 or connected to the server system 998 via the network 995.

Output components of the eyewear device 100 include visual components, such as the left and right image displays of optical assembly 180A-B as described in FIGS. 2B-C (e.g., a display such as a liquid crystal display (LCD), a plasma display panel (PDP), a light emitting diode (LED) display, a projector, or a waveguide). Left and right image displays of optical assembly 180A-B can present the initial video 960 including the sequence of initial depth images 961A-N and the warped shockwave images 967A-N of the warped shockwave video 964. The image displays of the optical assembly 180A-B are driven by the image display driver 942. Image display driver 942 is coupled to the image display to control the image display to present the initial video 960 and the warped shockwave video 964. The output components of the eyewear device 100 further include acoustic components (e.g., speakers), haptic components (e.g., a vibratory motor), other signal generators, and so forth. The input components of the eyewear device 100, the mobile device 990, and server system 998, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Eyewear device 100 may optionally include additional peripheral device elements. Such peripheral device elements may include biometric sensors, additional sensors, or display elements integrated with eyewear device 100. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 925 and 937 from the mobile device 990 via the low-power wireless circuitry 924 or high-speed wireless circuitry 936.

FIG. 10 is a high-level functional block diagram of an example of a mobile device 990 that communicates via the virtual shockwave creation system 900 of FIG. 9. Mobile device 990 includes a user input device 1091 to receive a shockwave effect selection 962 from a user to apply shockwaves to the initial depth images 961A-N of the presented initial video 960 to generate warped shockwave images 967A-N of the warped shockwave video 964.

Mobile device 990 includes a flash memory 1040A which includes shockwave creation programming 945 to perform all or a subset of the functions described herein for shockwave creation, in which a shockwave effect selection from a user is applied to an initial video 960 to create a warped shockwave video 964. As shown, memory 1040A further includes a left raw image 858A captured by left visible light camera 114A, a right raw image 858B captured by right visible light camera 114B, and an infrared image 859 captured by infrared camera 220 of the depth sensor 213. Mobile device 1090 can include a depth-capturing camera 1070 that comprises at least two visible light cameras (first and second visible light cameras with overlapping fields of view) or at least on visible light camera and a depth sensor with substantially overlapping fields of view like the eyewear device 100. When the mobile device 990 includes components like the eyewear device 100, such as the depth-capturing camera, the left raw image 858A, the right raw image 858B, and the infrared image 859 can be captured via the depth-capturing camera 1070 of the mobile device 990.

Memory 1040A further includes multiple initial depth images 961A-N, which are generated, via the depth-capturing camera of the eyewear device 100 or via the depth-capturing camera 1070 of the mobile device 990 itself. Memory 1040A further includes an initial video 960 which includes a sequence of the initial depth images 961A-N and associated time coordinates 963A-N. A flowchart outlining functions which can be implemented in the shockwave creation programming 945 is shown in FIG. 11. Memory 1040A further includes a shockwave effect selection 962 received by the user input device 1091, which is user input indicating that application of the shockwave effect on the initial video 960 is desired. In some examples, the shockwave effect selection 962 may impact the strength or degree to which the shockwaves imparted on the initial video 960 warp the initial depth images 961A-N (e.g., by adjusting the amplitude or frequency of the shockwaves). Memory 1040A further includes transformation matrices 965, shockwave regions of vertices 966A-N, affinity matrices 968A-N, wave pattern 971, left and right rectified images 969A-B (e.g., to remove vignetting towards the end of the lens), and an image disparity 970, all of which are generated during image processing of the initial depth images 961A-N from the initial video 960 to generate respective warped shockwave images 967A-N of the warped shockwave video 964.

As shown, the mobile device 990 includes an image display 1080, an image display driver 1090 to control the image display, and a user input device 1091 similar to the eyewear device 100. In the example of FIG. 10, the image display 1080 and user input device 1091 are integrated together into a touch screen display.

Examples of touch screen type mobile devices that may be used include (but are not limited to) a smart phone, a personal digital assistant (PDA), a tablet computer, a laptop computer, or other portable device. However, the structure and operation of the touch screen type devices is provided by way of example; and the subject technology as described herein is not intended to be limited thereto. For purposes of this discussion, FIG. 10 therefore provides block diagram illustrations of the example mobile device 990 having a touch screen display for displaying content and receiving user input as (or as part of) the user interface.

The activities that are the focus of discussions here typically involve data communications related to processing initial depth images 961A-N from the initial video 960 to generate warped shockwave images 967A-N in order to create the warped shockwave video 964 in the portable eyewear device 100 or the mobile device 990. As shown in FIG. 10, the mobile device 990 includes at least one digital transceiver (XCVR) 1010, shown as WWAN XCVRs, for digital wireless communications via a wide area wireless mobile communication network. The mobile device 990 also includes additional digital or analog transceivers, such as short range XCVRs 1020 for short-range network communication, such as via NFC, VLC, DECT, ZigBee, Bluetooth™, or WiFi. For example, short range XCVRs 1020 may take the form of any available two-way wireless local area network (WLAN) transceiver of a type that is compatible with one or more standard protocols of communication implemented in wireless local area networks, such as one of the Wi-Fi standards under IEEE 802.11 and WiMAX.

To generate location coordinates for positioning of the mobile device 990, the mobile device 990 can include a global positioning system (GPS) receiver. Alternatively, or additionally the mobile device 990 can utilize either or both the short range XCVRs 1020 and WWAN XCVRs 1010 for generating location coordinates for positioning. For example, cellular network, WiFi, or Bluetooth™ based positioning systems can generate very accurate location coordinates, particularly when used in combination. Such location coordinates can be transmitted to the eyewear device over one or more network connections via XCVRs 1010, 1020.

The transceivers 1010, 1020 (network communication interface) conforms to one or more of the various digital wireless communication standards utilized by modern mobile networks. Examples of WWAN transceivers 1010 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 1010, 1020 provide two-way wireless communication of information including digitized audio signals, still image and video signals, web page information for display as well as web related inputs, and various types of mobile message communications to/from the mobile device 990 for shockwave creation.

Several of these types of communications through the transceivers 1010, 1020 and a network, as discussed previously, relate to protocols and procedures in support of communications with the eyewear device 100 or the server system 998 for shockwave creation, such as transmitting left raw image 858A, right raw image 858B, infrared image 859, initial video 960, initial depth images 961A-N, time coordinates 963A-N, warped shockwave video 964, and warped shockwave images 967A-N. Such communications, for example, may transport packet data via the short range XCVRs 1020 over the wireless connections 925 and 937 to and from the eyewear device 100 as shown in FIG. 9. Such communications, for example, may also transport data utilizing IP packet data transport via the WWAN XCVRs 1010 over the network (e.g., Internet) 995 shown in FIG. 9. Both WWAN XCVRs 1010 and short range XCVRs 1020 connect through radio frequency (RF) send-and-receive amplifiers (not shown) to an associated antenna (not shown).

The mobile device 990 further includes a microprocessor, shown as CPU 1030, sometimes referred to herein as the host controller. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 1030, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU 1030 or processor hardware in smartphone, laptop computer, and tablet.

The microprocessor 1030 serves as a programmable host controller for the mobile device 990 by configuring the mobile device 990 to perform various operations, for example, in accordance with instructions or programming executable by processor 1030. For example, such operations may include various general operations of the mobile device, as well as operations related to the shockwave creation programming 945 and communications with the eyewear device 100 and server system 998. Although a processor may be configured by use of hardwired logic, typical processors in mobile devices are general processing circuits configured by execution of programming.

The mobile device 990 includes a memory or storage device system, for storing data and programming. In the example, the memory system may include a flash memory 1040A and a random access memory (RAM) 1040B. The RAM 1040B serves as short term storage for instructions and data being handled by the processor 1030, e.g. as a working data processing memory. The flash memory 1040A typically provides longer term storage.

Hence, in the example of mobile device 990, the flash memory 1040A is used to store programming or instructions for execution by the processor 1030. Depending on the type of device, the mobile device 990 stores and runs a mobile operating system through which specific applications, including shockwave creation programming 945, are executed. Applications, such as the shockwave creation programming 945, may be a native application, a hybrid application, or a web application (e.g., a dynamic web page executed by a web browser) that runs on mobile device 990 to create the warped shockwave video 964 from the initial video 960 based on the received shockwave effect selection 962. Examples of mobile operating systems include Google Android, Apple iOS (I-Phone or iPad devices), Windows Mobile, Amazon Fire OS, RIM BlackBerry operating system, or the like.

It will be understood that the mobile device 990 is just one type of host computer in the virtual shockwave creation system 900 and that other arrangements may be utilized. For example, a server system 998, such as that shown in FIG. 9, may create shockwaves in the initial video 960 after generation of the initial depth images 961A-N, via the depth-capturing camera of the eyewear device 100.

FIG. 11 is a flowchart of a method with steps that can be implemented in the virtual shockwave creation system 900 to apply shockwaves to the initial depth images 961A-N from the initial video 960 to generate the warped shockwave images 967A-N to create the warped shockwave video 965. Because the blocks of FIG. 11 were already explained in detail previously, repetition of all of the details is avoided here.

Beginning in block 1100, the method includes generating, via the depth-capturing camera, a sequence of initial depth images 961A-N from initial images 957A-N of an initial video 960.

Proceeding now to block 1110, the method further includes determining, for each of the initial depth images 961A-N, a respective rotation matrix 973A-N. The respective rotation matrix 973A-N is to adjust X, Y, and/or Z location coordinates of the vertices based on detected rotation of the depth-capturing camera. For example, the rotation matrix 973A-N can be a 2×2 or 3×3 matrix with X, Y, and/or Z axis position adjustments or angles to normalize the vertices in the captured initial depth images 961A-N with the floor plane to correct for camera rotation.

Continuing to block 1120, the method further includes generating, for each of the initial depth images 961A-N, a respective warped shockwave image 967A-N by applying the respective rotation matrix 973A-N and the transformation function 965 to vertices of a respective initial depth image 961A-N. The transformation function 965 transforms a respective shockwave region of vertices 966A-N grouped together along a Z axis based on, at least, the associated time coordinate 963A-N of the respective initial depth image 961A-N. The transformation function 965 moves a respective Y location coordinate of vertices in the respective shockwave region of vertices 966A-N vertically upwards or downwards on the Y axis based on a wave pattern 971. Moving now to block 1130, the method further includes creating, a warped shockwave video 964 including the sequence of the generated warped shockwave images 967A-N.

Finishing now in block 1140, the method further includes presenting, via an image display 180A-B or 1080, the warped shockwave video 964. The step of presenting via the image display 180A-B or 1080, the warped shockwave video 964 including the sequence of the generated warped shockwave images 967A-N presents an appearance of a rolling wave radially from the depth-capturing camera, radially from an object emitting a shockwave, or along a Z axis of the warped shockwave images 967A-N of the warped shockwave video 964.

Figure 12A:
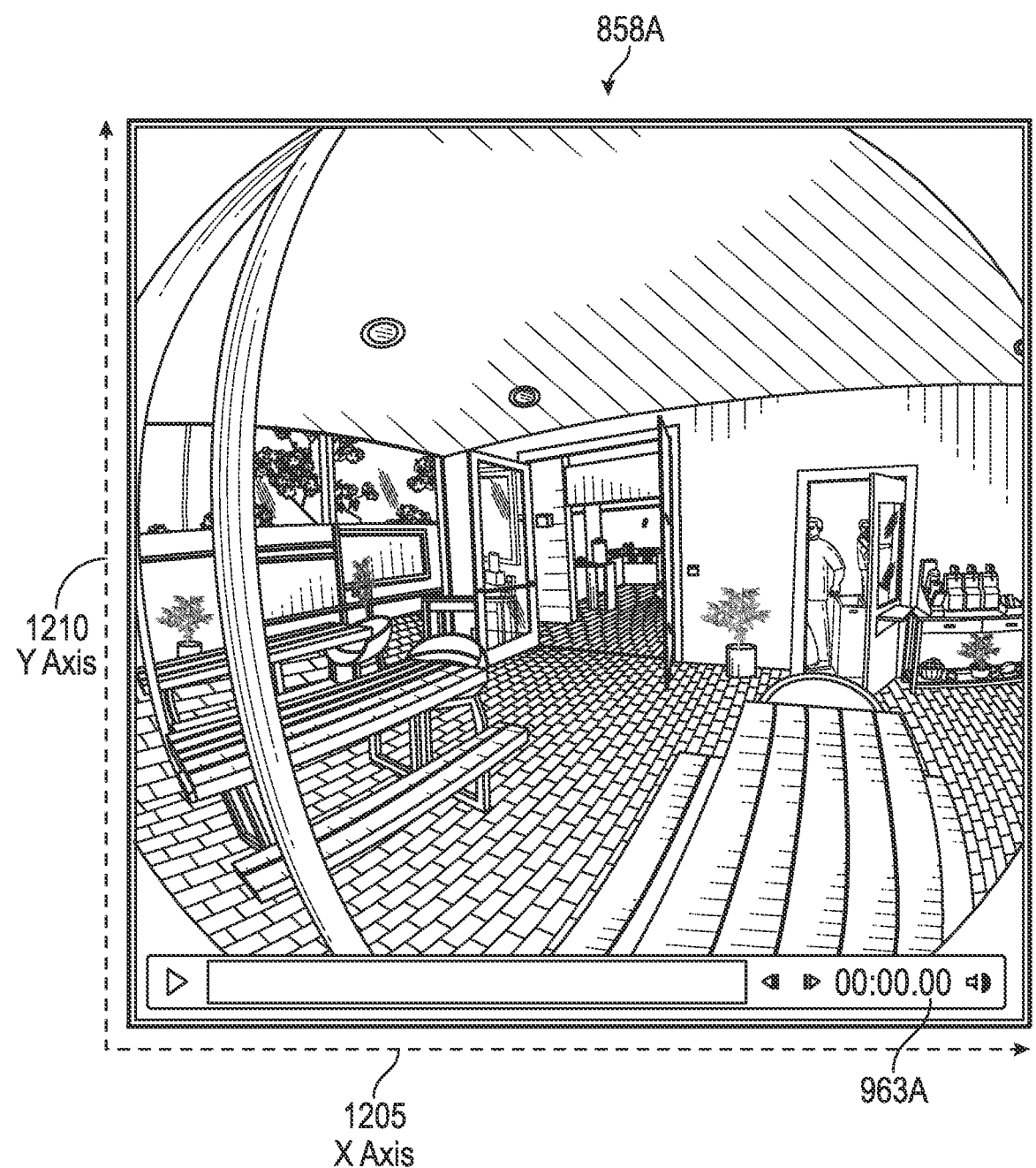
FIGS. 12A-B illustrate an example of a first raw image captured by one of the visible light cameras and application of a transformation function to a first shockwave region of vertices of a generated first initial depth image, respectively.
Figure 12B:
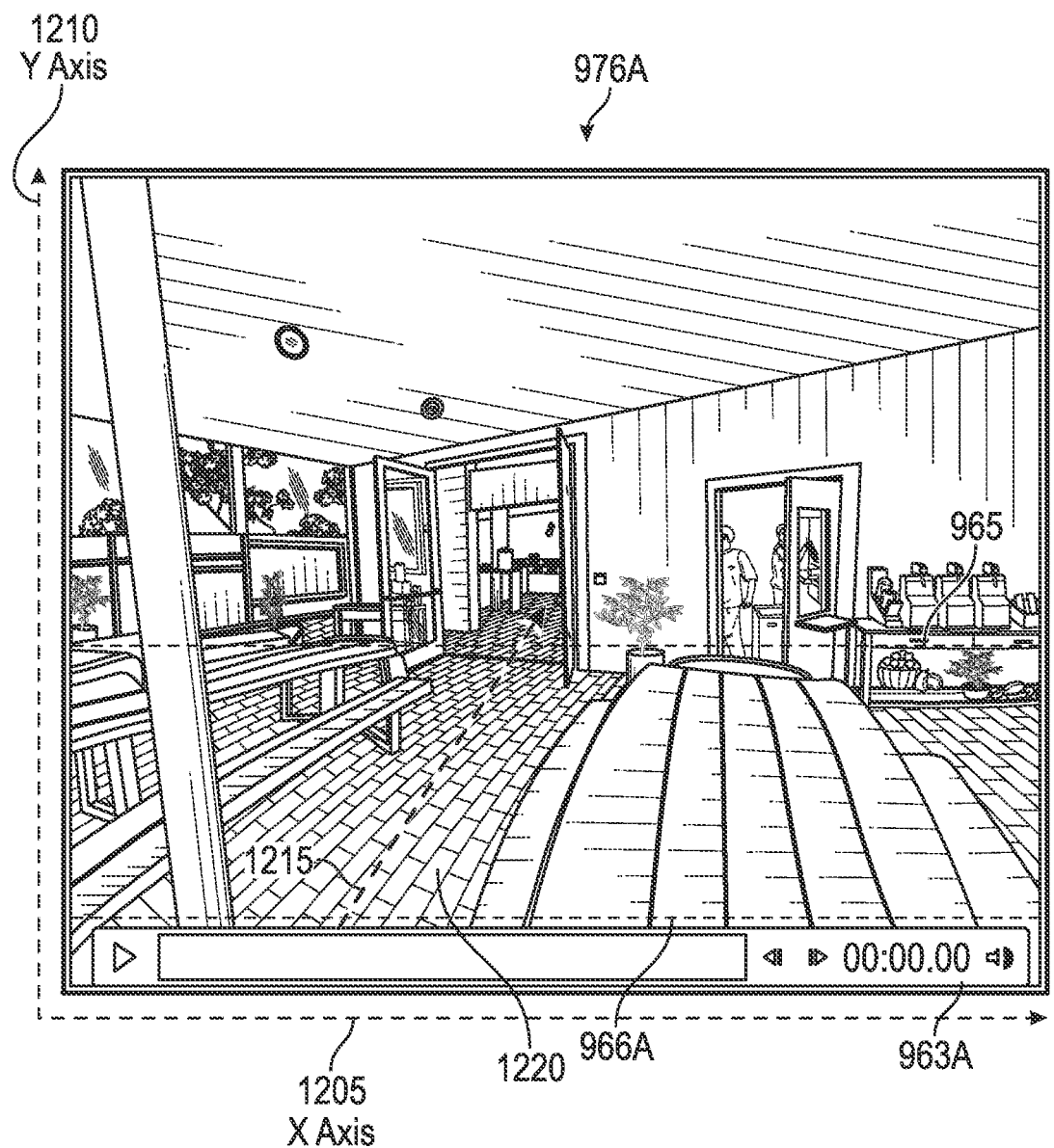

FIGS. 12A-B illustrate an example of a first raw image 858A captured by one of the visible light cameras 114A-B and application of a transformation function 965 to a first shockwave region of vertices 966A of a generated first initial depth image 961A, respectively. A first time coordinate 963A set to 0.00 seconds is associated with the first raw image 858A during capture, and therefore the corresponding first initial depth image 961A and the first shockwave depth image 967A are also associated with the first time coordinate 963A of 0.00 seconds. In FIG. 12A, the first raw image 858A is depicted as captured by one of the visible light cameras 114A-B before any image processing (e.g., rectification, etc.). Thus, the first raw image 858A has a fish eye appearance, resulting from vignetting by the visible light camera 114A-B. The first raw image 858A includes various two-dimensional pixels with X and Y location coordinates on an X axis 1205 and a Y axis 1210. The corresponding first initial depth image of 961A of the sequence of initial depth images 961A-N in the initial video 960 is subsequently generated using techniques described previously. In FIG. 12B, a Z axis 1215 is depicted as being overlaid on the generated first shockwave depth image 967A of the created warped shockwave video 964. A floor plane 1220 of the first shockwave depth image 967A is contiguous along the Z axis 1215. In addition to the orientation sensor techniques disclosed above (e.g., utilizing an inertial measurement unit 972) to identify the floor plane 1220, a heuristic can be utilized that assumes the floor plane 1220 is somewhere between 5 feet and 6 feet from the vertical position of the depth-capturing camera that generated the first initial depth image 961A. This assumes a human of average height wore the eyewear device 100 when the first raw image 858A was captured and did not skew or rotate his/her head. In this instance, the person was standing five to six feet above floor level (e.g., ground level). In FIG. 12B, the application of the first transformation function 965A on the first shockwave region 966A is depicted, and this results in shockwaves which appear to be in the near range as a result of the first shockwave region 966A being in close range (e.g., short depth/distance) on the Z axis 1215.

Figure 13A:
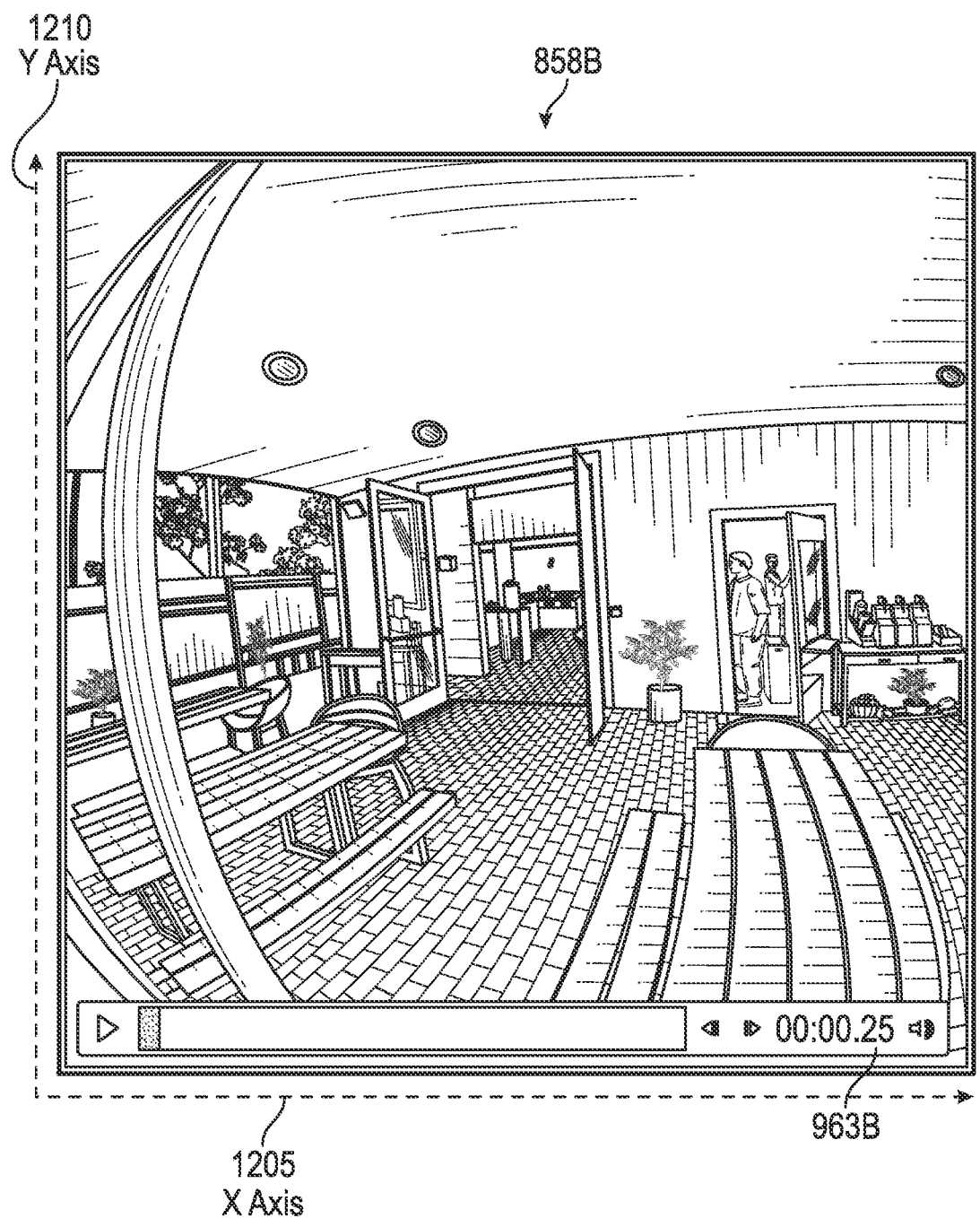
FIGS. 13A-B illustrate an example of a second raw image captured by one of the visible light cameras and application of the transformation function to a second shockwave region of vertices of a generated second initial depth image, respectively.
Figure 13B:
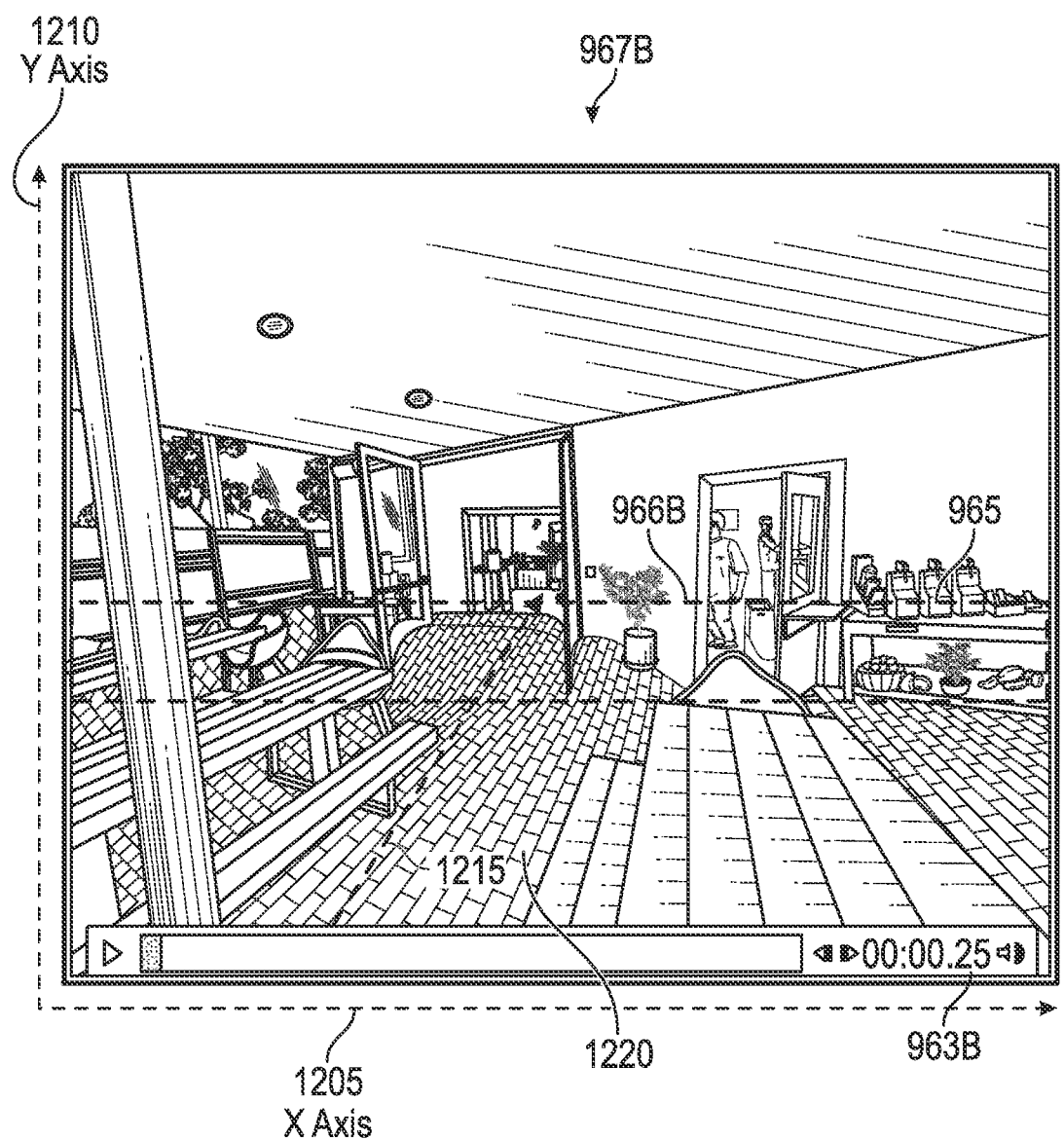

FIGS. 13A-B illustrate an example of a second raw image 858B captured by one of the visible light cameras 114A-B and application of the transformation function 965 to a second shockwave region of vertices 966B of a generated second initial depth image 961B, respectively. A second time coordinate 963B set to 0.25 seconds is associated with the second raw image 858B during capture, and therefore the corresponding second initial depth image 961B from the initial video 960 and the second shockwave depth image 967B of the warped shockwave video 964 are also associated with the second time coordinate 963B of 0.25 seconds. In FIG. 13B, the application of the second transformation function 965B on the second shockwave region 966B is depicted, and this results in shockwaves which appear to be in the intermediate range as a result of the second shockwave region 966B being in intermediate range (e.g., medium depth/distance) on the Z axis 1215.

Figure 14A:
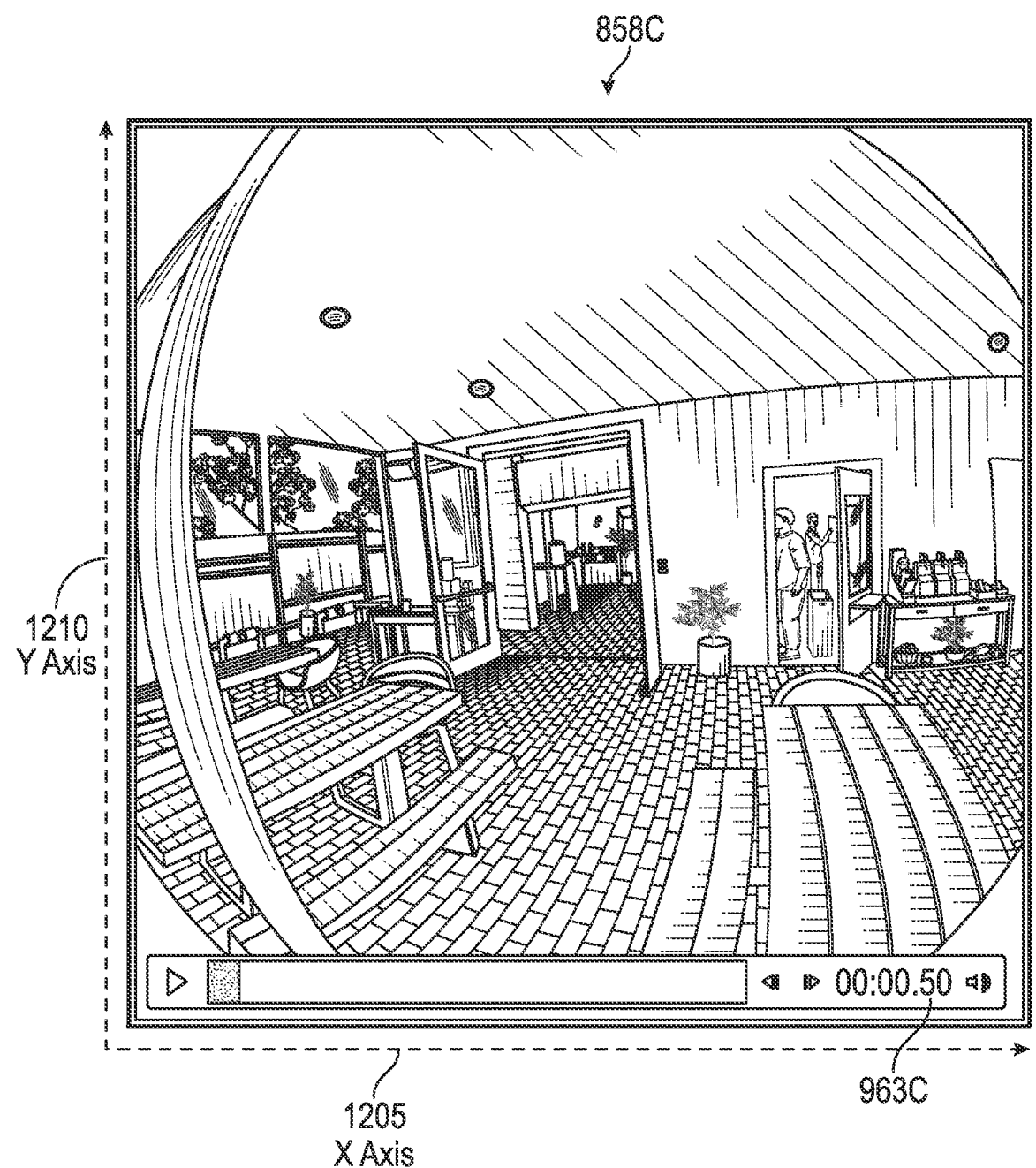
FIGS. 14A-B illustrate an example of a third raw image captured by one of the visible light cameras and application of the transformation function to a third shockwave region of vertices of a generated third initial depth image, respectively.
Figure 14B:
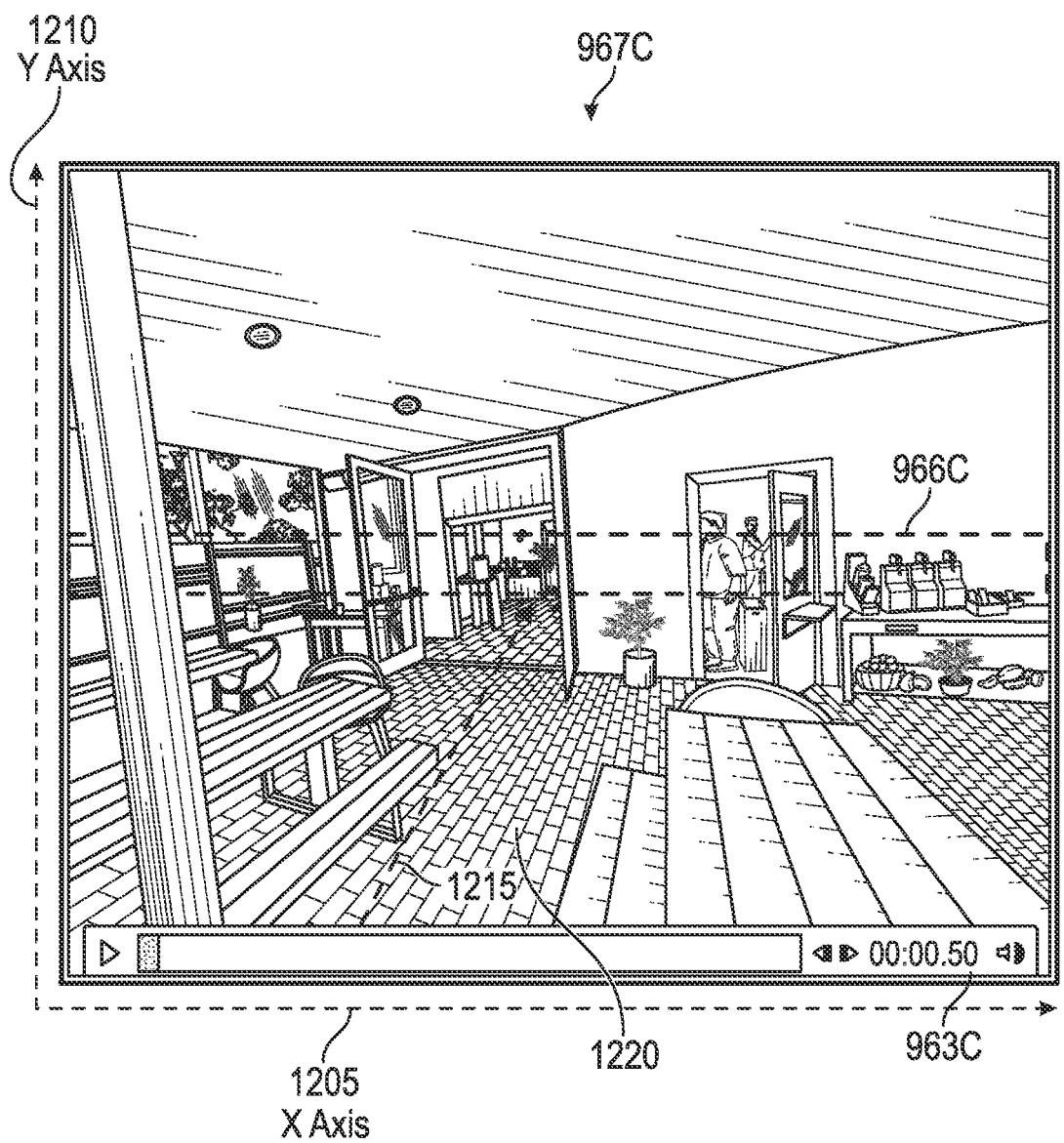

FIGS. 14A-B illustrate an example of a third raw image 858C captured by one of the visible light cameras 114A-B and application of the transformation function 965 to a third shockwave region of vertices 966C of a generated third initial depth image 961C, respectively. A third time coordinate 963B set to 0.50 seconds is associated with the third raw image 858C during capture, and therefore the corresponding third initial depth image 961C from the initial video 960 and the third shockwave depth image 967C of the warped shockwave video 964 are also associated with the third time coordinate 963B of 0.50 seconds. In FIG. 14B, the third shockwave region 966C is depicted, but no shockwaves appear because the third shockwave region 966C either: is no longer on the floor plane 1220; or reaches an ending depth position on the Z axis 1215.

Figure 15A:
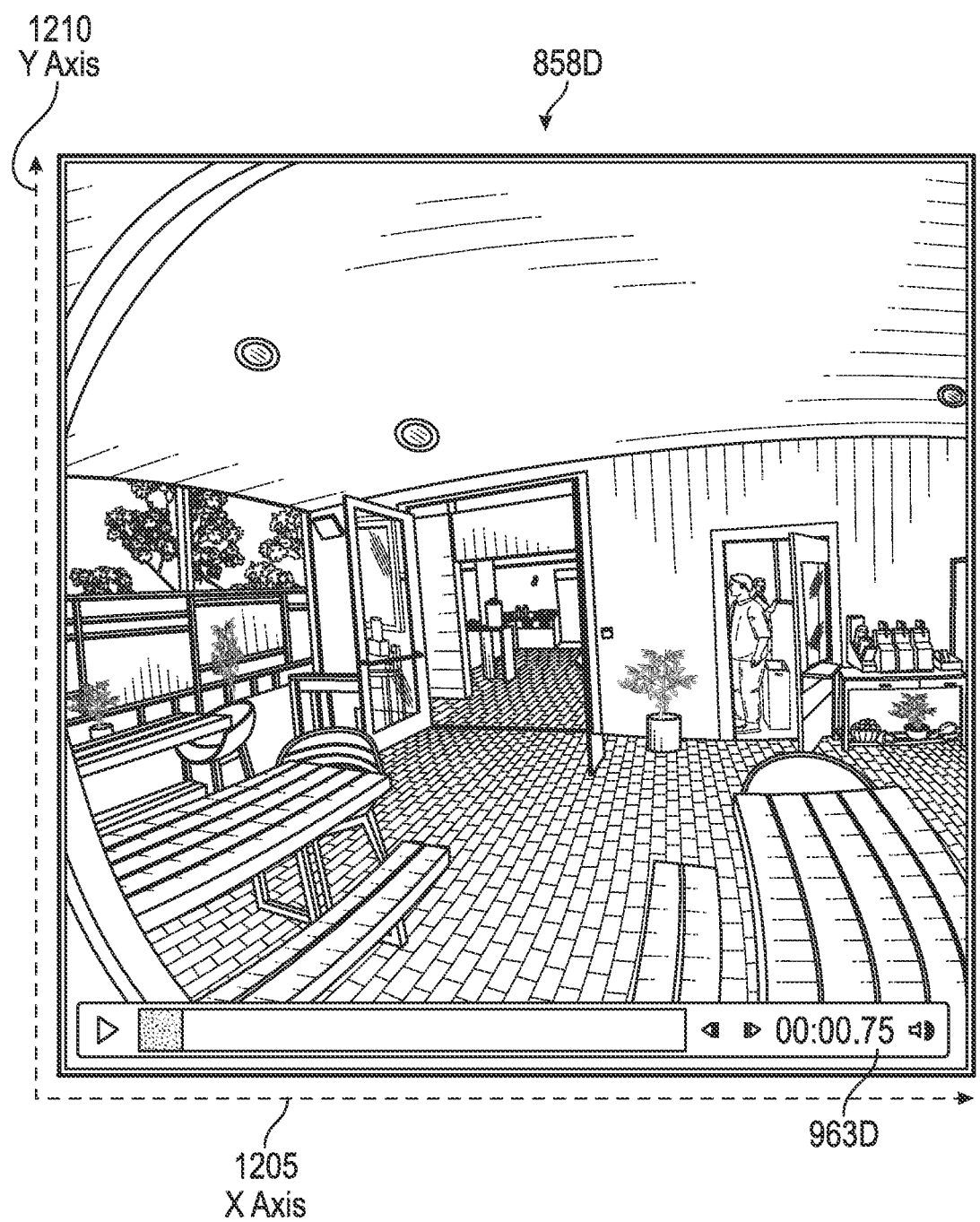
FIGS. 15A-B illustrate an example of a fourth raw image captured by one of the visible light cameras and application of the transformation function to a fourth shockwave region of vertices of a generated fourth initial depth image, respectively.
Figure 15B:
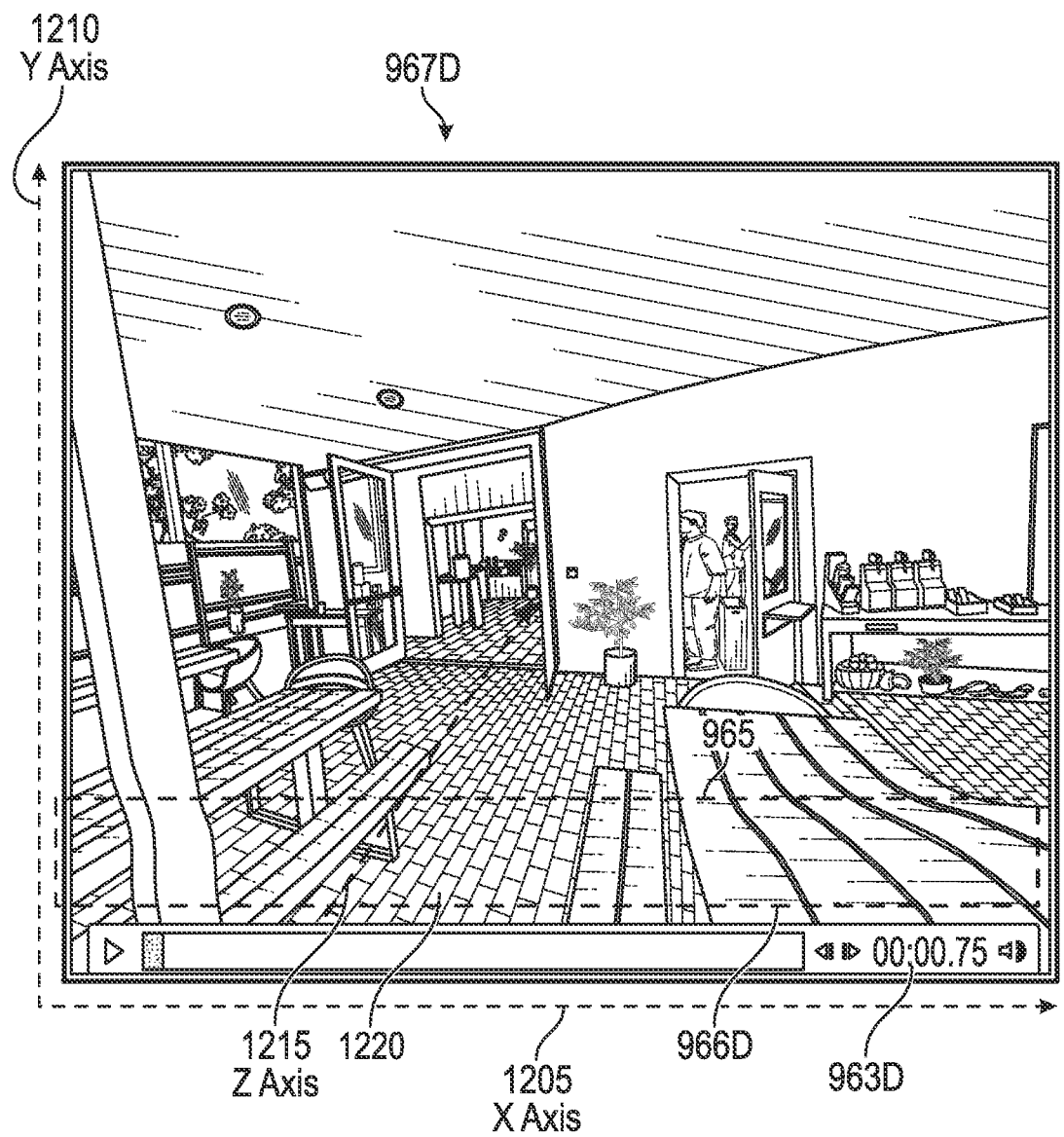

FIGS. 15A-B illustrate an example of a fourth raw image 858D captured by one of the visible light cameras 114A-B and application of the transformation function 965 to a fourth shockwave region of vertices 966D of a generated fourth initial depth image 961D, respectively. A fourth time coordinate 963D set to 0.75 seconds is associated with the fourth raw image 858D during capture, and therefore the corresponding fourth initial depth image 961D from the initial video 960 and the fourth shockwave depth image 967D of the warped shockwave video 964 are also associated with the fourth time coordinate 963D of 0.75 seconds. In FIG. 15B, the application of the fourth transformation function 965D on the fourth shockwave region 966D is depicted, and this results in shockwaves which appear to be in the near range as a result of the fourth shockwave region 966D being in near range (e.g., short depth/distance) on the Z axis 1215.

Figure 16A:
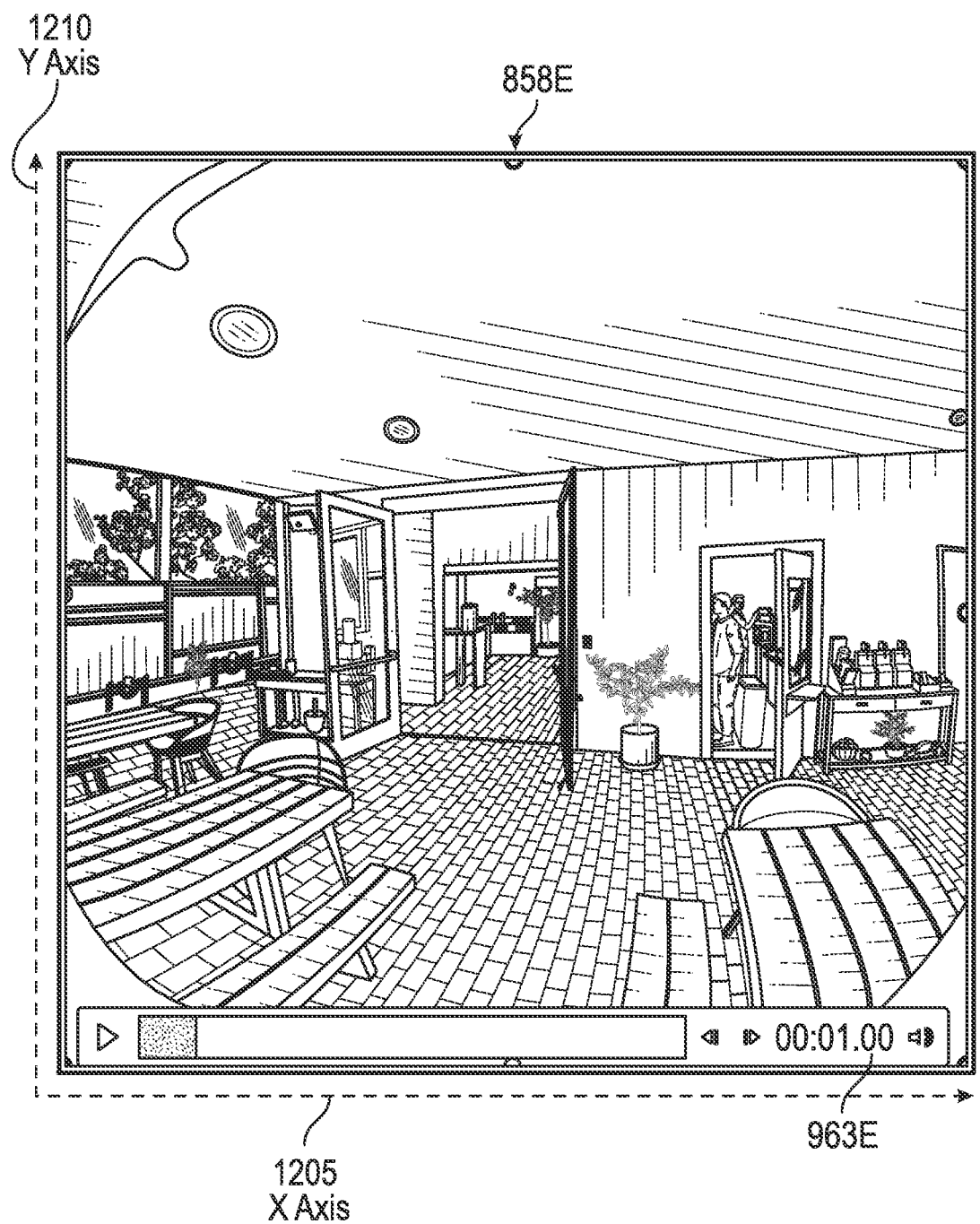
FIGS. 16A-B illustrate an example of a fifth raw image captured by one of the visible light cameras and application of the transformation function to a fifth shockwave region of vertices of a generated fifth initial depth image, respectively.
Figure 16B:
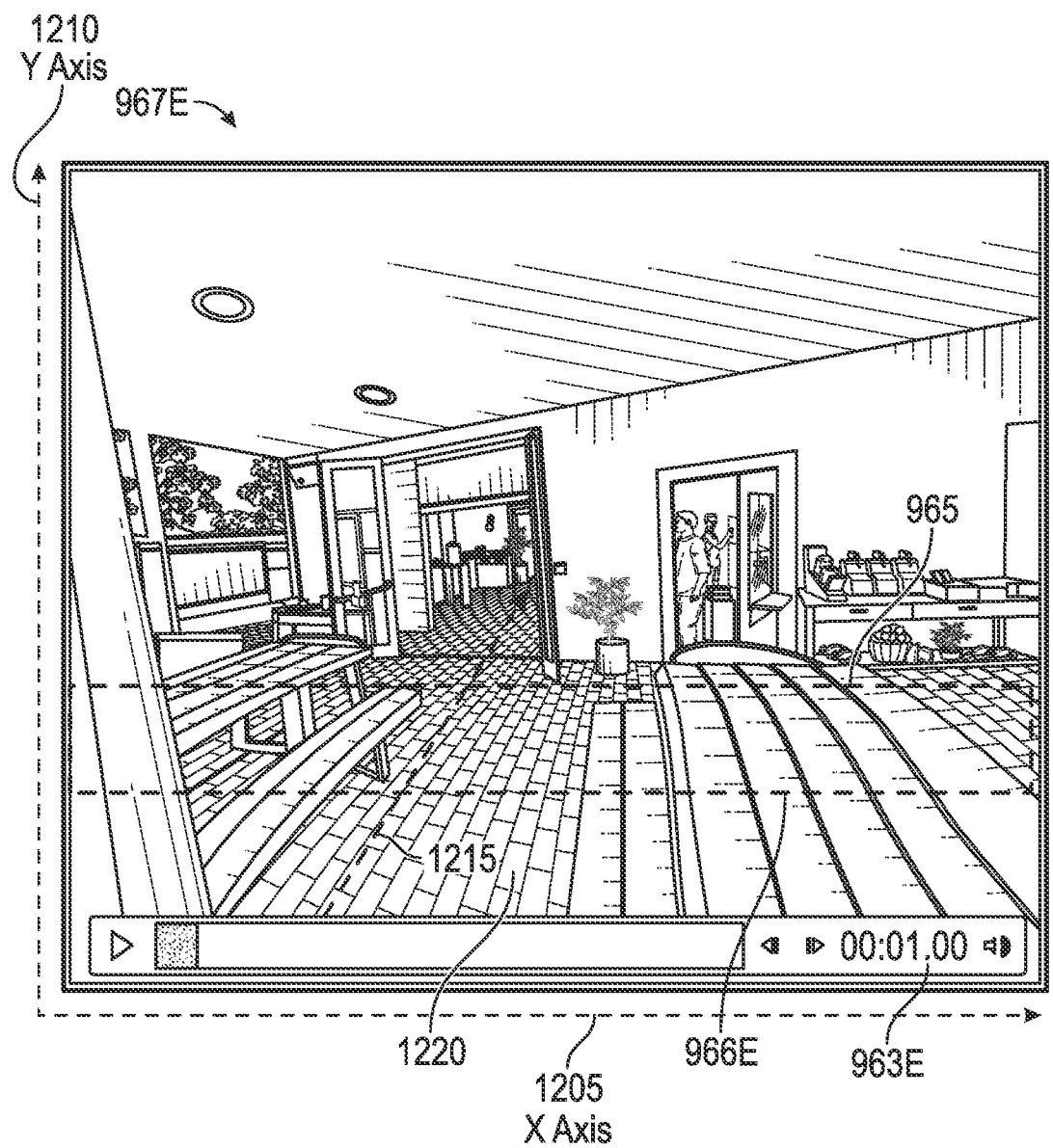

FIGS. 16A-B illustrate an example of a fifth raw image 858E captured by one of the visible light cameras 114A-B and application of the transformation function 965 to a fifth shockwave region of vertices 966E of a generated fifth initial depth image 961E, respectively. A fifth time coordinate 963E set to 1.00 seconds is associated with the fifth raw image 858E during capture, and therefore the corresponding fifth initial depth image 961E from the initial video 960 and the fifth shockwave depth image 967E of the warped shockwave video 964 are also associated with the fifth time coordinate 963E of 1.00 seconds. In FIG. 16B, the application of the fifth transformation function 965E on the fifth shockwave region 966E is depicted, and this results in shockwaves which appear to be in the intermediate range as a result of the fifth shockwave region 966E being in intermediate range (e.g., medium depth/distance) on the Z axis 1215.

Figure 17A:
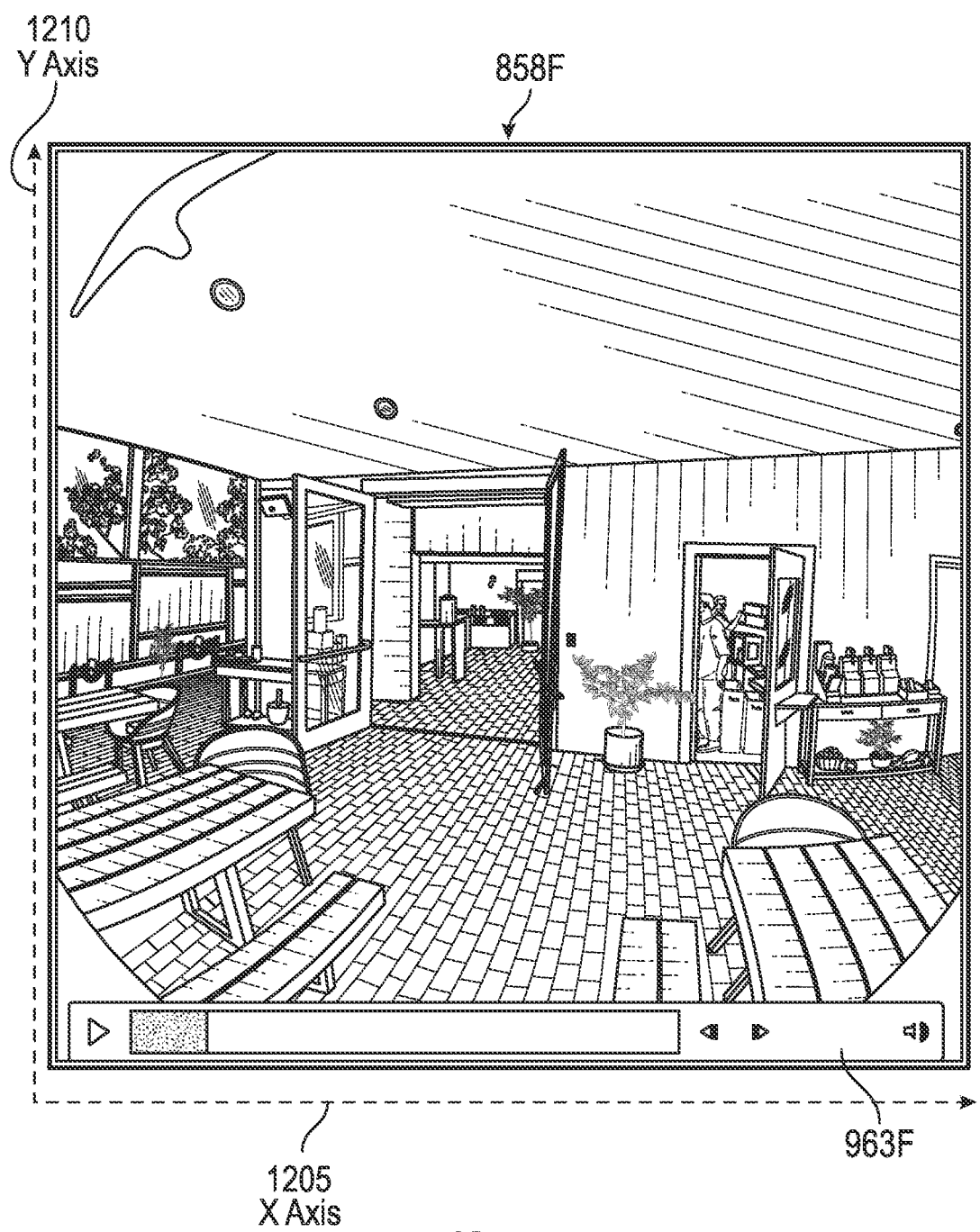
FIGS. 17A-B illustrate an example of a sixth raw image captured by one of the visible light cameras and application of the transformation function to a sixth shockwave region of vertices of a generated sixth initial depth image, respectively.
Figure 17B:
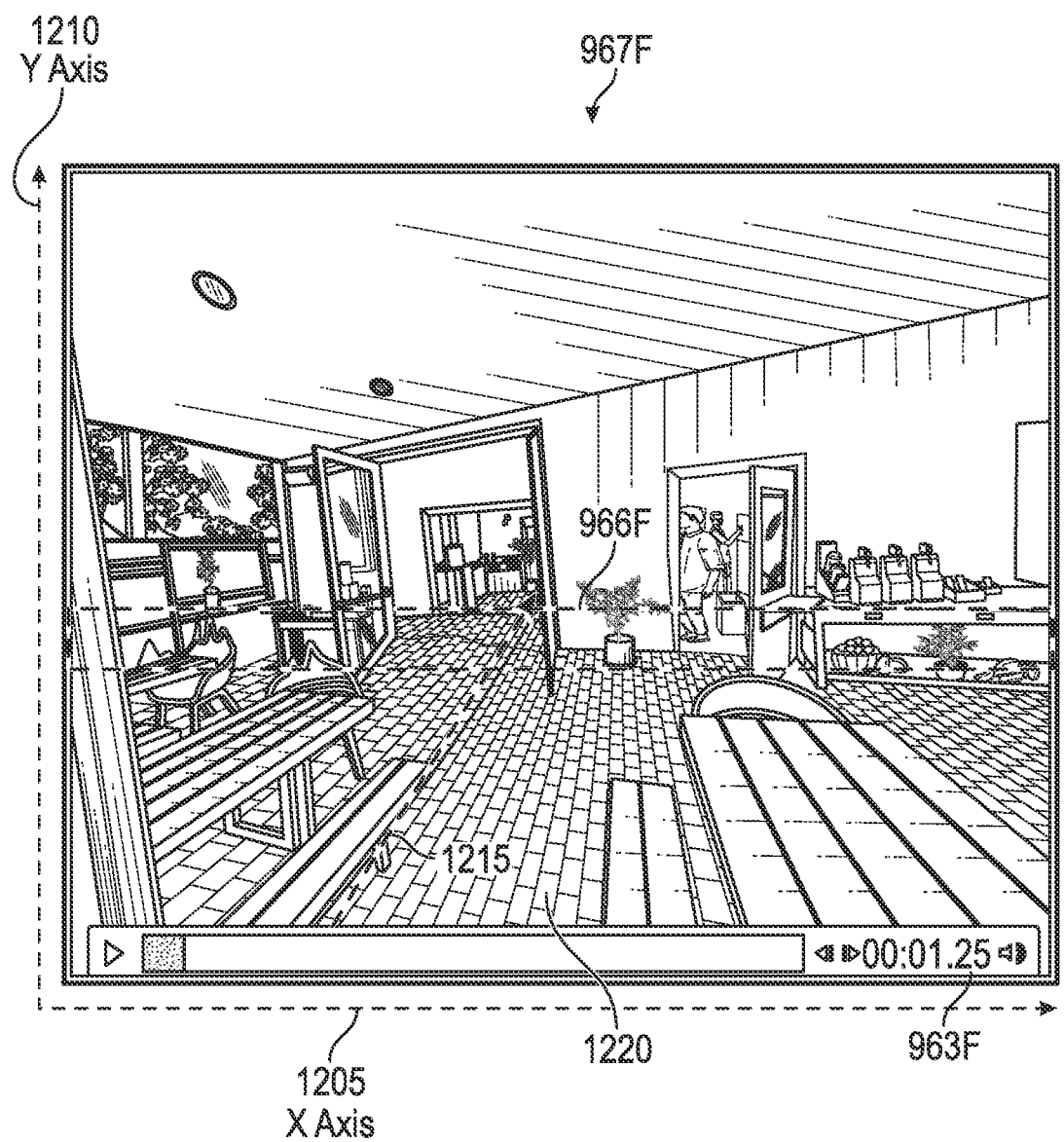

FIGS. 17A-B illustrate an example of a sixth raw image 858F captured by one of the visible light cameras 114A-B and application of the transformation function 965 to a sixth shockwave region of vertices 966F of a generated sixth initial depth image 961F, respectively. A sixth time coordinate 963F set to 1.25 seconds is associated with the sixth raw image 858F during capture, and therefore the corresponding sixth initial depth image 961F from the initial video 960 and the sixth shockwave depth image 967F of the warped shockwave video 964 are also associated with the sixth time coordinate 963F of 1.25 seconds. In FIG. 17B, the application of the sixth transformation function 965F on the sixth shockwave region 966F is depicted, and this results in shockwaves which appear to be in the far range as a result of the sixth shockwave region 966F being in far range (e.g., long depth/distance) on the Z axis 1215.

Figure 18A:
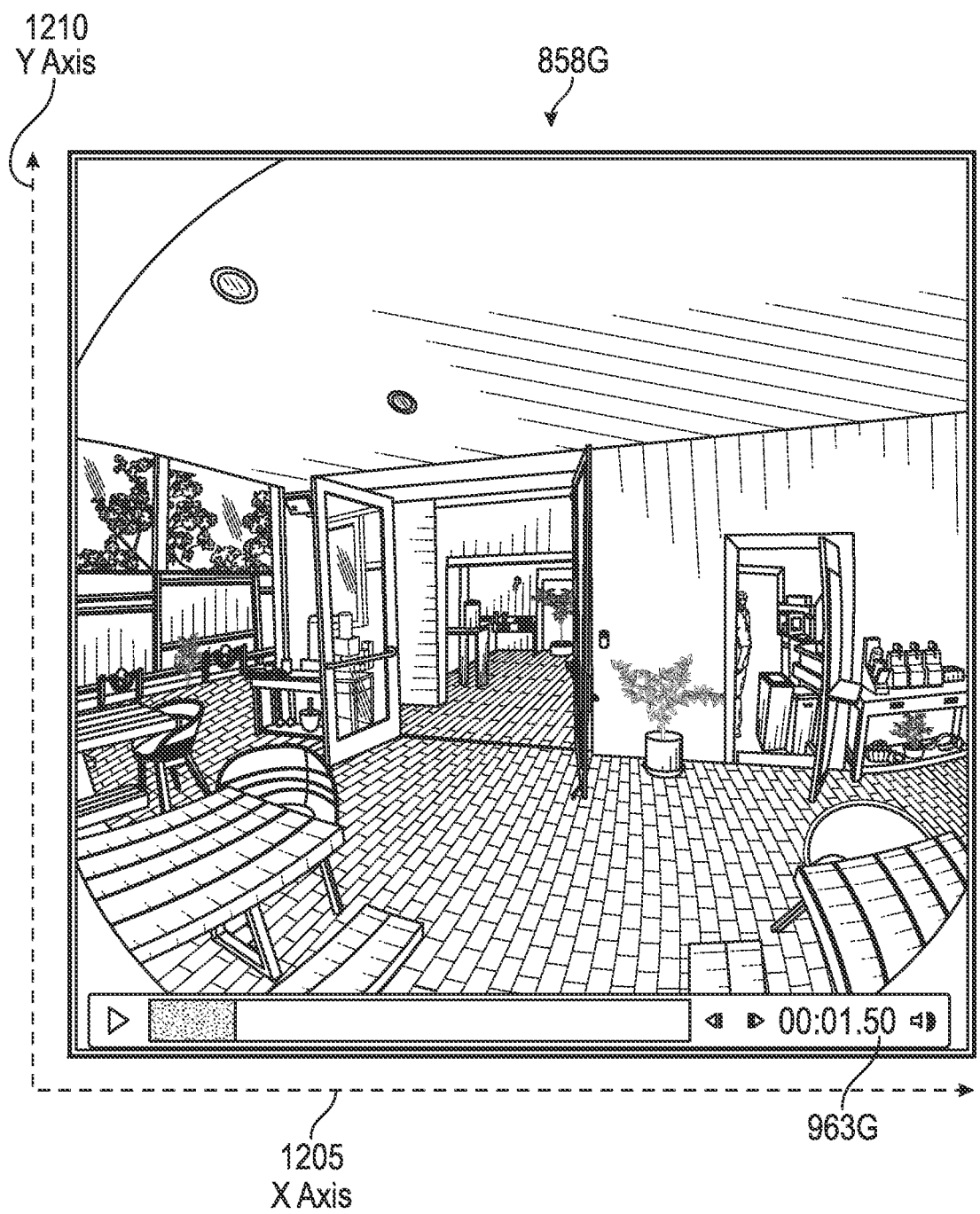
FIGS. 18A-B illustrate an example of a seventh raw image captured by one of the visible light cameras and application of the transformation function to a seventh shockwave region of vertices of a generated seventh initial depth image, respectively.
Figure 18B:
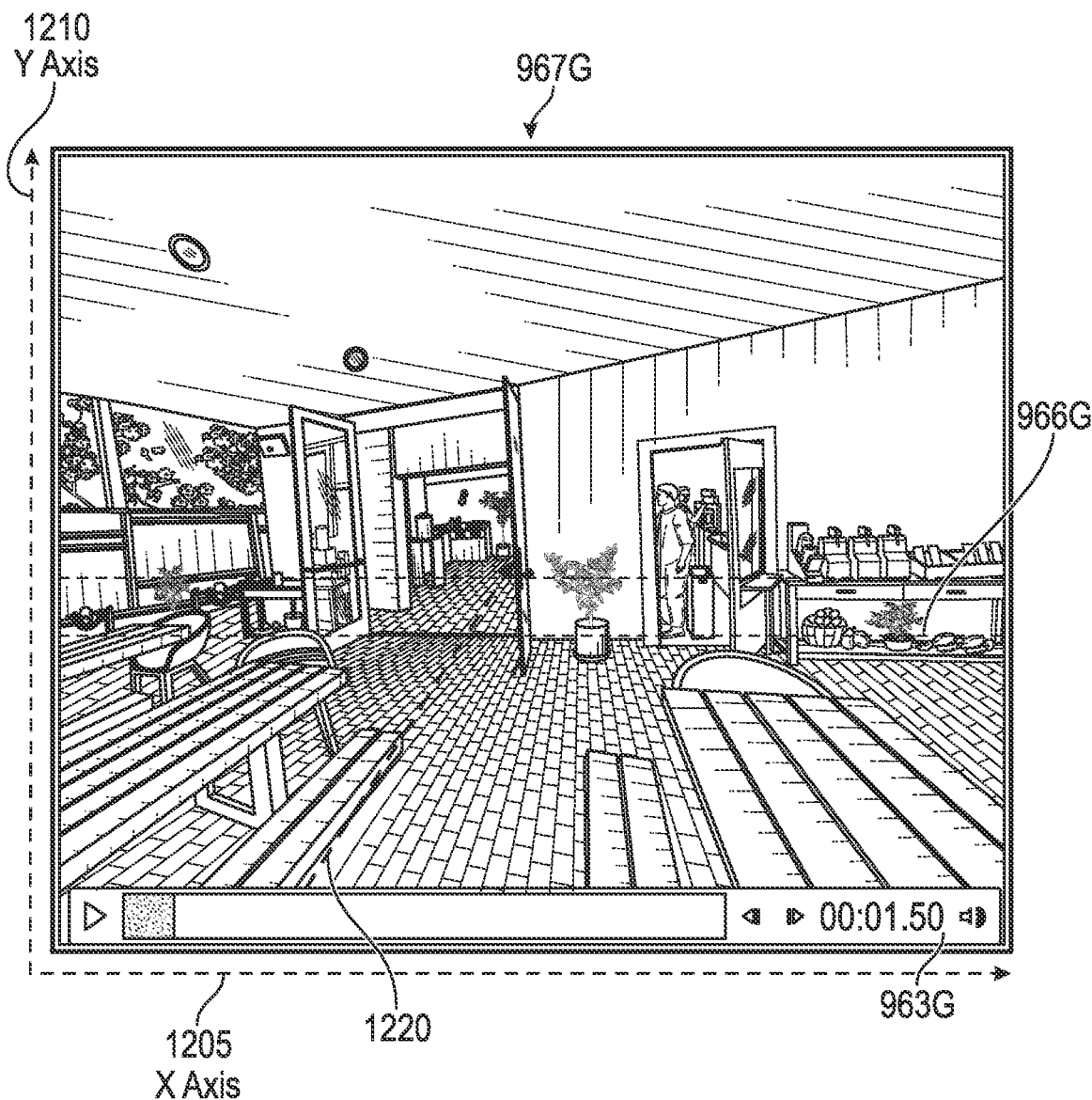

FIGS. 18A-B illustrate an example of a seventh raw image 858G captured by one of the visible light cameras 114A-B and application of the transformation function 965 to a seventh shockwave region of vertices 966G of a generated seventh initial depth image 961G, respectively. A seventh time coordinate 963G set to 1.50 seconds is associated with the seventh raw image 858G during capture, and therefore the corresponding seventh initial depth image 961G from the initial video 960 and the seventh shockwave depth image 967G of the warped shockwave video 964 are also associated with the seventh time coordinate 963G of 1.50 seconds. In FIG. 18B, the application of the seventh transformation function 965G on the seventh shockwave region 966G is depicted, and this results in shockwaves which appear to be in the farthest range as a result of the seventh shockwave region 966G being in very far range (e.g., maximum depth/distance) on the Z axis 1215.

Figure 19A:
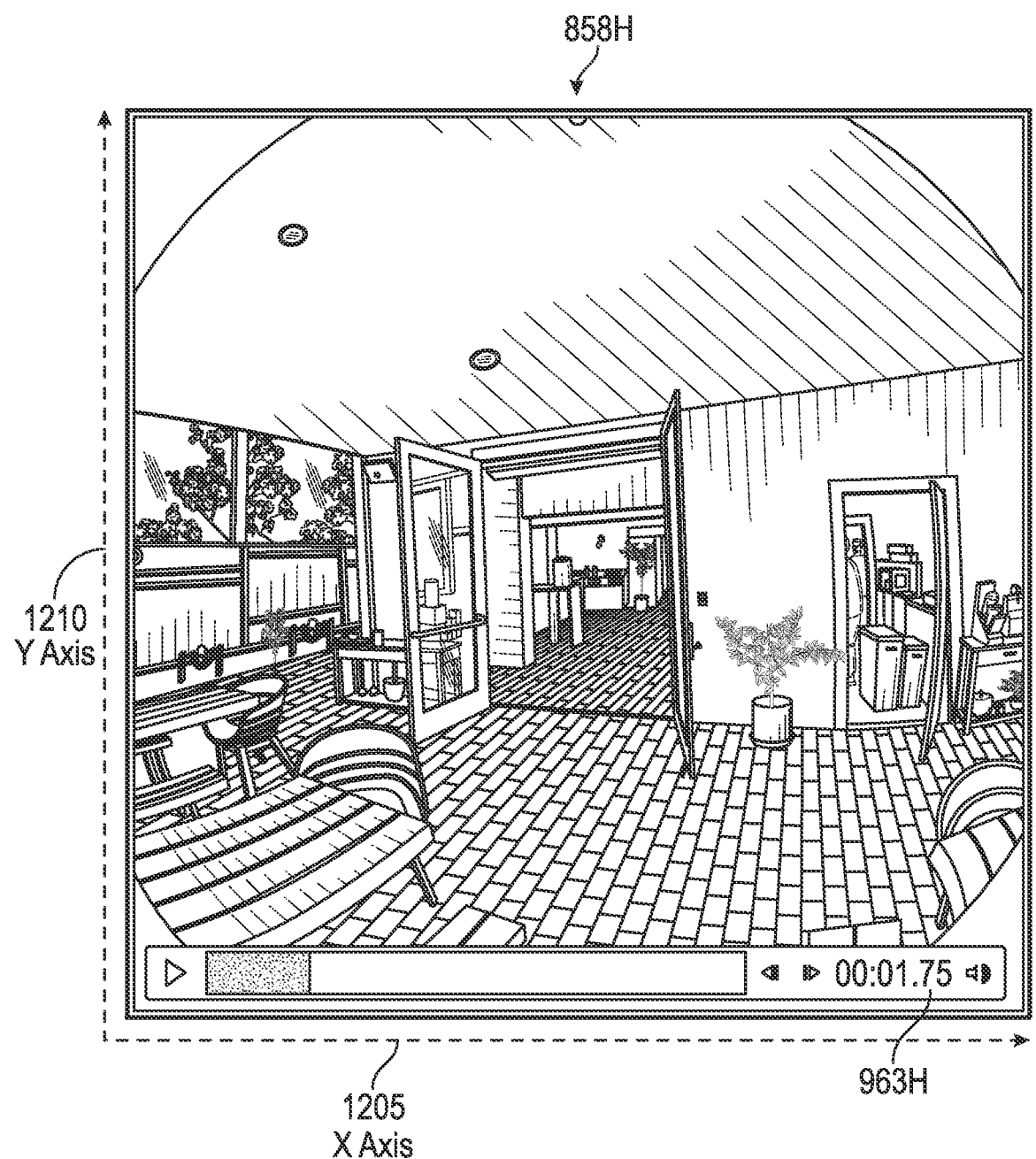
FIGS. 19A-B illustrate an example of an eighth raw image captured by one of the visible light cameras and application of an eighth transformation function to an eighth shockwave region of vertices of a generated eighth initial depth image, respectively.
Figure 19B:
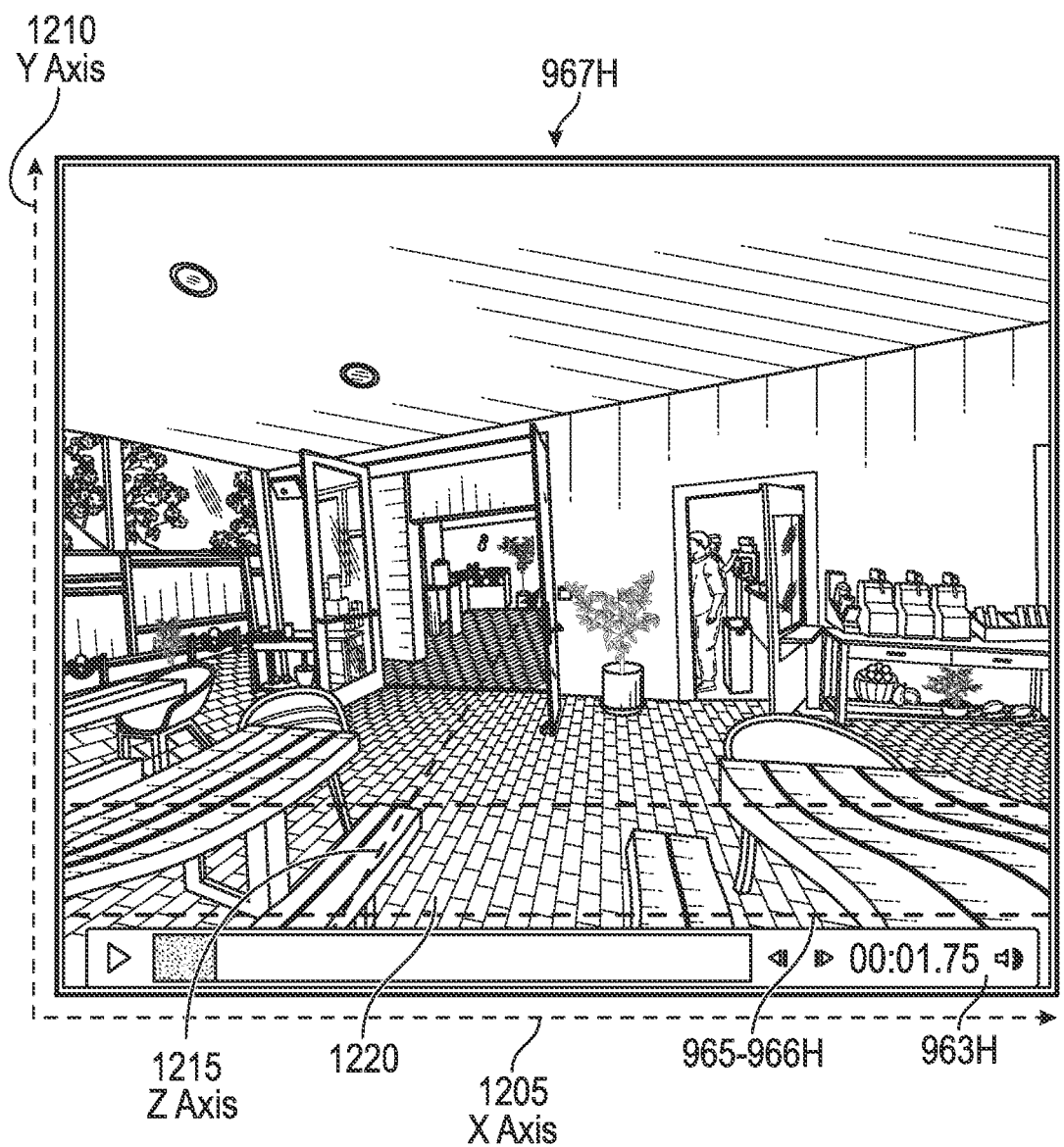

FIGS. 19A-B illustrate an example of an eighth raw image 858H captured by one of the visible light cameras 114A-B and application of the eighth transformation function 965 to an eighth shockwave region of vertices 966H of a generated eighth initial depth image 961H, respectively. An eighth time coordinate 963H set to 1.75 seconds is associated with the eighth raw image 858H during capture, and therefore the corresponding eighth initial depth image 961H from the initial video 960 and the eighth shockwave depth image 967H of the warped shockwave video 964 are also associated with the eighth time coordinate 963H of 1.75 seconds. In FIG. 19B, the application of the eighth transformation function 965H on the eighth shockwave region 966H is depicted, and this results in shockwaves which appear to be in the near range as a result of the eighth shockwave region 966H being in near range (e.g., short depth/distance) on the Z axis 1215.

Figure 20A:
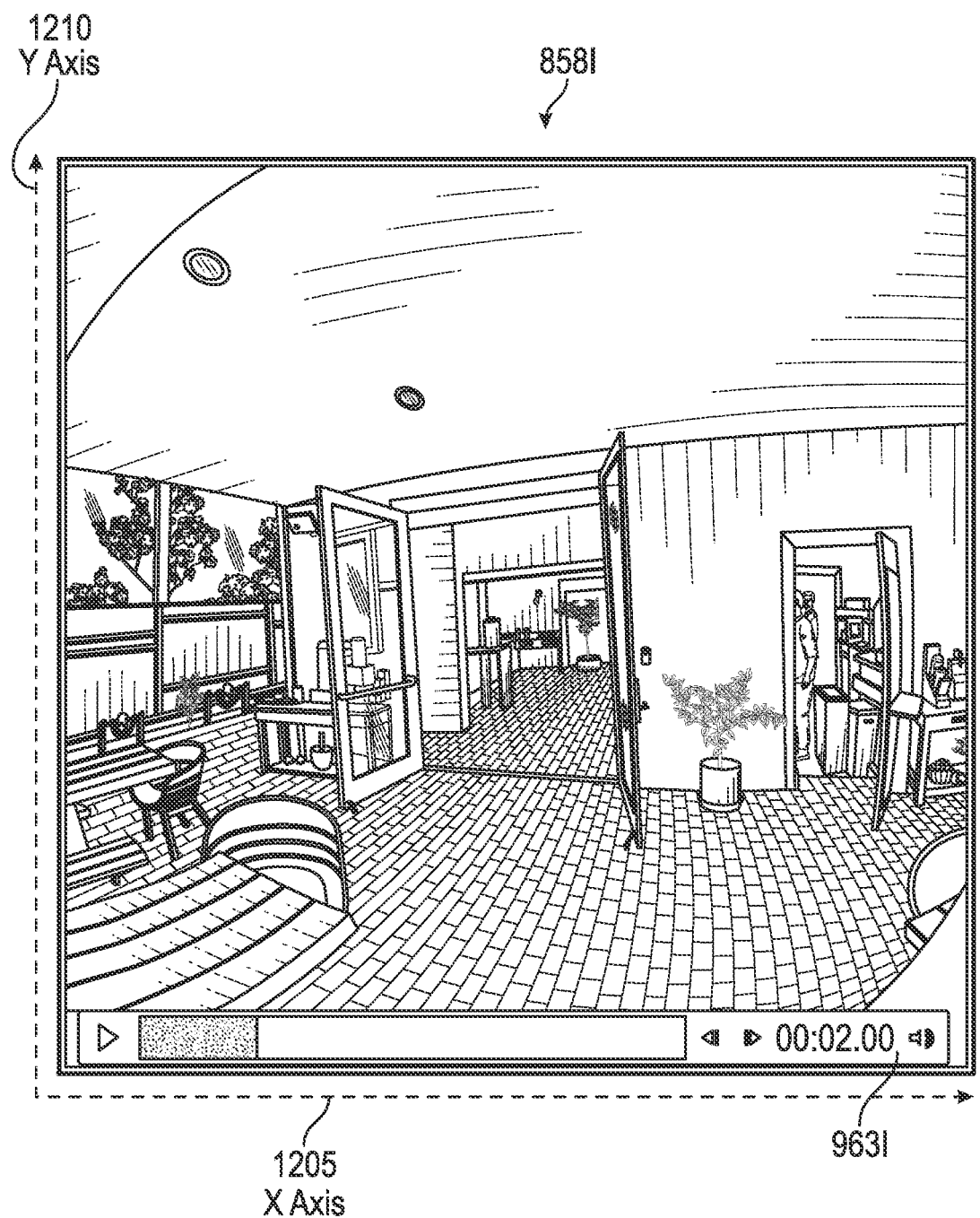
FIGS. 20A-B illustrate an example of a ninth raw image captured by one of the visible light cameras and application of the transformation function to a ninth shockwave region of vertices of a generated ninth initial depth image, respectively.
Figure 20B:
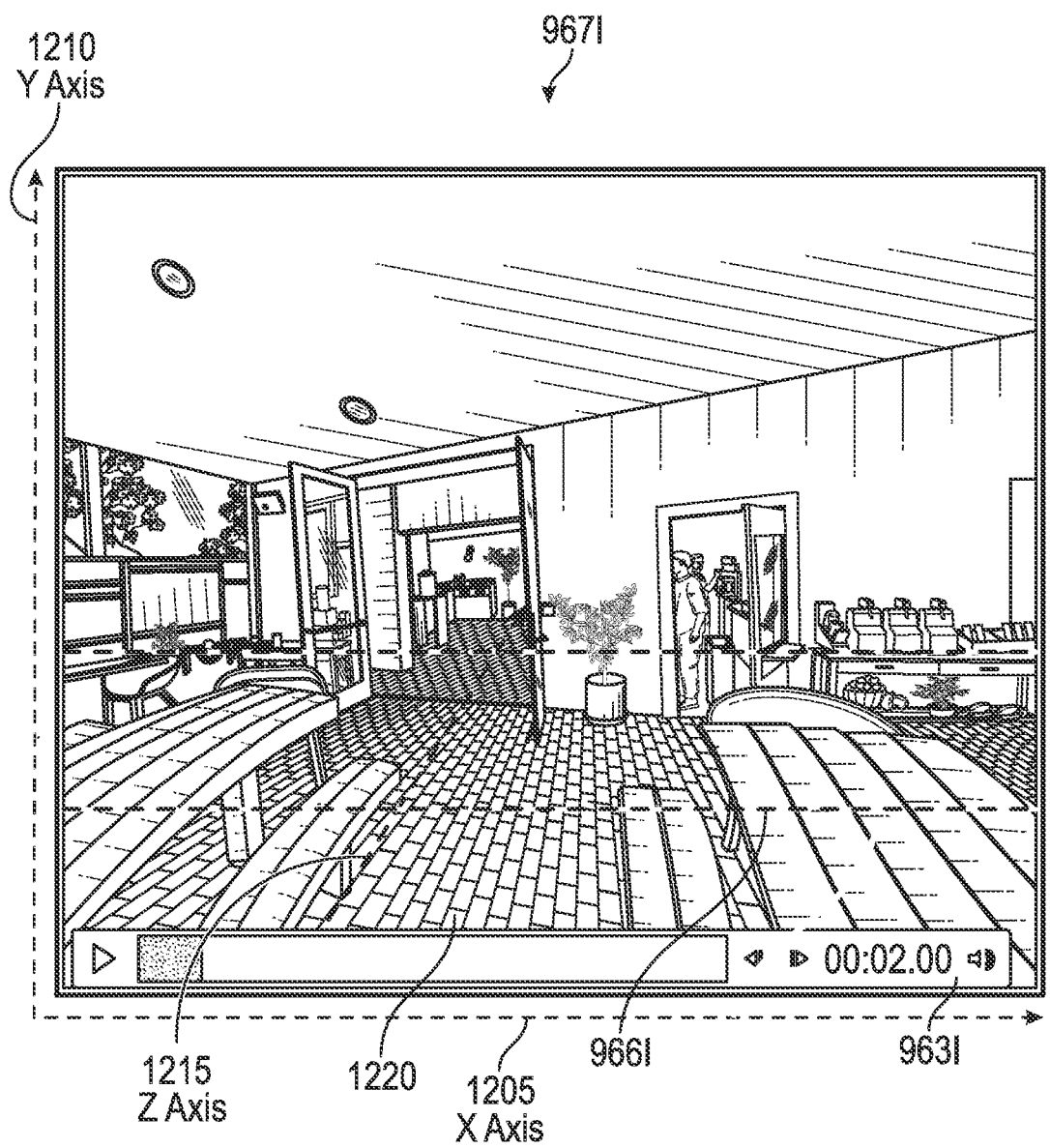

FIGS. 20A-B illustrate an example of a ninth raw image 858I captured by one of the visible light cameras 114A-B and application of the transformation function 965 to a ninth shockwave region of vertices 966I of a generated ninth initial depth image 961I, respectively. A ninth time coordinate 963I set to 2.00 seconds is associated with the ninth raw image 858I during capture, and therefore the corresponding ninth initial depth image 961I from the initial video 960 and the ninth shockwave depth image 967I of the warped shockwave video 964 are also associated with the ninth time coordinate 963I of 2.00 seconds. In FIG. 20B, the application of the ninth transformation function 965I on the ninth shockwave region 966I is depicted, and this results in shockwaves which appear to be in the intermediate range as a result of the ninth shockwave region 966I being in intermediate range (e.g., medium depth/distance) on the Z axis 1215.

Figure 21A:
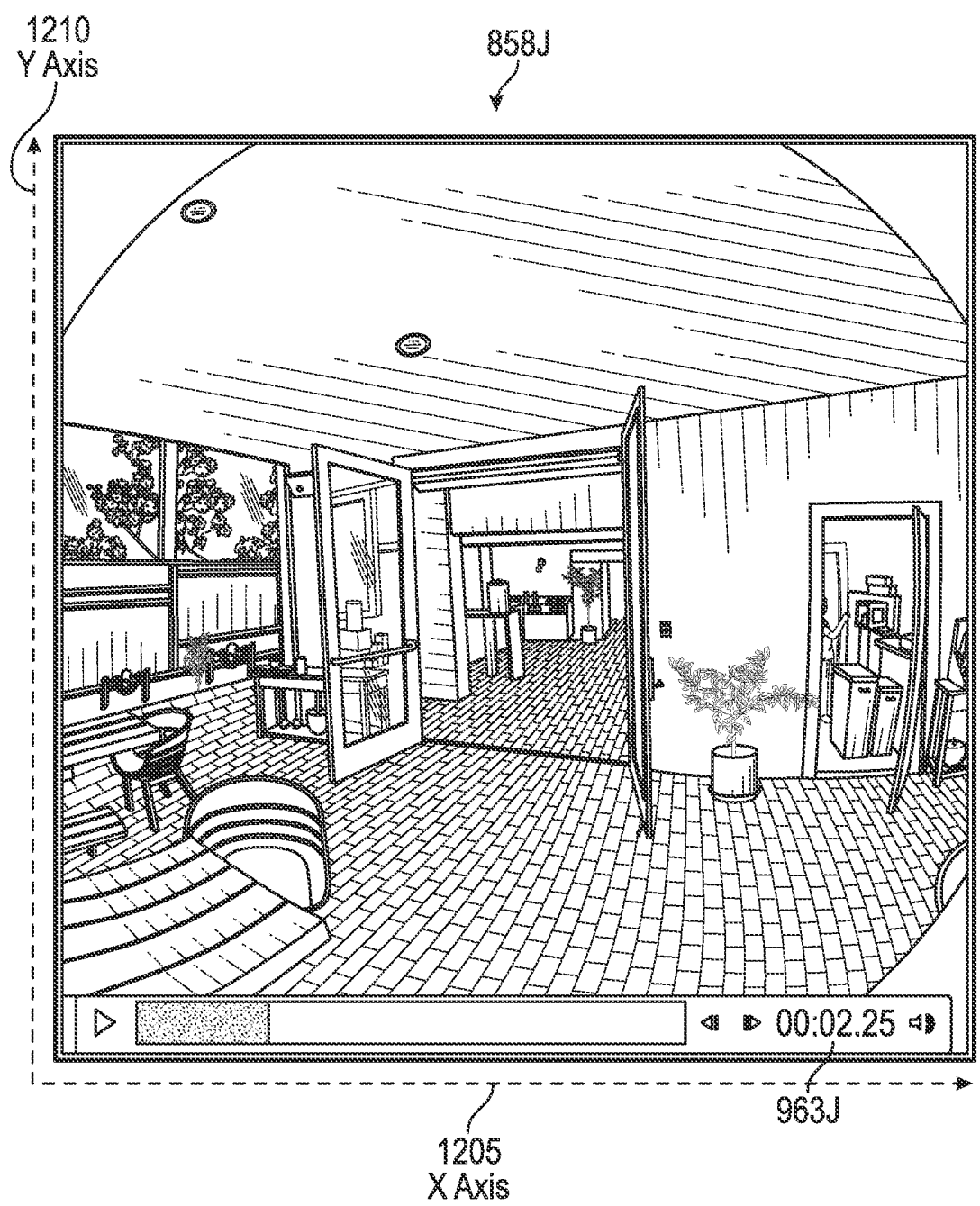
FIGS. 21A-B illustrate an example of a tenth raw image captured by one of the visible light cameras and application of the transformation function to a tenth shockwave region of vertices of a generated tenth initial depth image, respectively.
Figure 21B:
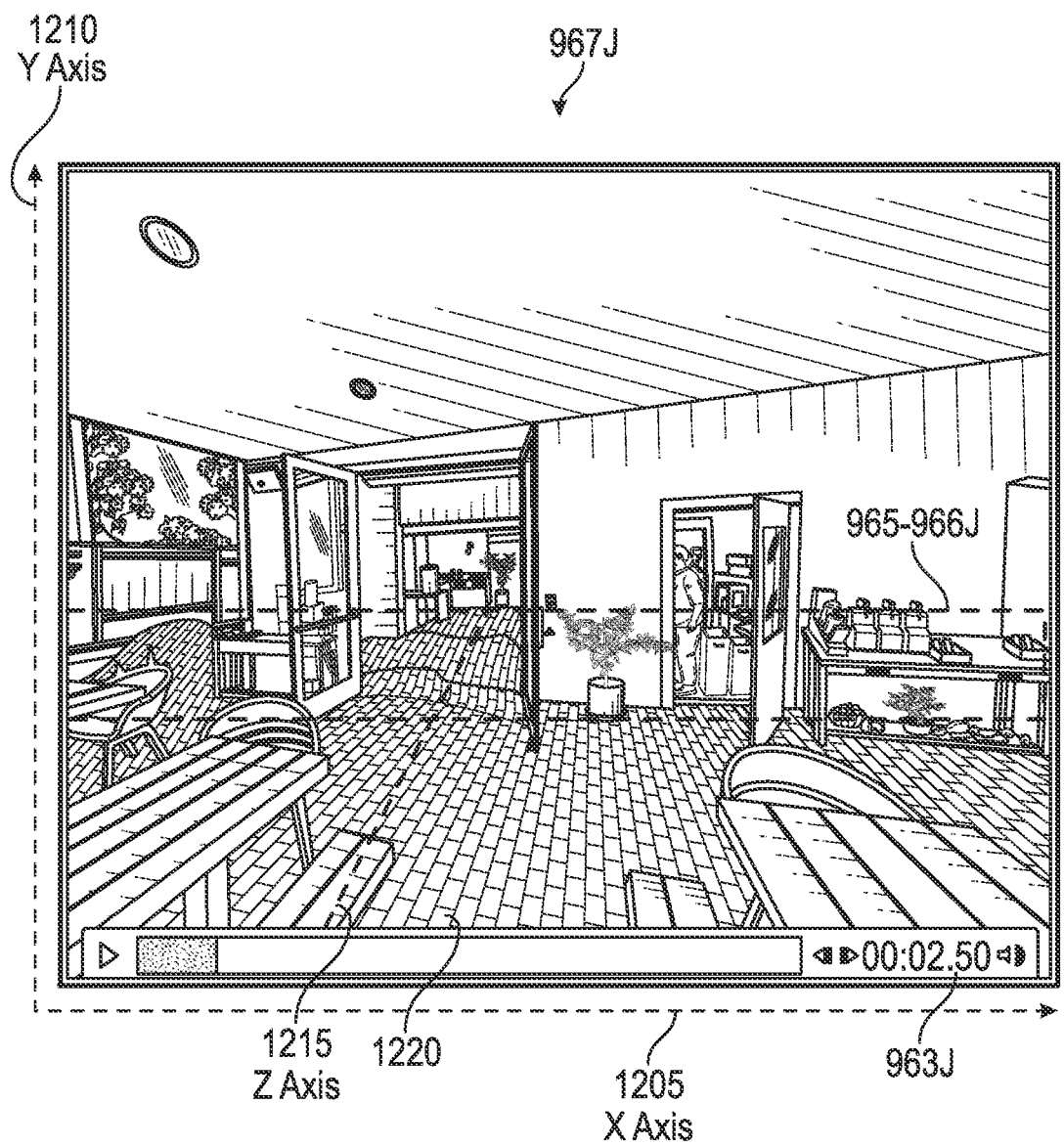

FIGS. 21A-B illustrate an example of a tenth raw image 858J captured by one of the visible light cameras 114A-B and application of the transformation function 965 to a tenth shockwave region of vertices 966J of a generated tenth initial depth image 961J, respectively. A tenth time coordinate 963J set to 2.25 seconds is associated with the tenth raw image 858J during capture, and therefore the corresponding tenth initial depth image 961J from the initial video 960 and the tenth shockwave depth image 967J of the warped shockwave video 964 are also associated with the tenth time coordinate 963J of 2.25 seconds. In FIG. 19B, the application of the tenth transformation function 965J on the tenth shockwave region 966J is depicted, and this results in shockwaves which appear to be in the far range as a result of the tenth shockwave region 966J being in far range (e.g., long depth/distance) on the Z axis 1215.

Figure 22A:
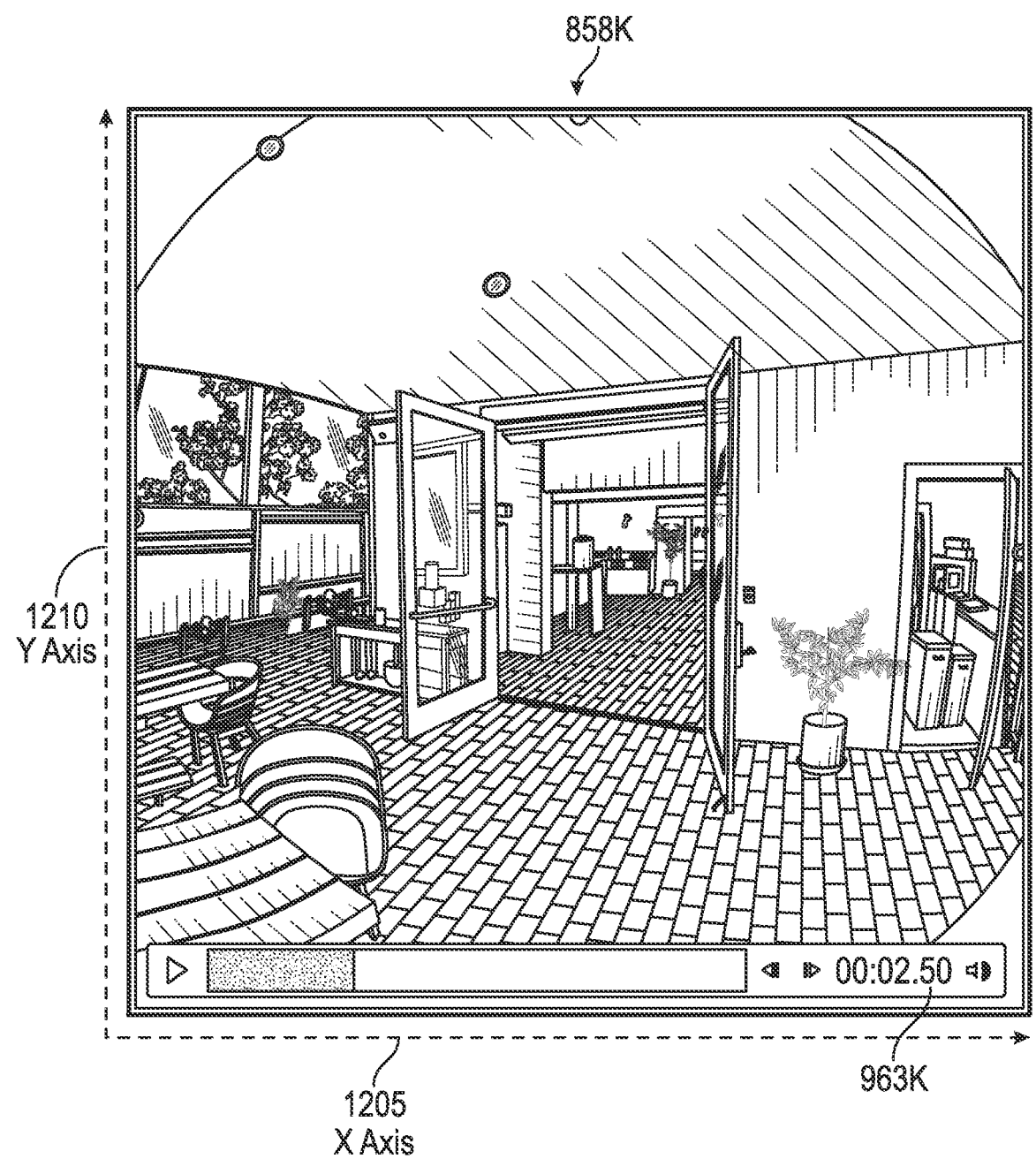
FIGS. 22A-B illustrate an example of an eleventh raw image captured by one of the visible light cameras and application of the transformation function to an eleventh shockwave region of vertices of a generated eleventh initial depth image, respectively.
Figure 22B:
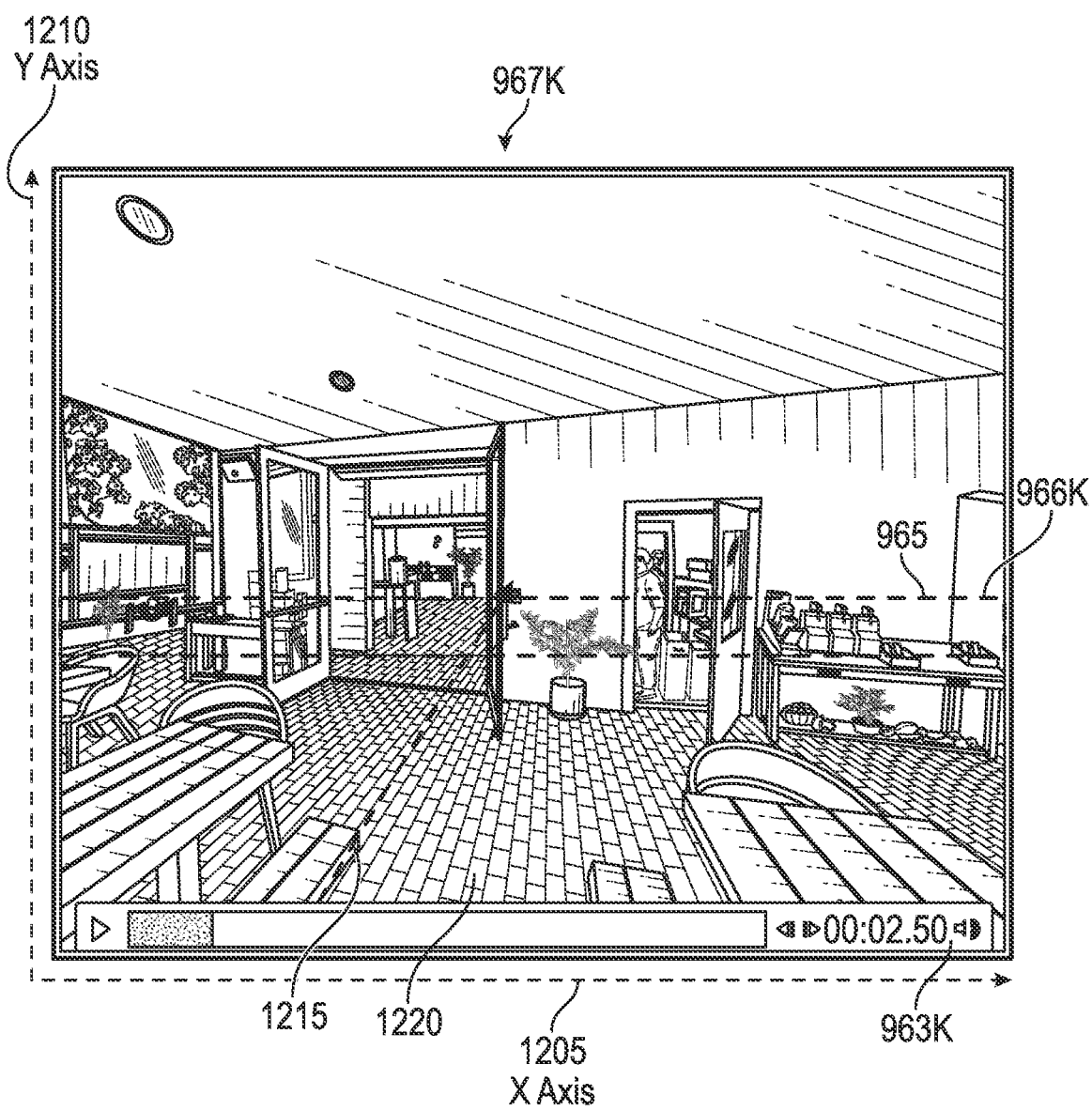

FIGS. 22A-B illustrate an example of an eleventh raw image 858K captured by one of the visible light cameras 114A-B and application of the transformation function 965 to an eleventh shockwave region of vertices 966K of a generated eleventh initial depth image 961K, respectively. An eleventh time coordinate 963K set to 2.50 seconds is associated with the eleventh raw image 858K during capture, and therefore the corresponding eleventh initial depth image 961K from the initial video 960 and the eleventh shockwave depth image 967K of the warped shockwave video 964 are also associated with the eleventh time coordinate 963K of 2.50 seconds. In FIG. 22B, the application of the eleventh transformation function 965K on the eleventh shockwave region 966K is depicted, and this results in shockwaves which appear to be in the farthest range as a result of the eleventh shockwave region 966K being in very far range (e.g., maximum depth/distance) on the Z axis 1215.

Figure 23A:
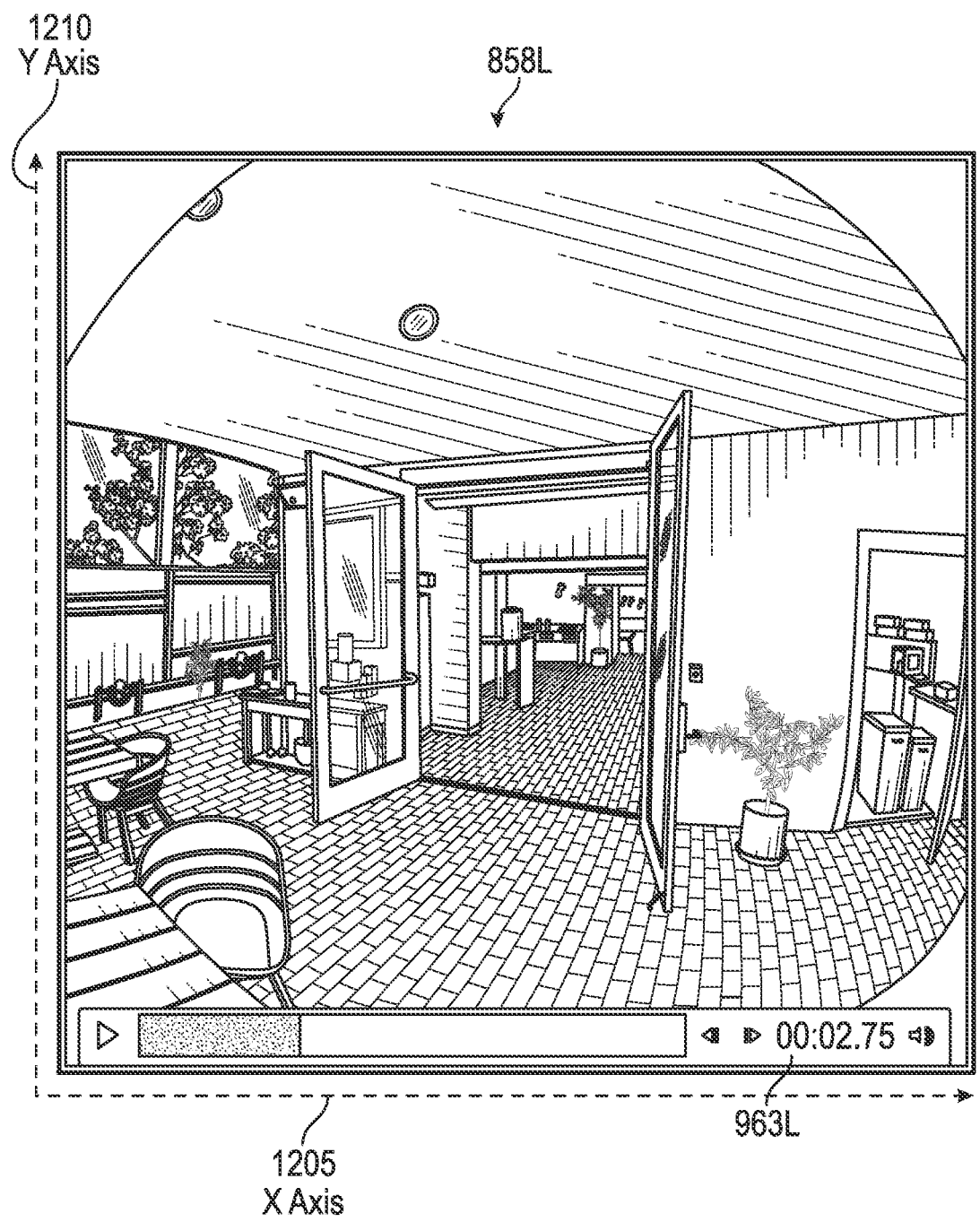
FIGS. 23A-B illustrate an example of a twelfth raw image captured by one of the visible light cameras and application of the transformation function to a twelfth shockwave region of vertices of a generated twelfth initial depth image, respectively.
Figure 23B:
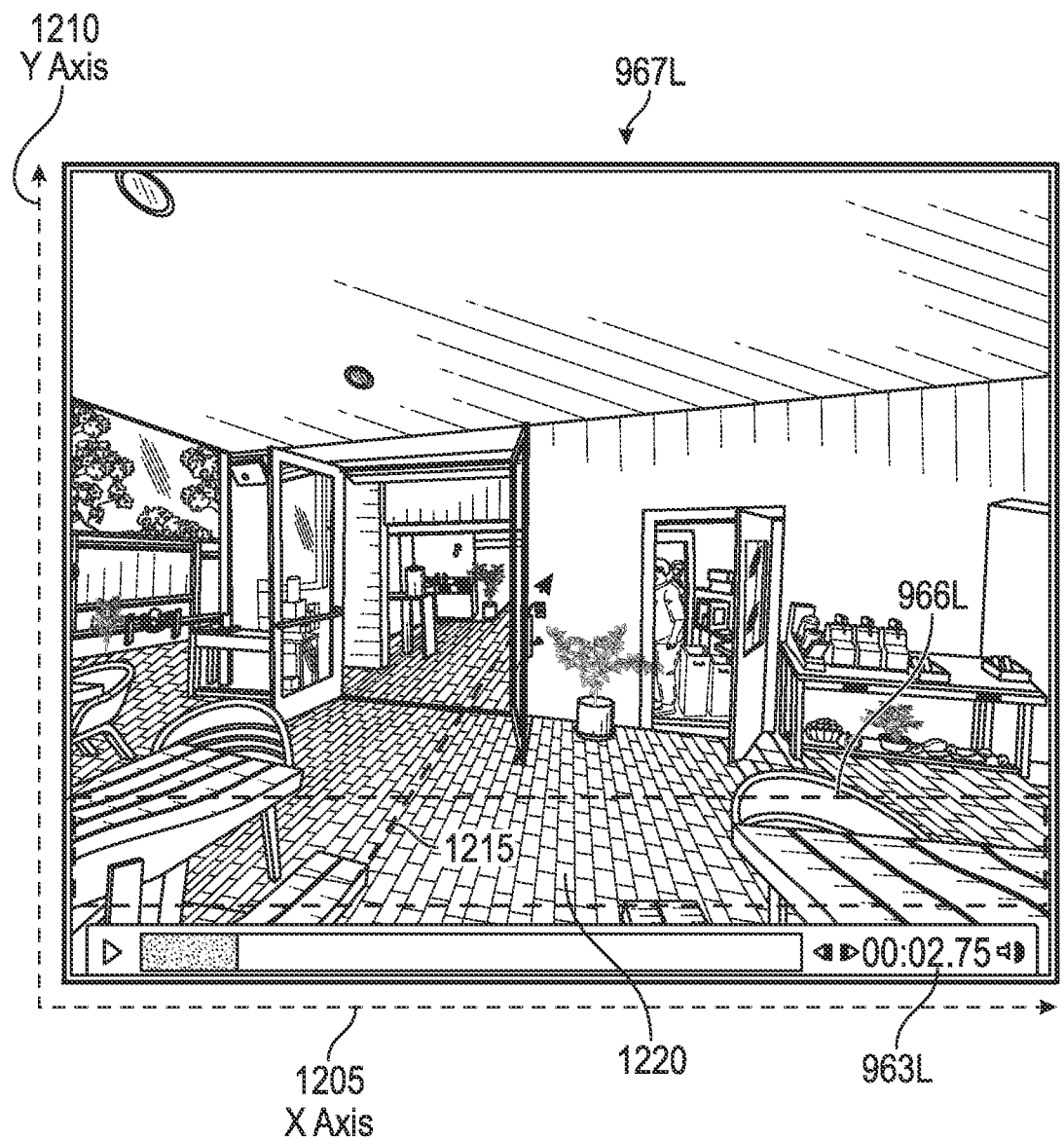

FIGS. 23A-B illustrate an example of a twelfth raw image 858L captured by one of the visible light cameras 114A-B and application of the transformation function 965 to a twelfth shockwave region of vertices 966L of a generated twelfth initial depth image 961L, respectively. A twelfth time coordinate 963L set to 2.75 seconds is associated with the twelfth raw image 858L during capture, and therefore the corresponding twelfth initial depth image 961L from the initial video 960 and the twelfth shockwave depth image 967L of the warped shockwave video 964 are also associated with the twelfth time coordinate 963L of 2.75 seconds. In FIG. 23B, the application of the twelfth transformation function 965L on the twelfth shockwave region 966L is depicted, and this results in shockwaves which appear to be in the near range as a result of the twelfth shockwave region 966L being in near range (e.g., short depth/distance) on the Z axis 1215.

Figure 24A:
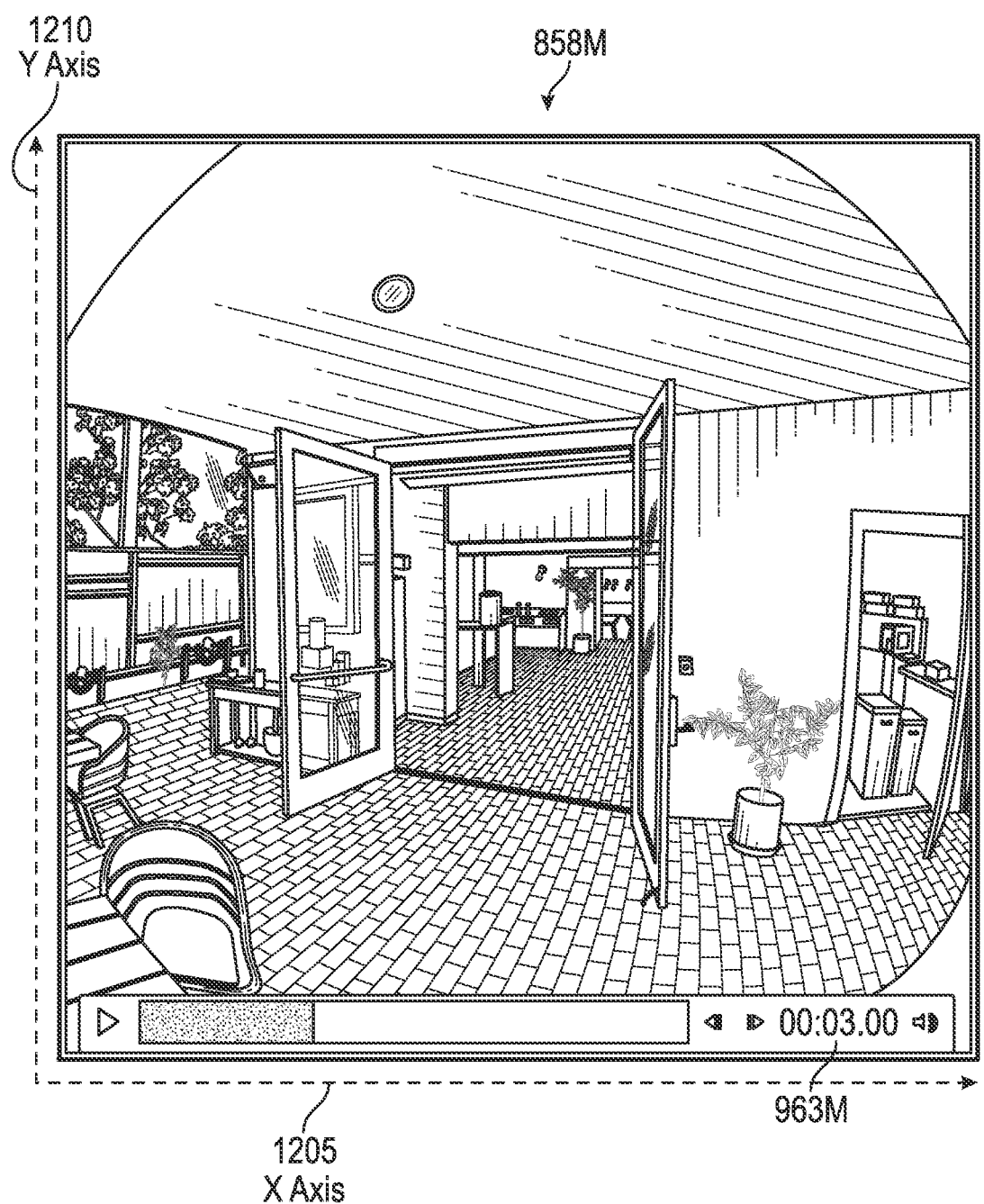
FIGS. 24A-B illustrate an example of a thirteenth raw image captured by one of the visible light cameras and application of the transformation function to a thirteenth shockwave region of vertices of a generated thirteenth initial depth image, respectively.
Figure 24B:
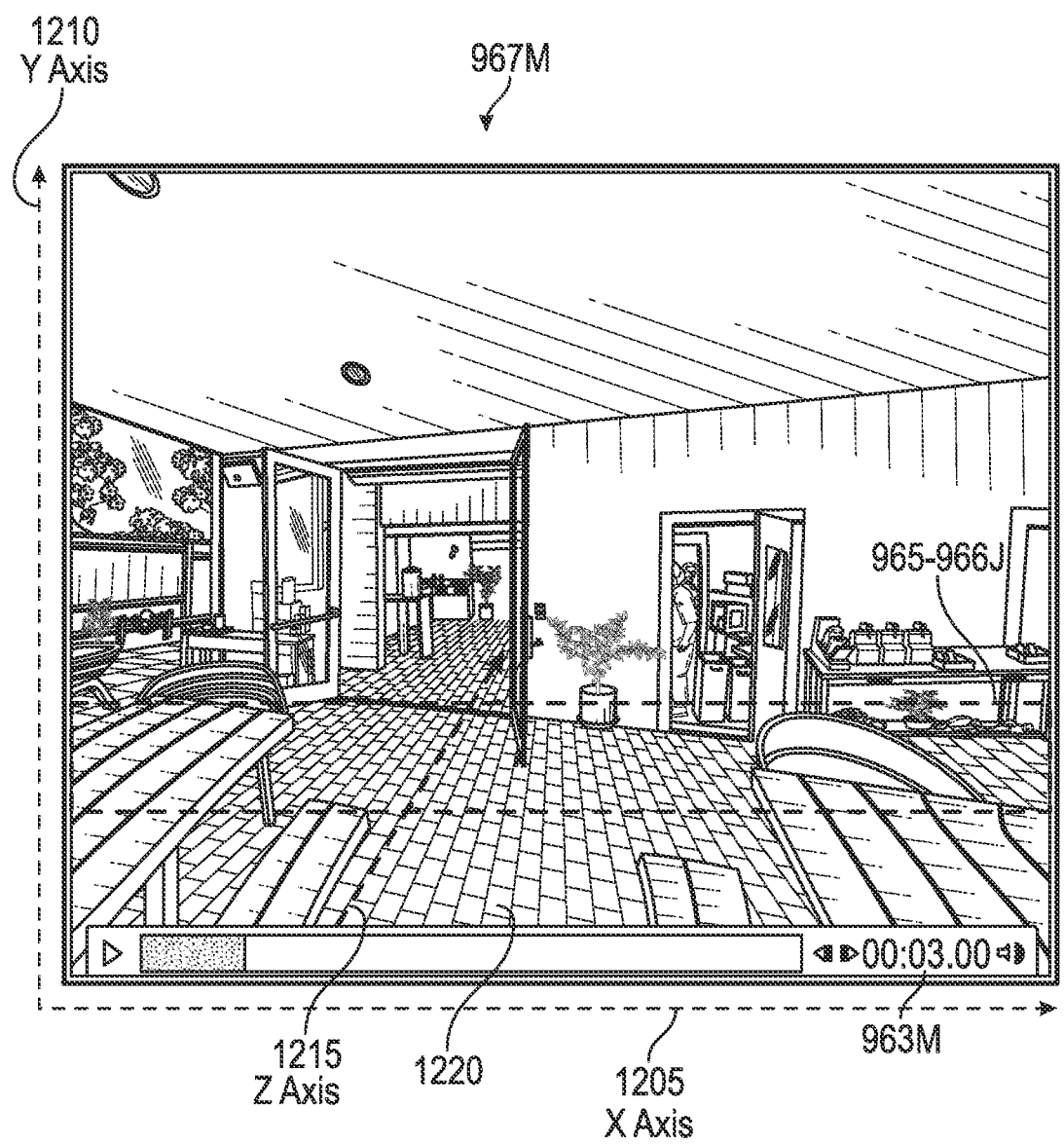

FIGS. 24A-B illustrate an example of a thirteenth raw image 858M captured by one of the visible light cameras 114A-B and application of the transformation function 965 to a thirteenth shockwave region of vertices 966M of a generated thirteenth initial depth image 961M, respectively. A thirteenth time coordinate 963M set to 3.00 seconds is associated with the thirteenth raw image 858M during capture, and therefore the corresponding thirteenth initial depth image 961M from the initial video 960 and the thirteenth shockwave depth image 967M of the warped shockwave video 964 are also associated with the thirteenth time coordinate 963M of 3.00 seconds. In FIG. 24B, the application of the thirteenth transformation function 965M on the thirteenth shockwave region 966M is depicted, and this results in shockwaves which appear to be in the intermediate range as a result of the thirteenth shockwave region 966M being in intermediate range (e.g., medium depth/distance) on the Z axis 1215.

Any of the shockwave creation functionality described herein for the eyewear device 100, mobile device 990, and server system 998 can be embodied in one or more applications as described previously. According to some embodiments, "function," "functions," "application," "applications," "instruction," "instructions," or "programming" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating systems. In this example, the third party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A virtual shockwave creation system comprising:
   a depth capture camera configured to detect an initial video;
   an image display;
   a user input device to receive a shockwave effect selection from a user;
   a processor coupled to the depth capture camera, the image display, and the user input device, the processor configured to:
   generate a sequence of initial depth images from respective initial images in the initial video, wherein each of the initial depth images is associated with a time coordinate on a time (T) axis for a presentation time based on the respective initial images in the initial video and each of the initial depth images is formed of a matrix of vertices, each vertex representing a location in a respective three-dimensional scene, wherein each vertex has a position attribute and the position attribute of each vertex is based on a three-dimensional location coordinate system and includes an X location coordinate on an X axis for horizontal position, a Y location coordinate on a Y axis for vertical position, and a Z location coordinate on a Z axis for a depth position;
   in response to receiving the shockwave effect selection, based on, at least, the associated time coordinate of each of the initial depth images, generate, for each of the initial depth images, a respective warped shockwave image by applying a transformation function to vertices of the respective initial depth image based on at least the Y and Z location coordinates and the associated time coordinate, wherein, for each of the initial depth images, the respective shockwave depth image is generated by applying the transformation function to the respective initial depth image based on a respective affinity matrix for the vertices of the respective initial depth image that determines an influence weight of the transformation function on each of the vertices in a respective shockwave region of vertices, the influence weight based on, at least, a vertical position of the vertex;
   generate a warped shockwave video including the sequence of the generated warped shockwave images; and
   present, via the image display, the warped shockwave video.

2. The system of claim 1, wherein:
   the transformation function transforms a respective shockwave region of vertices grouped together along the Z axis based on the associated time coordinate of a respective initial depth image; and
   the transformation function moves a respective Y location coordinate of vertices in the respective shockwave region of vertices vertically upwards or downwards on the Y axis.

3. The system of claim 2, wherein:
   the transformation function for each initial depth pixel moves the respective Y location coordinate of each vertex in the respective shockwave region of vertices vertically upwards or downwards on the Y axis to vertically fluctuate or oscillate the respective shockwave region of vertices; and the generating, for each of the initial depth images, the respective shockwave depth image by applying the respective transformation function to the respective initial depth image vertically fluctuates or oscillates the respective shockwave region of vertices and stores the respective initial depth image with the vertical fluctuations or oscillations as the respective shockwave depth image.

4. The system of claim 1, wherein the warped shockwave video including the sequence of the generated warped shockwave images has an appearance of a wavefront advancing radially from an object emitting a shockwave or along the Z axis of the warped shockwave images of the warped shockwave video.

5. The system of claim 1, wherein:
the transformation function moves the respective Y location coordinate of vertices in a respective shockwave region of vertices vertically upwards or downwards based on a wave pattern; and
the wave pattern provides an appearance of a wavefront advancing radially from the depth capture camera, radially from an object emitting a shockwave, or along the Z axis of the warped shockwave images of the warped shockwave video.

6. A virtual shockwave creation system comprising:
a depth capture camera configured to detect an initial video;
an image display;
a user input device to receive a shockwave effect selection from a user;
a processor coupled to the depth capture camera, the image display, and the user input device, the processor configured to:
generate a sequence of initial depth images from respective initial images in the initial video, wherein each of the initial depth images is associated with a time coordinate on a time (T) axis for a presentation time based on the respective initial images in the initial video and each of the initial depth images is formed of a matrix of vertices, each vertex representing a location in a respective three-dimensional scene;
in response to receiving the shockwave effect selection, based on, at least, the associated time coordinate of each of the initial depth images, generate, for each of the initial depth images, a respective warped shockwave image by applying a transformation function to vertices of the respective initial depth image;
generate a warped shockwave video including the sequence of the generated warped shockwave images;
present, via the image display, the warped shockwave video; and
compute a respective affinity matrix for the vertices of the respective initial depth image that determines an influence weight of the transformation function on each of the vertices in a respective shockwave region of vertices;
wherein the influence weight is based on, at least, a vertical position of the vertex; and
wherein the processor generates, for each of the initial depth images, the respective shockwave depth image by applying the transformation function to the respective initial depth image further based on the computed respective affinity matrix.

7. A virtual shockwave creation method for use with an electronic device including a depth capture camera and an image display, the method comprising:
capturing, with the depth capture camera, an initial video;
generating a sequence of initial depth images from respective initial images in the initial video, wherein each of the initial depth images is associated with a time coordinate on a time (T) axis for a presentation time based on the respective initial images in the initial video and each of the initial depth images is formed of a matrix of vertices, each vertex representing a location in a respective three-dimensional scene, wherein each vertex has a position attribute and the position attribute of each vertex is based on a three-dimensional location coordinate system and includes an X location coordinate on an X axis for horizontal position, a Y location coordinate on a Y axis for vertical position, and a Z location coordinate on a Z axis for a depth position;
in response to receiving a shockwave effect selection, based on, at least, the associated time coordinate of each of the initial depth images, generating, for each of the initial depth images, a respective warped shockwave image by applying a transformation function to vertices of the respective initial depth image based on at least the Y and Z location coordinates and the associated time coordinate, wherein generating, for each of the initial depth images, the respective shockwave depth image comprises applying the transformation function to the respective initial depth image further based on a respective affinity matrix for the vertices of the respective initial depth image that determines an influence weight of the transformation function on each of the vertices in a respective shockwave region of vertices, the influence weight based on, at least, a vertical position of the vertex;
generating a warped shockwave video including the sequence of the generated warped shockwave images; and
presenting, via the image display, the warped shockwave video.

8. The method of claim 7, wherein:
the transformation function transforms a respective shockwave region of vertices grouped together along the Z axis based on, the associated time coordinate of a respective initial depth image; and
the transformation function moves a respective Y location coordinate of vertices in the respective shockwave region of vertices vertically upwards or downwards on the Y axis.

9. The method of claim 8, wherein:
the transformation function, for each initial depth pixel, moves the respective Y location coordinate of each vertex in the respective shockwave region of vertices vertically upwards or downwards on the Y axis to vertically fluctuate or oscillate the respective shockwave region of vertices; and
the generating, for each of the initial depth images, the respective shockwave depth image by applying the respective transformation function to the respective initial depth image vertically fluctuates or oscillates the respective shockwave region of vertices and stores the respective initial depth image with the vertical fluctuations or oscillations as the respective shockwave depth image.

10. The method of claim 7, wherein:
the presenting the warped shockwave video including the sequence of the generated warped shockwave images presents an appearance of a wavefront advancing radially from an object emitting a shockwave or along the Z axis of the warped shockwave images of the warped shockwave video.

11. The method of claim 7, wherein:
the transformation function moves the respective Y location coordinate of vertices in a respective shockwave region of vertices vertically upwards or downwards based on a wave pattern; and
the wave pattern provides an appearance of a wavefront advancing radially from the depth capture camera, radially from an object emitting a shockwave, or along the Z axis of the warped shockwave images of the warped shockwave video.

12. A non-transitory computer-readable medium storing program code for execution on an electronic device including a depth capture camera, an image display, and an electronic processor which, when executed, is operative to cause the electronic processor to perform the steps of:
capturing, via the depth capture camera, an initial video;
generating a sequence of initial depth images from respective initial images in the initial video, wherein each of the initial depth images is associated with a time coordinate on a time (T) axis for a presentation time based on the respective initial images in the initial video and each of the initial depth images is formed of a matrix of vertices, each vertex representing a location in a respective three-dimensional scene, wherein each vertex has a position attribute and the position attribute of each vertex is based on a three-dimensional location coordinate system and includes an X location coordinate on an X axis for horizontal position, a Y location coordinate on a Y axis for vertical position, and a Z location coordinate on a Z axis for depth;
in response to receiving a shockwave effect selection, based on, at least, the associated time coordinate of each of the initial depth images, generating, for each of the initial depth images, a respective warped shockwave image by applying a transformation function to vertices of the respective initial depth image, wherein generating, for each of the initial depth images, the respective shockwave depth image comprises applying the transformation function to the respective initial depth image further based on a respective affinity matrix for the vertices of the respective initial depth image that determines an influence weight of the transformation function on each of the vertices in a respective shockwave region of vertices, the influence weight based on, at least, a vertical position of the vertex;
generating a warped shockwave video including the sequence of the generated warped shockwave images based on at least the Y and Z location coordinates and the associated time coordinate; and
presenting, via the image display, the warped shockwave video.

13. The non-transitory computer-readable medium of claim 12, wherein:
the transformation function transforms a respective shockwave region of vertices grouped together along the Z axis based on, the associated time coordinate of a respective initial depth image; and
the transformation function moves a respective Y location coordinate of vertices in the respective shockwave region of vertices vertically upwards or downwards on the Y axis.

14. The non-transitory computer-readable medium of claim 13, wherein:
the transformation function, for each initial depth pixel, moves the respective Y location coordinate of each vertex in the respective shockwave region of vertices vertically upwards or downwards on the Y axis to vertically fluctuate or oscillate the respective shockwave region of vertices; and
the generating, for each of the initial depth images, the respective shockwave depth image by applying the respective transformation function to the respective initial depth image vertically fluctuates or oscillates the respective shockwave region of vertices and stores the respective initial depth image with the vertical fluctuations or oscillations as the respective shockwave depth image.

15. The non-transitory computer-readable medium of claim 12, wherein:
the presenting the warped shockwave video including the sequence of the generated warped shockwave images presents an appearance of a wavefront advancing radially from an object emitting a shockwave or along the Z axis of the warped shockwave images of the warped shockwave video.

* * * * *